United States Patent
Singh et al.

(10) Patent No.: US 10,353,195 B2
(45) Date of Patent: *Jul. 16, 2019

(54) CAMERA DEVICE METHODS, APPARATUS AND COMPONENTS

(71) Applicant: LIGHT LABS INC., Redwood City, CA (US)

(72) Inventors: Harpuneet Singh, Dublin, CA (US); James Schmieder, Wayland, NY (US); Sapna A. Shroff, Sunnyvale, CA (US)

(73) Assignee: LIGHT LABS INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/853,927

(22) Filed: Dec. 25, 2017

(65) Prior Publication Data
US 2018/0188523 A1    Jul. 5, 2018

Related U.S. Application Data

(63) Continuation of application No. 14/876,775, filed on Oct. 6, 2015, now Pat. No. 9,857,584.
(Continued)

(51) Int. Cl.
*G02B 26/08*  (2006.01)
*H04N 5/225*  (2006.01)
(Continued)

(52) U.S. Cl.
CPC ........... *G02B 26/0816* (2013.01); *G02B 7/02* (2013.01); *G02B 26/105* (2013.01);
(Continued)

(58) Field of Classification Search
CPC .............. G02B 26/0816; G02B 26/105; H04N 5/2257; H04N 5/2254; H04N 5/2259
See application file for complete search history.

(56) References Cited

U.S. PATENT DOCUMENTS 5,293,265 A     3/1994   Aleshin et al.
5,727,242 A *   3/1998   Lo .......................... G03B 35/00
                                                     348/E13.007
(Continued)

FOREIGN PATENT DOCUMENTS

WO     2010113193 A1    10/2007
WO     2007091112 A1     8/2017

OTHER PUBLICATIONS

Extended European Search Report from European Application No. 16780964.9 dated Nov. 19, 2018, pp. 1-8.

*Primary Examiner* — Ahmed A Berhan
(74) *Attorney, Agent, or Firm* — Straub & Straub; Michael P. Straub; Stephen T. Straub

(57) ABSTRACT

Methods and apparatus for implementing optical chains, e.g., camera modules, which can be used in a camera device are described as well as camera devices including multiple camera modules. In various embodiments one or more camera modules include mirror assemblies which support a movable mirror. The mirror is driven in some embodiments by a linear actuator, e.g., piezo electric actuator with the linear motion of the actuator's push rod being converted into angular mirror rotation by use of hinge, e.g., pivot on which the mirror is mounted. A return spring provide a force contrary to that provided by the actuator. A recess is included in a mounting board to allow the bottom of the mirror or a portion of the mirror mounting hinge to be placed below the surface of the mounting board to which the camera module is secured.

20 Claims, 34 Drawing Sheets

Related U.S. Application Data

(60) Provisional application No. 62/149,519, filed on Apr. 17, 2015.

(51) Int. Cl.
  *G02B 7/02* (2006.01)
  *G02B 13/00* (2006.01)
  *G02B 26/10* (2006.01)

(52) U.S. Cl.
  CPC ......... *H04N 5/2254* (2013.01); *H04N 5/2257* (2013.01); *H04N 5/2259* (2013.01); *G02B 13/001* (2013.01); *H04N 5/2258* (2013.01)

(56) References Cited

U.S. PATENT DOCUMENTS

| | | |
|---|---|---|
| 7,009,752 B1 | 3/2006 | Lorell et al. |
| 2003/0118278 A1 | 6/2003 | Yoon et al. |
| 2005/0007603 A1* | 1/2005 | Arieli ..................... G01J 9/02 356/601 |
| 2006/0268431 A1 | 11/2006 | Jin |
| 2015/0042870 A1 | 2/2015 | Chan et al. |

* cited by examiner

RIGHT SIDE VIEW          LEFT SIDE VIEW

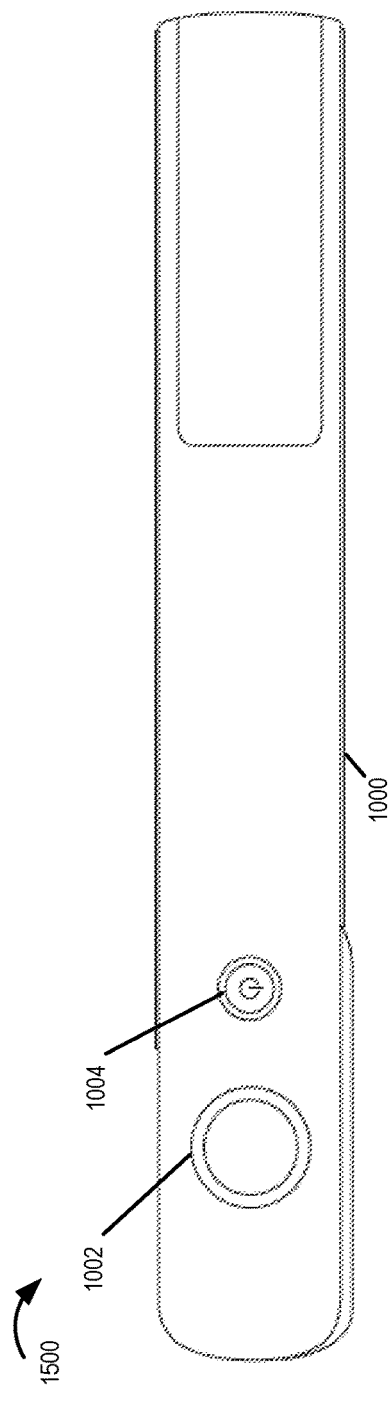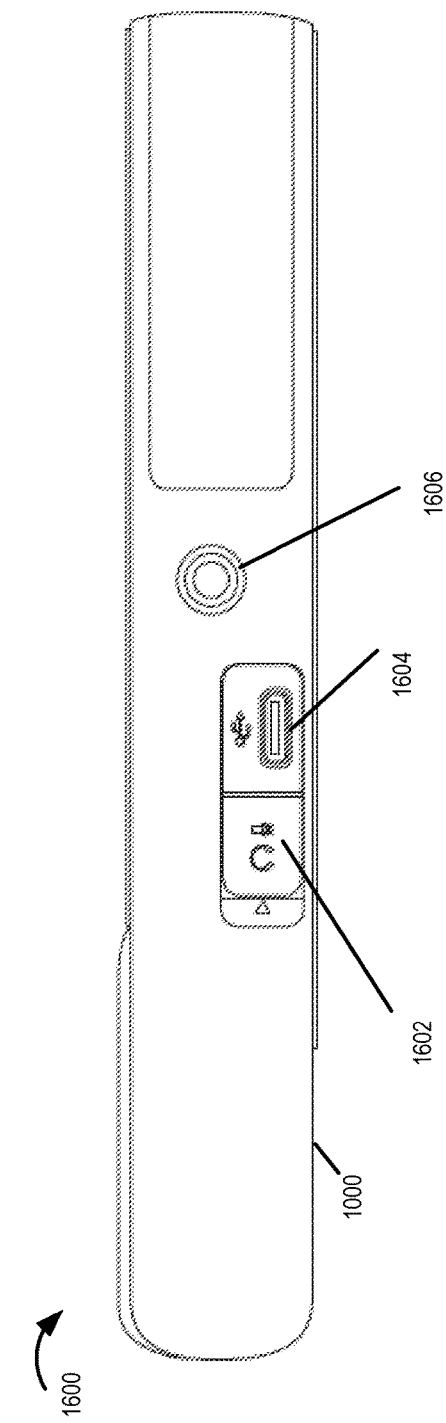

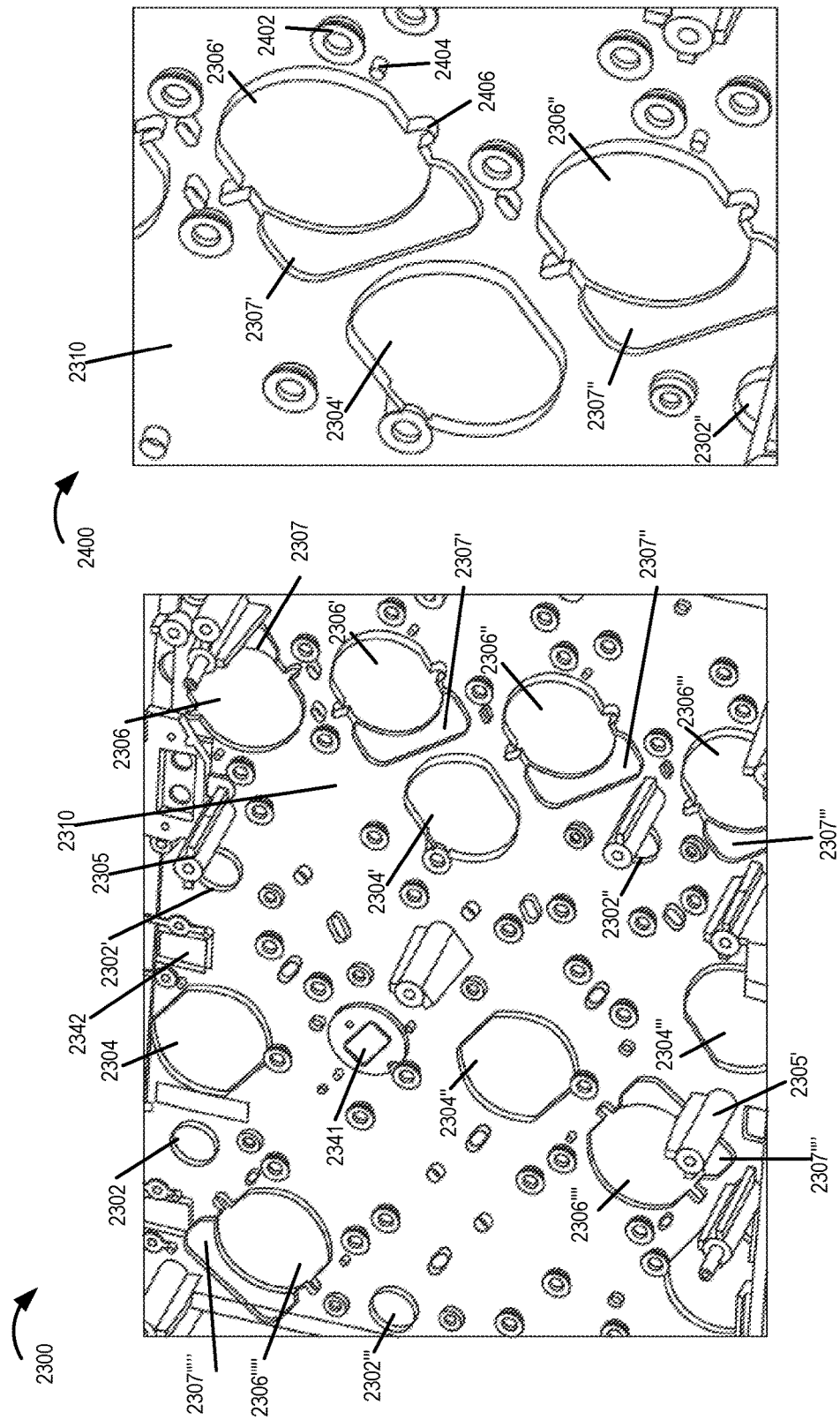

CAMERA DEVICE METHODS, APPARATUS AND COMPONENTS

RELATED APPLICATIONS

The present application is a continuation of U.S. patent application Ser. No. 14/876,775 filed Oct. 6, 2015 which claims the benefit of U. S. Provisional Patent Application Ser. No. 62/149,519 filed Apr. 17, 2015, each listed application being hereby expressly incorporated by reference in its entirety.

FIELD

The present application relates to camera device methods and apparatus including e.g., camera components such as camera modules, mirrors, and/or other assemblies and/or camera devices including such components.

BACKGROUND

Conventional camera systems often use one large lens which may extend considerably out from the front of a camera. Such lenses often tend not only to increase the overall thickness of the camera device but to add considerably to the weight of the camera device.

In view of the above discussion there is a need for methods and apparatus for camera components which can be used to implement a camera device which can be implemented without having to use a lens barrel that extends considerably beyond the face of the camera.

While not necessary or critical it would be desirable if the modules and/or other camera device components could be implemented in a way that allows multiple camera modules, e.g., optical chains, to be included in a single camera device. From a design perspective it would be desirable if one or more modules could be oriented in a camera device in manner that allows at least a portion of an optical path of the camera module to extend in inside the body of the camera device inside the camera device in which is included in a direction other than along the front to back direction of the camera device thereby allowing flexibility in camera module arrangement and utilization of space within the camera device.

In view of the above, it should be appreciated that there is a need for improved methods and/or apparatus for implementing camera modules and/or a camera device. While not necessary it would be desirable if one or more camera features facilitated implementation of a thin camera device where a lens assembly need not extend far outside the front of a camera device.

SUMMARY

Methods and apparatus for implementing optical chains, e.g., camera modules, which can be used in a camera device are described as well as camera devices including multiple camera modules.

In some embodiments, one or more camera modules include a moveable mirror. In various embodiments a linear actuator is used to drive the mirror. A spring is used to maintain tension between the rod and a mirror support cradle. The spring can and in some embodiments does cause the mirror to move when the drive member, e.g., a push rod, retracts while extending the push rod causes the mirror to move in the other direction. The linear motion of the push rod generated by the linear actuator is converted to angular motion since the mirror is mounted on a hinge assembly, e.g., pivot, and moves as the rod pushes on the back of a mirror support cradle in which the mirror is mounted or the mirror support is forced back by the return spring as the drive rod is retracted.

In some embodiments a hall sensor and magnet are used to detect the position of the mirror relative to the linear actuator or other fixed element in the camera. The distance measured by the hall sensor is converted into a mirror angle based on the fixed relationship between the linear actuator drive rod position and the angular rotation of the mirror is known and the distance measurement made by the hall sensor is converted in some embodiments to information indicating angular rotation of the mirror.

The linear actuator and hall sensor are part of a position feedback loop which allows the angular position of the mirror of a camera module including such features to be driven to a desired angle.

The camera modules are mounted in some embodiments on a rigid mounting board, e.g., made of aluminum or some other material. In some embodiments the modules are secured to the rigid mounting board via screws which extend through the board and into the camera module being secured to the board.

In order to minimize overall thickness of the camera device while maintaining rigidity, in some embodiments a portion of the rigid mounting board adjacent a mirror is recessed to allow the surface of the mirror and/or a portion of the mirror mounting crudely to extend below the surface of the mounting board. In at least some such embodiments including a recess for a portion of the mirror allows the camera to be thinner than if the mirror was forced to be kept completely above the surface of the rigid mounting board. While the recess reduces the thickness of the mounting board by not cutting out the area completely rigidity of the board is enhanced as compared to if the board were completely cut away in the area of the recess facilitating a rigid mounting structure while still allowing for a thin design. While in some embodiments the recesses in the mounting boards are used for mirrors of the largest camera modules, recesses need not be provided for all camera modules with mirrors. For example, in embodiments where the camera device includes modules of different sizes some of the smaller modules which include mirrors may be and sometimes are mounted without the use of recesses. However in other embodiments mirror recesses in the rigid mounting board are used for mounting a mirror hinge or other support structure and may be used for all or multiple modules which include mirrors.

Thus, in some embodiments, the fact that the mounting plate is recessed to allow large mirrors to extend below the surface of mounting plate allows for a rigid mounting structure while still allowing for a relatively thin camera.

In some embodiment a piezo electric actuator is used as the linear drive for the mirror assembly. However, other types of linear motors may be used instead.

An exemplary camera device, in accordance with some embodiments, includes: a first optical chain including: a first moveable mirror assembly; a first mirror support, a first pivot attached to said first mirror assembly and inserted into said first mirror support allowing said first mirror assembly to rotate with respect to said first mirror support; and a first linear actuator for exerting a linear force on a first portion of said first mirror assembly to control rotation of said first mirror assembly.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE FIGURES

FIG. 15 is a top plan view of the exemplary camera shown in FIG. 10.

FIG. 16 is a bottom view of the exemplary camera shown in FIG. 10.

FIG. 23 shows a rigid mounting board to which camera modules can be mounted and identifies aspects and/or features of the mounting board.

FIG. 24 shows a view of a portion of the rigid mounting board shown in FIG. 23 and identifies additional features and/or aspects.

DETAILED DESCRIPTION

Figure 1:
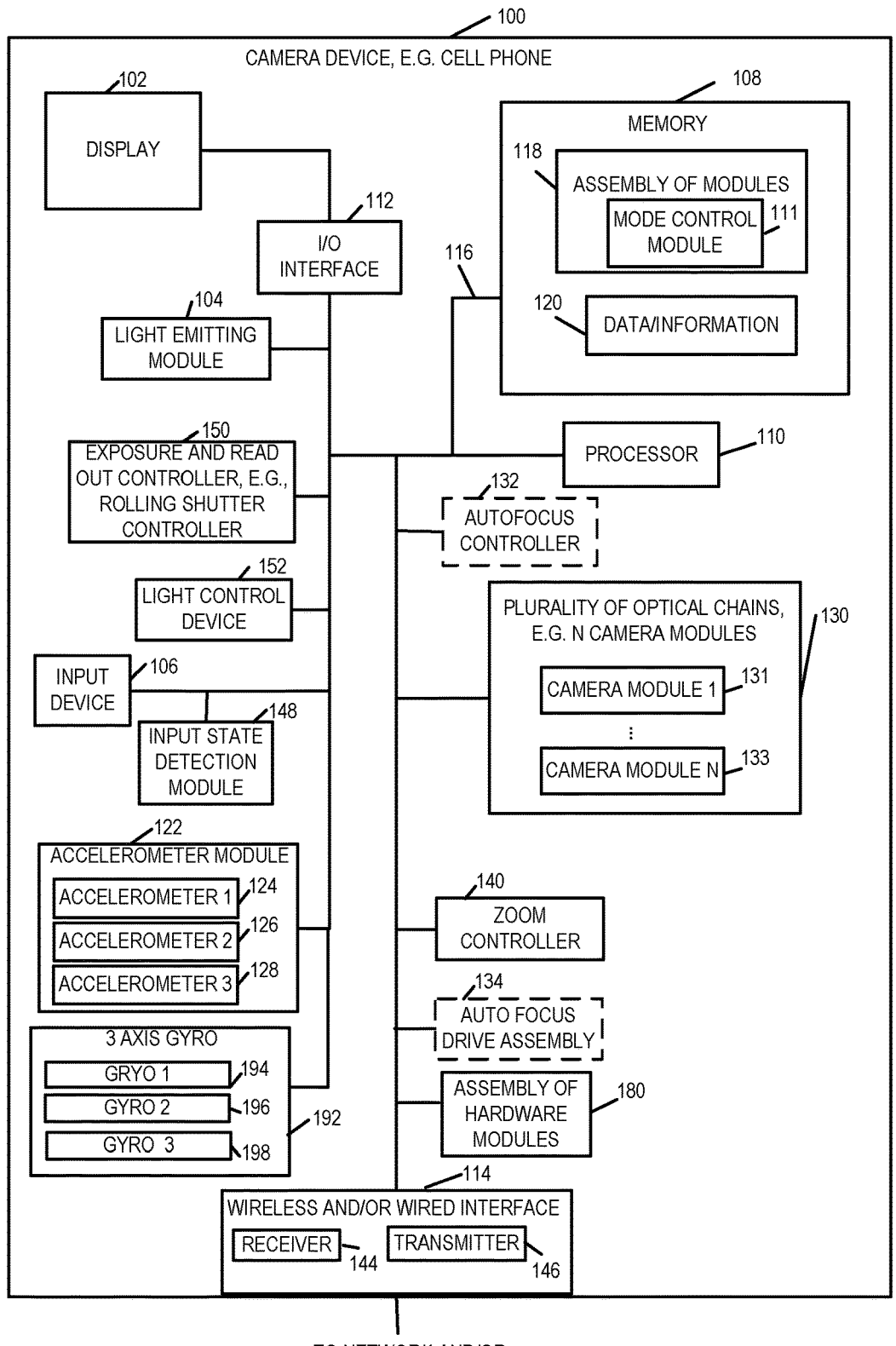
FIG. 1 is a block diagram of an exemplary apparatus, e.g., a camera device, implemented in accordance with one embodiment of the present invention.

FIG. 1 illustrates an exemplary camera device 100 such as a digital camera, notepad with camera functionality, or cell phone with camera functionality, implemented in accordance with one exemplary embodiment of the present invention. The camera device 100, in some embodiments, is a portable device. In other embodiments, the camera device 100 is a fixed device such as a wall mounted camera.

FIG. 1 illustrates the camera device 100 in block diagram form showing the connections between various elements of the apparatus 100. The exemplary camera device 100 includes a display device 102, a light emitter module 104, an input device 106, an input state detection module 148, an exposure and readout controller 150, e.g., a rolling shutter controller 150, a light control device 152, memory 108, a processor 110, a hardware assembly of modules 180, a wireless and/or wired interface 114, e.g., a cellular interface, a Wi-Fi interface, and/or a USB interface, an I/O interface 112, an accelerometer module 122, 3 axis gyro 192, and a bus 116 which are mounted in a housing represented by the rectangular box touched by the line leading to reference number 100. The light emitter module 104 includes light emitting elements which maybe LEDs (Light Emitting Diodes) or other types of light emitting elements which can be individually controlled so that all the light emitting elements need not be on at the same time. The input device 106 may be, and in some embodiments is, e.g., keypad, touch screen, or similar device that may be used for inputting information, data and/or instructions. The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis.

Similarly, the 3-axis gyro 192, which includes 194, 196 and 198 can measure rotation along each of 3 different axis. The output of the accelerometer module 122 and the gyro module 192 can, and in some embodiments is, monitored with changes in accelerometer and gyro output being interpreted and checked over time by processor 110 and/or zoom control module, e.g., zoom controller 140 to detect changes in acceleration indicating motion in one or more directions. In some embodiments the input device 106 includes at least one zoom control button that can be used to enable or disable camera zoom functionality. In some such embodiments when the zoom control button is in a depressed state the camera zoom function is enabled while when the button is in a un-depressed state the camera zoom function is disabled. The input state detection module 148 is configured to detect the state of the input device, e.g., the zoom control button, to detect whether the button is in a depressed state or undepressed state. In some embodiments there is a status register in the camera device 100 that includes a bit indicating the state of the zoom control button detected by the state detection module 148, e.g., whether it is in the depressed state indicating that zoom is enabled or whether it is undepressed indicating that zoom is disabled.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116.

Figure 7A:
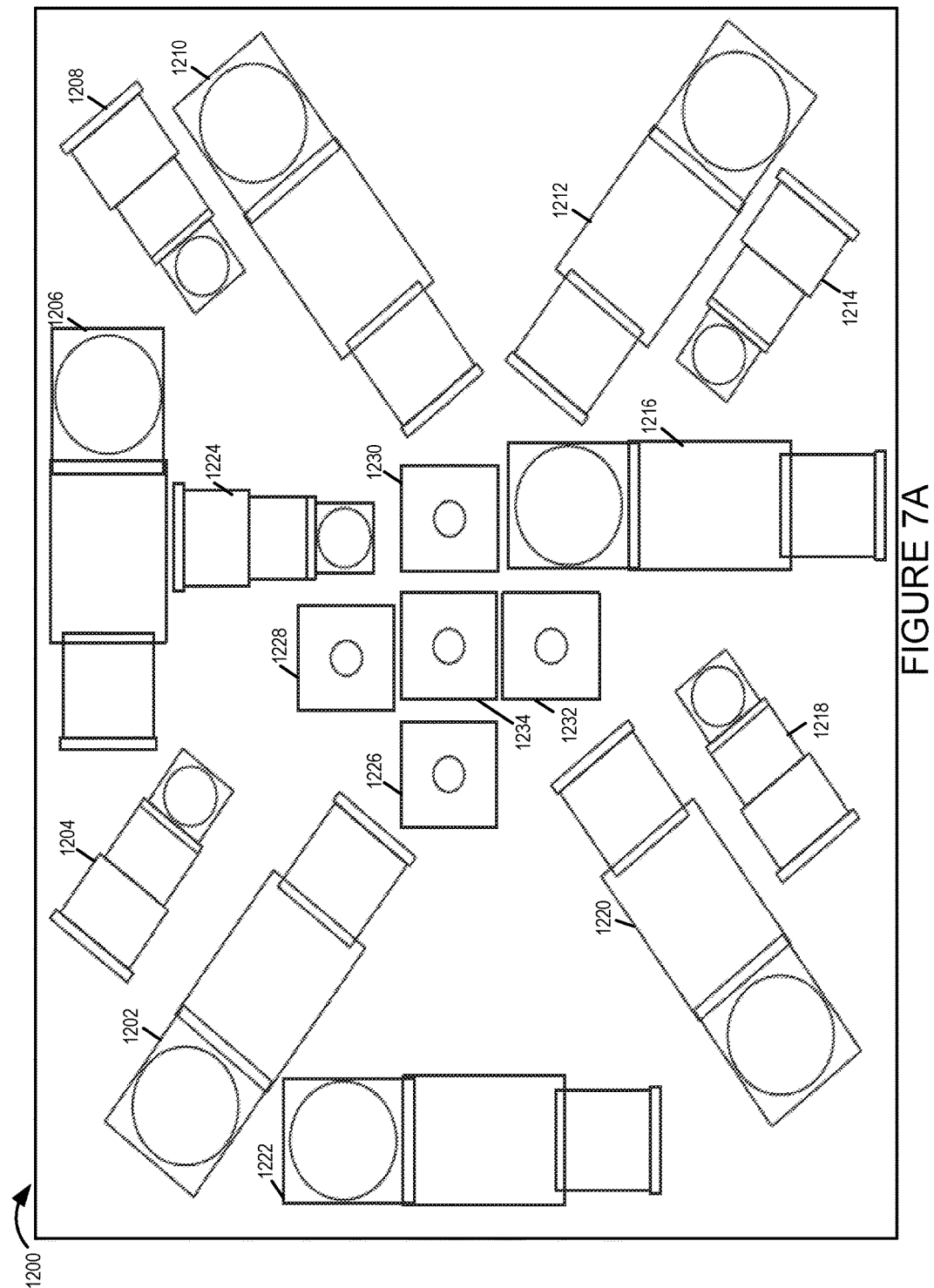
FIG. 7A illustrates an arrangement of optical chains, e.g., camera modules, used in one embodiment to implement a camera device of the type shown in FIG. 6A with the lens arrangement shown in FIG. 6B.

In addition to being coupled to the I/O interface 112, the bus 116 is coupled to the memory 108, processor 110, an optional autofocus controller 132, the wireless and/or wired interface 114, a zoom control module 140, and a plurality of optical chains 130, e.g., X optical chains also referred to herein as camera modules. In some embodiments X is an integer greater than 2, e.g., 3, 4, 7 or a larger value depending on the particular embodiment. The plurality of camera modules 130 may be implemented using any of the various camera module sets and/or arrangements described in the present application. For example, in some embodiments the camera device 100 is implemented using a set of camera modules as shown in FIG. 7A while in other embodiments the camera device 100 may be implemented using other module arrangements. Images captured by individual optical chains in the plurality of optical chains 130 can, and in various embodiments are, stored in memory 108, e.g., as part of the data/information 120 and processed by the processor 110, e.g., to generate one or more composite images.

The X camera modules 131 through 133 may, and in various embodiments do, include camera modules having different focal lengths. Multiple camera modules may be provided at a given focal length. For example, multiple camera modules having a 35 mm equivalent focal length to a full frame DSLR camera, multiple camera modules having a 70 mm equivalent focal length to a full frame DSLR camera and multiple camera modules having a 140 mm equivalent focal length to a full frame DSLR camera are included in an individual camera device in some embodiments. The various focal lengths are exemplary and a wide variety of camera modules with different focal lengths may be used. The camera device 100 is to be considered exemplary. To the extent that other references are made to a camera or camera device with regard to some of the other figures, it is to be understood that at least in some embodiments the camera device or camera will include the elements shown in FIG. 1 even if the elements are not shown in a particular figure or embodiment. While in some embodiments all of the elements shown in FIG. 1 are included in the camera device or camera, in other embodiments a subset of the elements shown in FIG. 1 are included and the illustration of the elements in FIG. 1 is not intended to imply that a particular element is essential or necessary in all embodiments.

As will be discussed below images from different camera modules captured at the same time or during a given time period can be combined to generate a composite image, e.g., an image having better resolution, frequency content and/or light range than an individual image captured by a single one of the camera modules 131, 133.

Multiple captured images and/or composite images may, and in some embodiments are, processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The lighting module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are used as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation. Light emitting elements are illuminated, in some but not all embodiments, sequentially, so that different portions of an area are illuminated at different times so that the full area need not be consistently lighted during image capture. While all lighting elements are not kept on for the full duration of an image capture operation involving the reading out of the full set of pixel elements of a sensor, the portion of area which is having its image captured, e.g., the scan area, at a given time as a result of the use of a rolling shutter will be illuminated thanks to synchronization of the lighting of light emitting elements with rolling shutter operation. Thus, various light emitting elements are controlled to illuminate at different times in some embodiments based on the exposure time and which portion of a sensor will be used to capture a portion of an image at a given time. In some embodiments the light emitting elements in the LED module 104 include a plurality of sets of light emitting elements, each set of light emitting elements corresponding to a different image area which it illuminates and which is captured by a different portion of the image sensor. Lenses may, and in some embodiments are used to direct the light from different light emitting elements to different scene areas which will be captured by the camera through the use of one or more camera modules.

The rolling shutter controller 150 is an electronic shutter that controls reading out of different portions of one or more image sensors at different times. Each image sensor is read one row of pixel values at a time and the various rows are read in order. As will be discussed below, the reading out of images captured by different sensors is controlled in some embodiments so that the sensors capture a scene area of interest, also sometimes referred to as an image area of interest, in a synchronized manner with multiple sensors capturing the same image area at the same time in some embodiments.

While an electronic rolling shutter is used in most of the embodiments, a mechanical rolling shutter may be used in some embodiments.

The light control device 152 is configured to control light emitting elements (e.g., included in the LED module 104) in a synchronized manner with the operation of the rolling shutter controller 150. In some embodiments the light control device 152 is configured to control different sets of light emitting elements in the array to emit light at different times in a manner that is synchronized with the timing of the rolling shutter 150. In some embodiments the light control device 152 is configured to control a first set of light emitting elements corresponding to a first image area to output light during a first time period, the first time period being determined based on the timing of the rolling shutter and being a period of time during which a first portion of the sensor is exposed for image capture. In some embodiments the light control device 152 is further configured to control a second set of light emitting elements corresponding to a second image area to output light during a second time period, the second time period being determined based on the timing of the rolling shutter and being a period of time during which a second portion of the sensor is exposed for image capture. In some embodiments the first time period includes at least a portion of time which does not overlap the second time period.

In some embodiments the light control device 152 is further configured to control an Nth set of light emitting elements corresponding to an Nth image area to output light during a third time period, said Nth time period being determined based on the timing of the rolling shutter and being a period of time during which an Nth portion of the sensor is exposed for image capture, N being an integer value corresponding to the total number of time periods used by said rolling shutter to complete one full read out of total image area.

In some embodiments the light control device 152 is further configured to control the second set of light emitting elements to be off during said portion of time included in the first period of time which does not overlap said second period of time. In some embodiments the light control device is configured to determine when the first set and said second set of light emitting elements are to be on based on an exposure setting. In some embodiments the light control device is configured to determine when said first set and said second set of light emitting elements are to be on based on an amount of time between read outs of different portions of said sensor. In some embodiments the different sets of light emitting elements in the plurality of light emitting elements are covered with different lenses. In some such embodiments the light control device 152 is further configured to determine which sets of light emitting elements to use based on an effective focal length setting being used by the camera device.

The accelerometer module 122 includes a plurality of accelerometers including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. Similarly the gyro module 192 includes 3 gyros, 194, 196 and 198, one for each axis which is well suited for use in the 3 dimensional real world environments in which camera devices are normally used. The camera acceleration detected by an accelerometer in a given direction is monitored. Acceleration and/or changes in acceleration, and rotation indicative of camera motion, are monitored and processed to detect one or more directions, of motion e.g., forward camera motion, backward camera motion, etc. As discussed below, the acceleration/rotation indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus drive assembly 134 is, in some embodiments, implemented as a lens drive. The autofocus controller 132 is present in at least some autofocus embodiments but would be omitted in fixed focus embodiments. The autofocus controller 132 controls adjustment of at least one lens position in one or more optical chains used to achieve a desired, e.g., user indicated, focus. In the case where individual drive assemblies are included in each optical chain, the autofocus controller 132 may drive the autofocus drive of various optical chains to focus on the same target.

The zoom control module 140 is configured to perform a zoom operation in response to user input.

The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The assembly of modules 118 includes a mode control module which determines, e.g., based on user input which of a plurality of camera device modes of operation are to be implemented. In different modes of operation, different camera modules 131, 133 may and often are controlled differently based on the selected mode of operation. For example, depending on the mode of operation different camera modules may use different exposure times. Alternatively, the scene area to which the camera module is directed and thus what portion of a scene is captured by an individual camera module may be changed as will be discussed below with regard to FIGS. 5 and 34 depending on how the images captured by different camera modules are to be used, e.g., combined to form a composite image and what portions of a larger scene individual camera modules are to capture during the user selected or automatically selected mode of operation. In some embodiments, the operations performed by the processor when executing the instructions from one or more assembly of modules is instead performed by a hardware module which performs the same functionality and is included in the hardware assembly of modules.

The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1, various features relating to the plurality of optical chains 130 will now be discussed with reference to FIGS. 2 and 3 which show the camera device 100 from front and side perspectives, respectively. Dashed line 101 of FIG. 2 indicates a cross section line.

Box 117 represents a key and indicates that OC=optical chain, e.g., camera module, and each L1 represents an outermost lens in an optical chain. Box 119 represents a key and indicates that S=sensor, F=filter, L=lens, L1 represents an outermost lens in an optical chain, and L2 represents an inner lens in an optical chain. While FIG. 3 shows one possible implementation of optical chains, as will be discussed below, other embodiments are possible and the optical chains may include one or more light redirection elements in addition to the elements shown in FIG. 3. The lenses of different optical chains may have different shapes, e.g., with round apertures being used for some lenses and non-round apertures being used for other lenses. However, in some embodiments lenses with round apertures are used for each of the optical chains of a camera device.

Figure 2:
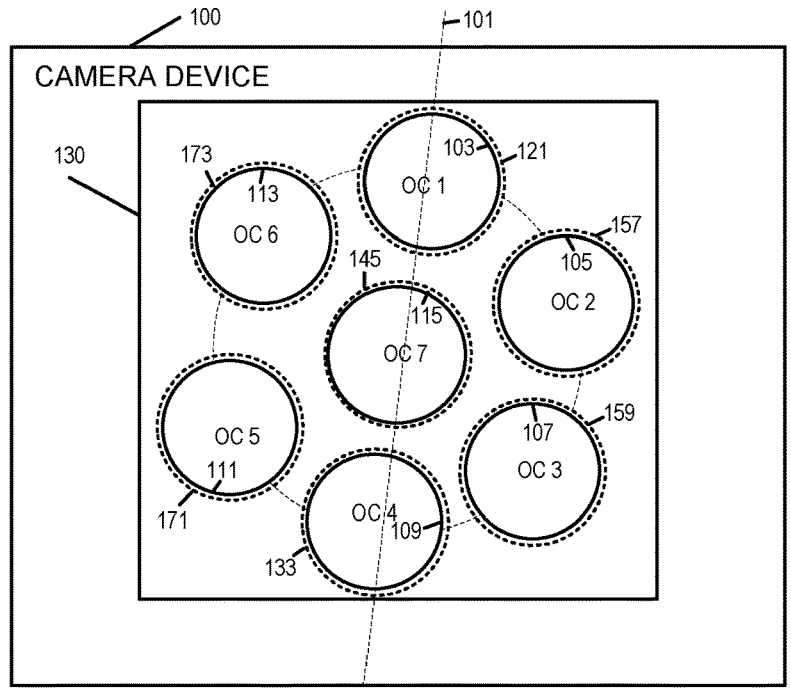
FIG. 2 illustrates a frontal view of an apparatus implemented in accordance with an exemplary embodiment which incorporates multiple optical chains, e.g., camera modules, in accordance with the present invention with lenses which are viewable from the front of the camera.

FIG. 2 shows the front of the exemplary camera device 100. Rays of light 131, which is light toward the front of the camera assembly, shown in FIG. 1 may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chains 130 is mounted. Note that while outer opening shown in FIG. 2 are shown as having circular apertures which are the same size, as will be discussed below different size openings may be used for different optical chains, e.g., depending on the focal length with optical chains having larger focal lengths normally including outer openings with larger apertures than optical chains with small focal lengths.

Figure 3:
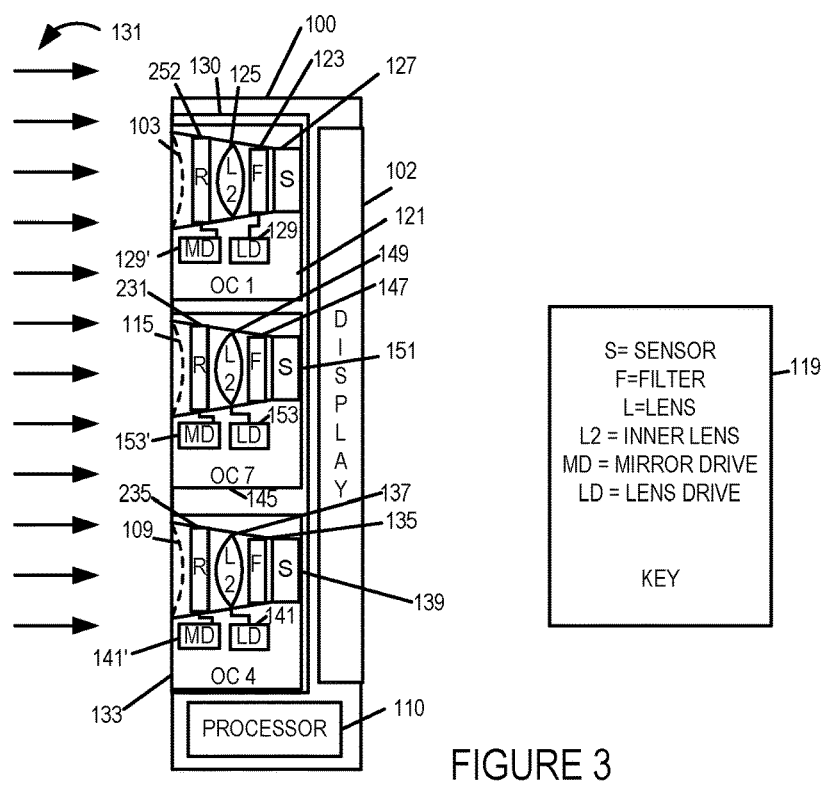
FIG. 3, which is a side view of the exemplary apparatus of FIG. 2, illustrates further details of the exemplary apparatus.

FIG. 3, which shows a side perspective of camera device 100, illustrates three of the seven optical chains (OC 1 121, OC 7 145, OC 4 133) of the set of optical chains 130, display 102 and processor 110. OC 1 121 includes an outer opening 103, a light redirection element 252, e.g., a mirror, an inner lens L2 125, a filter 123 and a sensor 127. In some embodiments the OC 1 121 further includes lens drive (LD) 129 for controlling the position of lens L2 125 for zooming and/or auto focus operation purposes and a mirror drive (MD) 129' for controlling the positioning of the light reflection element 252 as desired to deflect light. The outer opening 103 serves as an aperture of the camera module OC 121, e.g., for entry of light into OC 121. The exposure and read out controller 150 is not shown in the figure but is used for controlling the read out of rows of pixel values form the sensors' 127, 151 and 139 in a synchronized manner, e.g., taking into consideration the scene area being captured by the individual sensors. The LD 129 includes a motor or other drive mechanism which can move the lens, barrel or cylinder housing one or more lenses, or sensor, to which it is connected thereby allowing for an alteration to the light path by moving one or more elements relative to the other elements of the optical chain to which the LD is coupled. While the LD 129 is shown coupled, e.g., connected, to the lens L2 125 and thus can move the position of the lens L2, e.g., as part of a zooming or autofocus operation, in other embodiments the LD 129 is coupled to a cylindrical or barrel shape component which is part of the optical chain or to the sensor 127. Thus, the lens drive 129 can alter the relative position of a lens to the sensor 127, e.g., to change the distance between the sensor 127 and the lens 125 as part of a zooming and/or focus operation. The MD includes a motor or other drive mechanism which can control the relative angle of reflection element 252 allowing for alteration of angle of redirection of incident light.

OC 7 145 includes an outer opening 115, a light redirection element 231, an inner lens L2 149, a filter 147, and a sensor 151. OC 7 145 further includes LD 153 for controlling the position of lens L2 149 and a and a mirror drive (MD) 153' for controlling the positioning of the light reflection element 231. The LD 153 includes a motor or other drive mechanism which can move the lens, barrel, cylinder, sensor or other optical chain element to which it is connected.

OC 4 133 includes an outer opening 109, a light redirection element 235, an inner lens L2 137, a filter 135 and a sensor 139. OC 4 133 includes LD 141 for controlling the position of lens L2 137 and MD 141' for controlling the positioning of the light reflection element 235. The LD 153, 141 and MD 153', 141' include a motor or other drive mechanism and operates in the same or similar manner as the other drives of the other optical chains discussed above. In some embodiments each of the filters 123, 147 and 135 is an infrared (IR) filter. While only three of the OCs are shown in FIG. 3 it should be appreciated that the other OCs of the camera device 100 may, and in some embodiments do, have the same or similar structure and/or may include other elements such as light redirection devices. Thus, differences between the multiple optical chains of the camera device 100 are possible and, in some embodiments, are present to allow for a variety of focal lengths to be supported in a single camera device through the use of multiple optical chains which can be operated in parallel.

FIG. 3 and the optical chains (OCs), also sometimes referred to as camera modules, illustrated therein are illustrative of the general structure of OCs used in various embodiments. However, numerous modifications and particular configurations are possible. While reference to elements of FIG. 3 may be made, it is to be understood that the OCs (camera modules) in a particular embodiment will be configured as described with regard to the particular embodiment and that various different camera modules are often used in single camera device. FIG. 5 and FIG. 13A show optical chains, e.g., camera modules, which include light redirection devices. Such modules can be used alone or in combination with other modules such as the ones shown in FIGS. 3 and 4A or other figures of the present application.

While a filter may be of a particular color or used in some optical chains, filters need not be used in all optical chains and may not be used in some embodiments. In embodiments where the filter is expressly omitted and/or described as being omitted or an element which allows all light to pass, while reference may be made to the OCs of FIG. 3 it should be appreciated that the filter will be omitted in an embodiment where it is indicated to be omitted or of such a nature that it allows a broad spectrum of light to pass if the embodiment is indicated to have a broadband filter. In some embodiments one or more light redirection elements, e.g., mirrors, such as elements 252, 231, 235 shown in FIG. 3, are included in OCs for light to be redirected, e.g., to increase the length of the optical path or make for a more convenient internal component configuration. It should be appreciated that each of the OCs 121, 145, 133, shown in FIG. 3 will have their own optical axis. In the example, each optical axis passes through the outer openings 103, 115, or 109 at the front of the optical chain and passes through the OC to the corresponding sensor 127, 151, 139.

While the processor 110 is not shown being coupled to the LD, and sensors 127, 151, 139 it is to be appreciated that such connections exist and are omitted from FIG. 3 to facilitate the illustration of the configuration of the exemplary OCs.

As should be appreciated the number and arrangement of lens, filters and/or mirrors can vary depending on the particular embodiment and the arrangement shown in FIG. 3 is intended to be exemplary and to facilitate an understanding of various features rather than to be limiting in nature.

The front of the plurality of optical chains 130 is visible in FIG. 2 with the outermost opening of each optical chain appearing as a circle represented using a solid line (OC 1 opening 103, OC 2 opening 105, OC 3 opening 107, OC 4 opening 109, OC 5 opening 111, OC 6 opening 113, OC 7 opening 115). In the FIG. 2 example, the plurality of optical chains 130 include seven optical chains, OC 1 121, OC 2 157, OC 3 159, OC 4 133, OC 5 171, OC 6 173, OC 7 145, which include openings 103, 105, 107, 109, 111, 113, 115), respectively, represented by the solid circles shown in FIG. 2. While the outer opening may be a circular opening in some embodiments, in some other embodiments the entry point for the light into the optical chains has a plastic element covering the opening. The outer openings of the optical chains are arranged to form a pattern which is generally circular in the FIG. 2 example when viewed as a unit from the front. While a circular arrangement is used in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

The overall total light capture area corresponding to the multiple lenses of the plurality of optical chains OC 1 to OC 7, also sometimes referred to as optical camera modules, can, in combination, approximate that of a lens having a much larger opening but without requiring a single lens having the thickness which would normally be necessitated by the curvature of a single lens occupying the area which the lenses occupy.

Figure 7B:
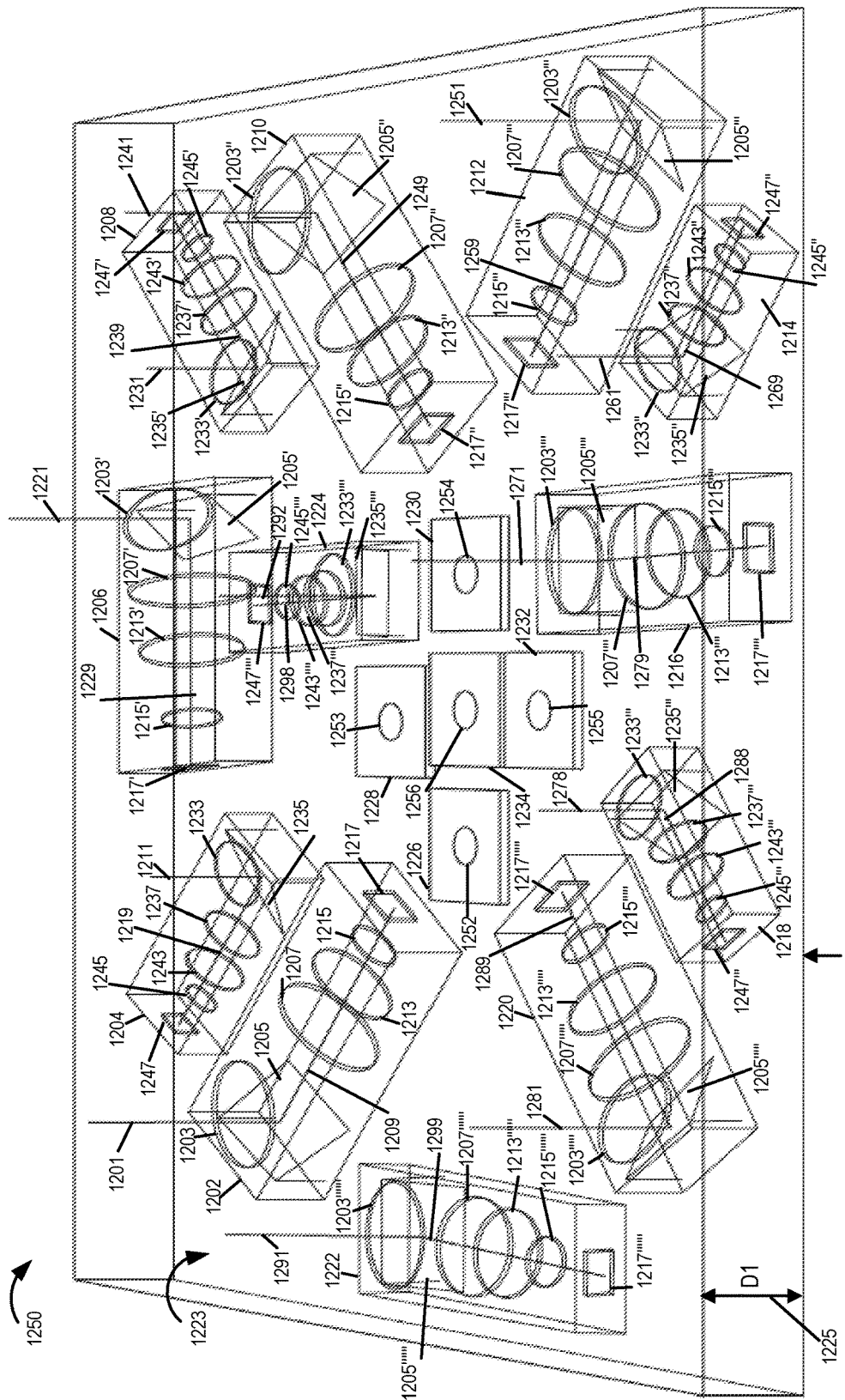
FIG. 7B illustrates a perspective view of a camera device of the type shown in FIG. 6, with the arrangement of various optical chains and elements of the optical chains in the camera device shown in greater detail.

While seven optical chains are shown in FIG. 2, it should be appreciated that other numbers of optical chains are possible. For example, as shown in FIGS. 7A and 7B seventeen camera modules are used in a single camera device in some embodiments. Camera devices including even larger numbers of optical chains are also possible.

The use of multiple optical chains has several advantages over the use of a single optical chain. Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

Given the small size of the optical sensors (e.g., individual pixel elements) the dynamic range, in terms of light sensitivity, is normally limited with the sensors becoming easily saturated under bright conditions. By using multiple optical chains corresponding to different exposure times the dark portions of a scene area can be sensed by the sensor corresponding to the longer exposure time while the light portions of a scene area can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 3 is a cross section perspective of the camera device 100 shown in FIGS. 1 and 2. Dashed line 101 in FIG. 2 shows the location within the camera device to which the cross section of FIG. 3 corresponds. From the side cross section, the components of the first, seventh and fourth optical chains are visible.

As illustrated in FIG. 3 despite including multiple optical chains the camera device 100 can be implemented as a relatively thin device, e.g., a device less than 2, 3 or 4 centimeters in thickness in at least some embodiments. Thicker devices are also possible, for example devices with telephoto lenses, and are within the scope of the invention, but the thinner versions are particularly well suited for cell phones and/or tablet implementations. As will be discussed below, various techniques such as the use of light redirection elements and/or non-circular lenses can be used in conjunction with small sensors, such as those commonly used in handheld cameras, to support relatively large focal lengths, e.g., camera modules of 150 mm equivalent focal length to a full frame DSLR camera, 300 mm equivalent focal length to a full frame DSLR camera or above in a relatively thin camera device format.

As illustrated in the FIG. 3 diagram, the display device 102 may be placed behind the plurality of optical chains 130 with the processor 110, memory and other components being positioned, at least in some embodiments, above or below the display and/or optical chains 130. As shown in FIG. 3, each of the optical chains OC 1 121, OC 7 145, OC 4 133 may, and in some embodiments do, include an outer opening, a light redirection element such as a mirror or prism, a filter F, and a lens L2 which proceed a sensor S which captures and measures the intensity of light which passes through the outer opening serving as the aperture, the lens L2 and the filter F to reach the sensor S. The filter may be a color filter or one of a variety of other types of light filters or may be omitted depending on the particular optical chain embodiment or configuration. In some embodiments the filter is an IR filter.

Note that while supporting a relatively large light capture area and offering a large amount of flexibility in terms of color filtering and exposure time, the camera device 100 shown in FIG. 3 is relatively thin with a thickness that is much less, e.g., ⅕th, 1/10th, 1/20th or even less than the overall side to side length or even top to bottom length of the camera device visible in FIG. 2.

Figure 4A:
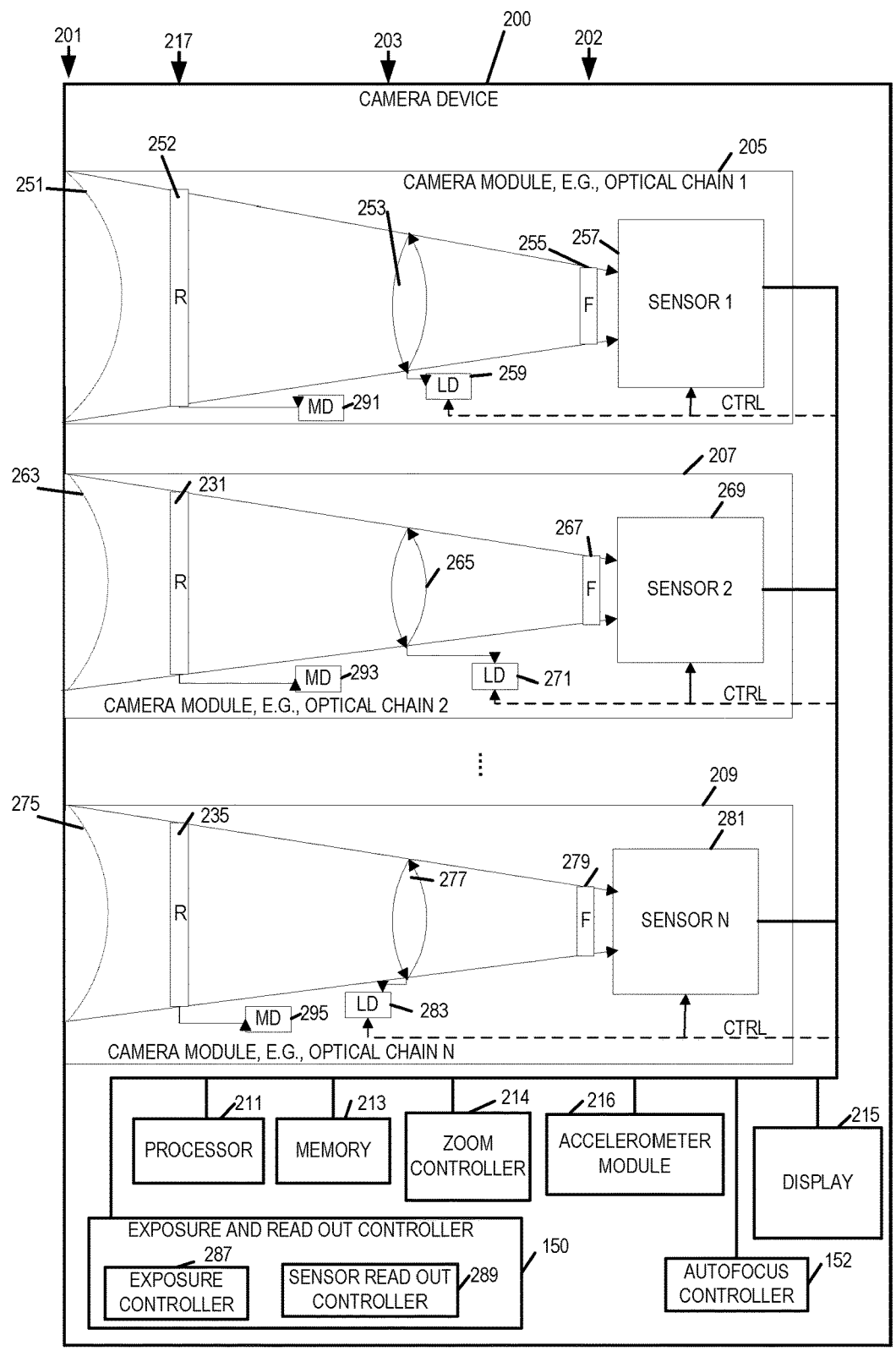
FIG. 4A illustrates a camera device implemented in accordance with another embodiment.

FIG. 4A illustrates a camera device 200 implemented in accordance with the invention. The FIG. 4 camera device 200 includes many or all of the same elements shown in the device 100 of FIGS. 1-3. Exemplary camera device 200 includes a plurality of optical chains (OC 1 205, OC 2 207, . . . , OC X 209, a processor 211, memory 213 and a display 215, coupled together. OC 1 205 includes outer opening 251, a light redirection element R 252, a hinge (or mirror) drive MD 291, an inner lens L2 253, a filter 255, sensor 1 257, and LD 259. The MD 291 can be used to move a position of a hinge to which the light redirection device (R) 252, e.g., mirror, is mounted and thus move the mirror to change the scene area to which the module 205 is directed without moving the optical chain 205. Moving (e.g., rotating about a hinge) the mirror 252 to change the scene area to which the module 205 is directed is especially useful in an embodiment where the outer opening 251 is a plane piece of glass or a plastic piece with no optical power as is the case in some embodiments.

Figure 4B:
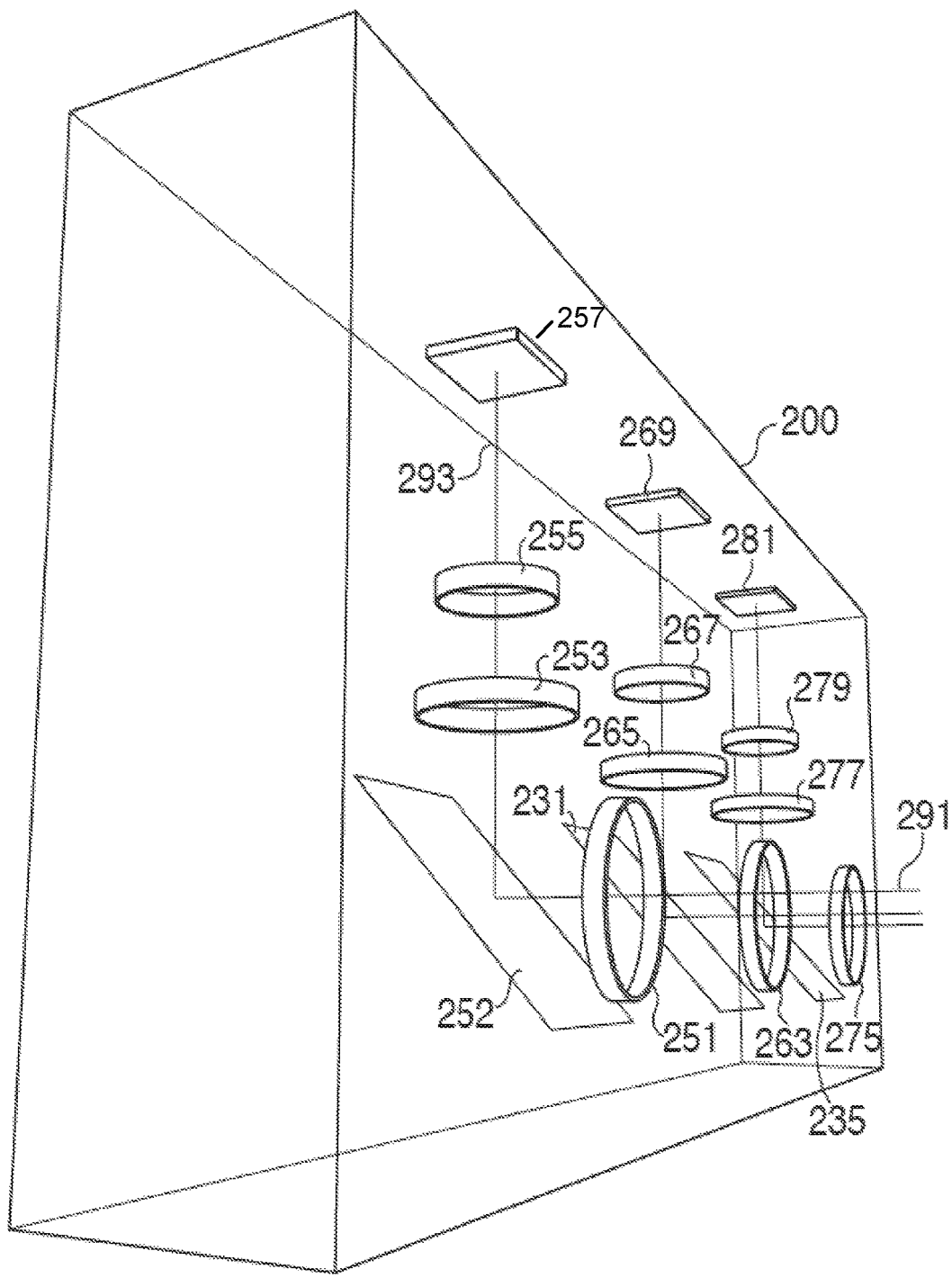
FIG. 4B illustrates the optical chains of the camera device shown in FIG. 4A, as implemented in one particular exemplary embodiment, in greater detail.
Figure 5:
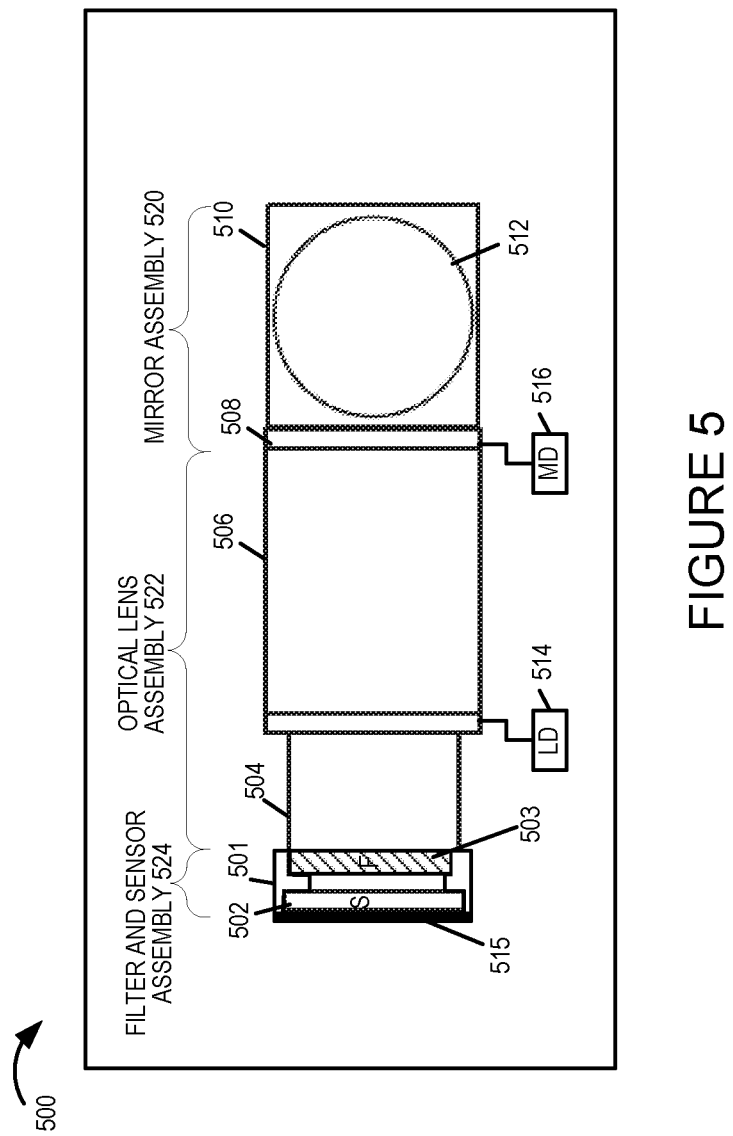
FIG. 5 illustrates an exemplary optical chain, e.g., camera module, which may be used as one of the optical chains included in the camera device of FIG. 1, FIG. 6, FIG. 7 or various other embodiments.

The optical chains shown in FIG. 4A can be arranged in various positions within the camera 200. The elements in FIG. 4B which are the same as those shown in FIG. 4A are identified using the same references numbers and will not be described again. FIG. 4B shows the configuration of the optical chains in an arrangement where light enters via the front or face of the camera 200 and is redirected to sensors 257, 269, 281, of the first through third camera modules respectively, mounted on the inside top portion of the camera housing which forms the outer portion of camera 200.

As can be seen in the FIG. 4B embodiment, light entering in the horizontal dimension is redirected upward in the vertical. For example, light entering through outer opening 251 of the first optical chain 205 is redirected upward by mirror 252 so that it passes though the inner lens 253 and the filter 255 as it travels towards sensor 257. An optical chain such as the first optical chain 205, that has a light redirection element, such as the element 252, can be divided, for purposes of discussion, into two parts, Part A and Part B. Part A consists of all those elements in the optical chain that are in the light path before the light redirection element 252 and Part B consists of all the optical elements (including the image sensor) that are in the light path after the light redirection element. The optical axis of the optical chain 205 as seen from outside the camera is the optical axis 291 of Part A. Light traveling into the optical chain 205 along the optical axis 291 will be redirected upward along the optical axis 293 of Part B of the first optical chain.

In one particular exemplary embodiment of the optical chain 205, Part A contains no optical elements with any optical power, e.g., Part A contains plane glass or filters but no lenses. In this case the optical axis of the optical chain as seen from outside the camera is simply along a light path that gets redirected along the optical axis 293 of Part B by the light redirection element. In some embodiments one or more lenses 253 are included in Part B of the optical chain which have an optical power. Thus, it should be appreciated that in at least some embodiments the outer opening 251 may be implemented as a flat glass plate or relatively flat plastic or glass element which does not protrude from the surface of the camera 200. This reduces the risk of scratches and also reduces the possibly that an outer portion which is covering or forming the opening will get caught when inserting or removing it from a pocket or case as might be the case if the opening is covered by a curved lens protruding from the camera.

It should be appreciated that the optical axis of the second and third camera modules are similar to that of the first optical module 205 and that the components of the optical chains may also be grouped into two parts, Part A which corresponds to components proceeding the mirror of the optical chain and Part B which corresponds to components subsequent the mirror of the optical chain. From the perspective of the optical path of an optical chain, the optical path like the components may be grouped as Part A and Part B with the mirror providing the transition point between Part A of an optical path and Part B of the optical path.

In some but not all embodiments, processor 211 of camera device 200 of FIG. 4A is the same as or similar to processor 110 of device 100 of FIG. 1, memory 213 of device 200 of FIG. 4A is the same as or similar to the memory 108 of device 100 of FIG. 1, the zoom control module 214 of device 200 is the same as or similar to the zoom control module 140 of device 100, the accelerometer module 216 of device 200 is the same as or similar to the accelerometer module 122 of device 100 and display 215 of device 200 of FIG. 4A is the same as or similar to the display 102 of device 100 of FIG. 1.

OC 2 207 includes outer opening 263, light redirection device 231, mirror drive 293, inner lens 265, filter 267, sensor 2 269, and LD 271. OC N 209 includes outer opening 275, light redirection device 235, mirror drive 295, inner lens 277, filter 279, sensor N 281, and LD 283. The exposure and read out controller 150 controls sensors to read out, e.g., rows of pixel values, in a synchronized manner while also controlling the exposure time. In some embodiments the exposure and read out controller 150 is a rolling shutter controller including an exposure controller 287 and a sensor read out controller 289. An autofocus controller 152 is included to control the lens drives 259, 271 and 283 in some embodiments.

In the FIG. 4A embodiment the optical chains (optical chain 1 205, optical chain 2 207, . . . , optical chain N 209) are shown as independent assemblies with the lens drive of each module being a separate LD element (LD 259, LD 271, LD 283), respectively. Each of the LDs shown adjusts the position of the corresponding lens to which it is connected as part of a zooming and/or focus operation. In some embodiments the LD controls the position of a lens and/or sensor in which case the LD is connected to both a lens support mechanism or lens and the sensor.

In FIG. 4A, the structural relationship between the mirror and various lenses and filters which precede the sensor in each optical chain can be seen more clearly than in some of the other figures. While four elements, e.g. an opening, lens (see columns 201 and 203), a light redirection device R (see col. 217), and the filter (corresponding to column 202) are shown in FIG. 4A before each sensor, it should be appreciated that a much larger combinations (e.g., numbers) of lenses, light redirection elements and/or filters may precede the sensor of one or more optical chains with anywhere from 2-10 elements being common and an even larger number of elements being used in some embodiments, e.g., high end embodiments and/or embodiments supporting a large number of filter and/or lens options. Furthermore it should be appreciated that all illustrated elements need not be included in all optical chains. For example, in some embodiments optical chains having relatively short focal lengths may be implemented without the use of a light redirection element being used, e.g., to redirect the light by 90 degrees, since the optical chain with a short focal length can be implemented in a straight but still relatively compact manner given the short focal length.

In some but not all embodiments, optical chains are mounted in the camera device with some, e.g., the shorter focal length optical chains extending in a straight manner from the front of the camera device towards the back. However, in the same camera, longer focal length camera modules may and sometimes do include light redirection devices which allow at least a portion of the optical path of a camera module to extend sideways allowing the length of the optical axis to be longer than the camera is deep. The use of light redirection elements, e.g., mirrors, is particularly advantageous for long focal length camera modules given that the overall length of such modules tends to be longer than that of camera modules having shorter focal lengths. A camera may have a wide variety of different camera modules some with light redirection elements, e.g., mirrors, and others without mirrors. Filters and/or lenses corresponding to different optical chains may, and in some embodiments are, arranged in planes, e.g. the apertures of the outermost lenses may be configured in a plane that extends parallel to the face of the camera, e.g., a plane in which the front of the camera both extends vertically and horizontally when the camera is in a vertical direction with the top of the camera both being up.

FIG. 5 shows an optical chain, e.g., camera module, 500 which is used in various exemplary embodiments. A plurality of optical chains of the type illustrated in FIG. 5 are used in a camera device such as camera 600 discussed in detail below. The camera module 500 is an optical chain that includes an assembly of different elements integrated together to form the camera module. As illustrated, camera module 500 includes a mirror assembly 520, an optical lens assembly 522 and a filter and sensor assembly 524. The mirror assembly 520 of the camera module 500 includes an outer opening 512 which maybe covered by a flat glass/plastic plate, a light redirection device, e.g., mirror, 510 positioned behind the opening 512, and a mirror hinge 508. The mirror hinge 508 is coupled to the mirror drive (MD) 516. The optical elements assembly 522 of the camera module 500 includes a first cylindrical module portion 506 and a second cylindrical module portion 504, with the optical elements assembly 522 being coupled to a lens drive 514. The filter and sensor assembly 524 of the camera module 500 includes a filter mounted on a filter mount 501 and a sensor 502 placed on a mounting board 515. Light enters the optical chain 500 via the opening 512 and is redirected by the mirror 510 so that it reaches the sensor 502 at the back of the optical chain. The first and second cylindrical portions 504, 506 can house one or more lenses and in some cases filters as well as other optical components through which light may pass before reaching the sensor 502. While the mirror 510 is normally used to redirect light 90 degrees so that light entering through the opening 512

(which may be positioned on the face of the camera) along it's optical axis will be redirected along the optical axis of Part B of the optical chain 500 so that is travels towards the side of the camera allowing for the optical chain 500 to effectively use the side to side distance of the camera device in which the optical chain 500 is mounted, the mirror drive 516 may move the position of the hinge 508 and thus the mirror 510 to alter the angle of redirection so that it varies from 90 degrees. Thus, the direction in which the optical chain 500 effectively points may be altered by moving all or a portion of the hinge 508 and mirror 510. In some embodiments, the axis of the hinge is perpendicular to the Part B of the optical axis and parallel to the place of the front face of the camera 600. In some embodiments, the opening 512 is covered with a plane glass with no optical power.

The MD 516 may be implemented using a motor or other mechanical mechanisms which can be used to drive or change the position of the mirror 510 and/or hinge 508 which connects the mirror to the other components of the camera module such as cylindrical portion 506.

The cylindrical or barrel portions 504, 506 of the optical elements assembly 522 may be moved by lens drive 514 so that they slide relative to each other, e.g., barrel portion 504 may be moved so that it moves further into or out of the barrel portion 506 thereby altering the distance from the opening 512 to the sensor 502 as part of a focus or zoom operation.

It should be appreciated that the optical chain 500 allows for relatively long optical chains to be positioned in a camera device which has a depth which is less than the overall length of the optical chain 500. The camera module 500 is particular well suited for implementing camera devices which include multiple optical chains but which are still intended to be relatively thin to facilitate storage in a pocket or other storage device.

Figure 6A:
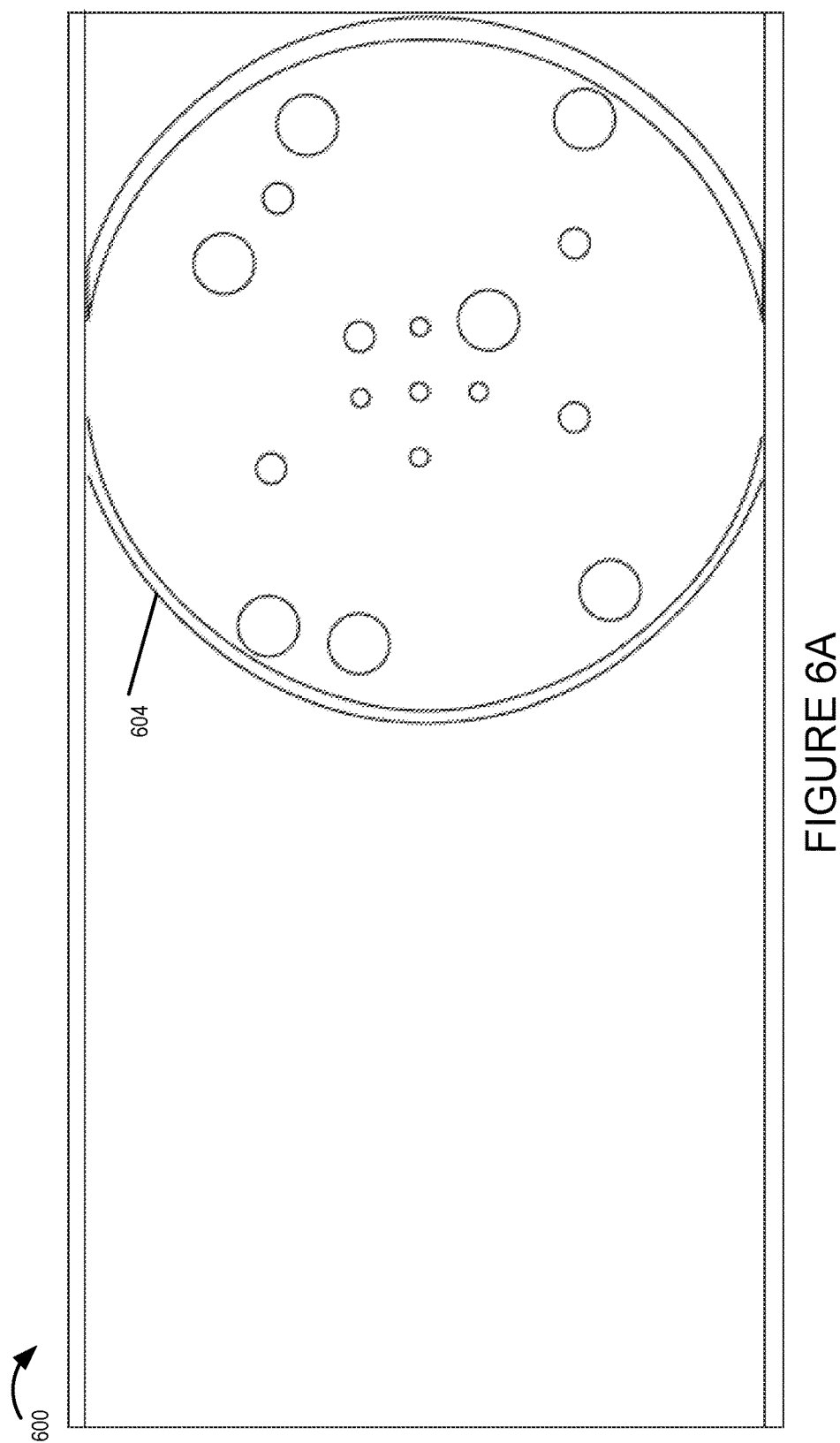
FIG. 6A is an illustration of an exemplary camera including multiple optical chains in accordance with one feature of the invention showing the arrangement of the lenses of individual camera modules

FIG. 6A is a frontal view of the camera device 600 and the optical chain arrangement of the camera device with the 15 outer openings being clearly visible as circles in the lens area 604. Note that the diameter of the smallest lenses is "d" which correspond to the camera modules having the smallest focal length, the medium focal length modules have a diameter 2d, and the camera modules having the largest focal length have a diameter 4d. This results in the camera modules having the same 'f stop' or 'f number' given the focal length relationship f1 being ¼ the largest focal length (f3) and one half the focal length of the medium focal length f2 of the camera modules having a medium focal length. The 'f number' is the ratio of the focal length to the aperture diameter and determines the diffraction limit of the camera modules. The smaller the f number, the less likely it is that the camera module will be diffraction limited. Smaller f numbers usually corresponded to larger optical complexity in the camera module. Small lenses with 5 or 6 molded plastic elements these days can be manufactured in a cost effective manner for f numbers around 2.4. Accordingly, in some embodiments plastic lenses made of multiple plastic elements are used.

Figure 6B:
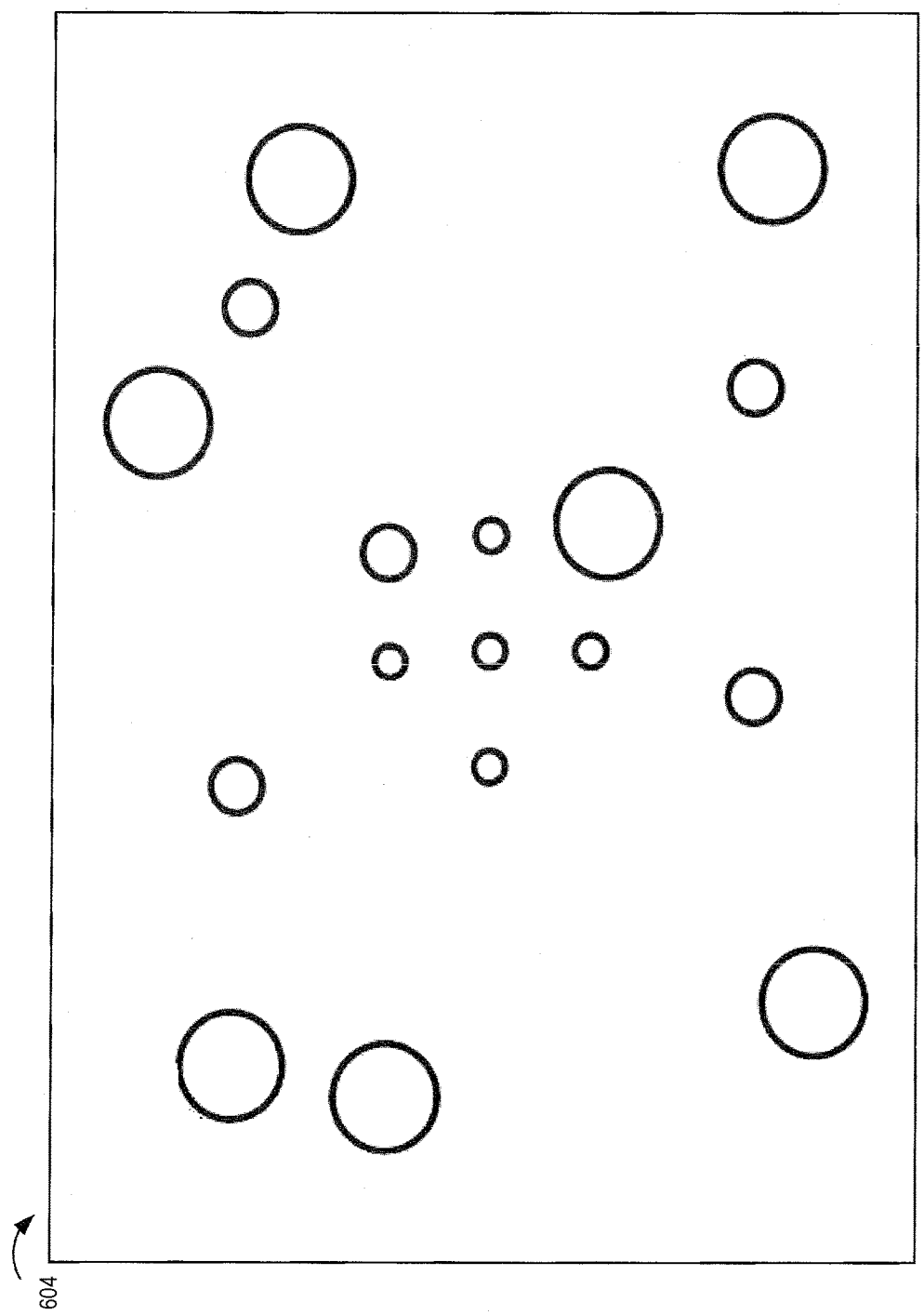
FIG. 6B illustrates the arrangement of lenses of individual optical chains in the camera device shown in FIG. 6A allowing for better appreciation of the arrangement of lenses on the front of the camera device.

FIG. 6B shows an enlarged version of the optical chain arrangement of the camera 600 as viewed from the front. In FIG. 6B the outer openings of the three different sizes can be clearly seen with the largest diameter openings corresponding to camera modules having the largest focal length and thus zoom, e.g., magnification.

FIG. 7A is a diagram 1200 showing how the 17 optical chains, e.g., camera modules, of the camera 600 can be arranged within the body of the camera 600. The seven optical chains 1202, 1206, 1210, 1212, 1216 1220, 1222 with the largest lenses and largest supported focal lengths are implemented using optical chains of the type shown in FIG. 5. Similarly, the five camera modules 1204, 1208, 1214, 1218, 1224 with the medium diameter lenses and medium supported focal lengths are also implemented using optical chains of the type shown in FIG. 5. The five optical chains 1226, 1228, 1230, 1232 and 1234 having the smallest diameter outer openings, e.g., light entrance openings, and smallest focal lengths are implemented using optical chains which do not use mirrors and extend straight toward the back of the camera. Optical chains of the type used in the FIG. 3 embodiment may be used for the optical chains 1226, 1228, 1230, 1232 and 1234. However, it should be appreciated that optical chains of the type illustrated in FIG. 5 maybe and in some embodiments are, used as the optical chains 1226, 1228, 1230, 1232 and 1234.

From the FIG. 7A example which may be considered as a frontal view with the front of the camera housing removed to allow viewing of the camera modules, it can be seen how a larger number of camera modules can be incorporated into a single camera device 600 allowing for the simultaneous and/or synchronized capture of multiple images of the same or different portions of a scene area using a single camera. The camera device can then combine multiple images to generate a composite image having image attributes and/or qualities such as a number of pixels which exceeds that possible using a single one of the camera modules of the camera 600.

FIG. 7B illustrates a perspective view 1250 of the camera device 600 showing the arrangement of various optical chains in the camera device and the elements of the optical chains in the camera device in greater detail. Thus FIG. 7B presents a more detailed illustration of the plurality of optical chains (OCs) 1202, 1204, 1206, 1208, 1210, 1212, 1214, 1216, 1218, 1220, 1222, 1224, 1226, 1228, 1230, 1232 and 1234 having various corresponding focal lengths as discussed with regard to FIG. 7A in detail.

As illustrated in FIG. 7B, the camera 600 has a depth D1 which represents the thickness of the camera 600 from the front surface of the camera (indicated by arrow 1223) to the back/rear surface of the camera (indicated by arrow 1227). While not shown in the FIG. 7B in some embodiments the camera device 600 includes the same or similar elements as the camera device of FIGS. 1 and/or 4A.

In some embodiments the elements included in the optical chains 1202, 1206, 1210, 1212, 1216, 1220, 1222, 1204, 1208, 1214, 1218, 1224 are similar to those discussed above with regard to FIGS. 4B and 5 while the elements included in the optical chains 1226, 1228, 1230, 1232 and 1234 are similar to those discussed above with regard to FIG. 3. In the embodiment of FIG. 7B each OC uses a round outer opening.

The OC 1202 includes an outer opening 1203, a light redirection device 1205, e.g., mirror, positioned behind the opening 1203, a first inner lens 1207, a second inner lens 1213, a filter 1215 and a sensor 1217. As discussed earlier in some embodiments the outer opening is covered by a flat glass plate or a flat plastic element. In some embodiments the OCs 1202, 1206, 1210, 1212, 1216, 1220, 1222 have the same focal length (largest focal length compared to other OCs in FIG. 7B) and use similar elements such as the mirror, filter, sensor etc. Accordingly, the elements corresponding to OCs 1206, 1210, 1212, 1216, 1220, 1222 have been identified using the same reference numerals used for identifying similar elements in the OC 1202 but with the reference numbers in these OCs followed by a prime ('), double prime ("), triple prime ('") etc. For example, OC 1206 includes an outer opening 1203', a light redirection device 1205', e.g., mirror, positioned behind the opening 1203', a first inner lens 1207', a second inner lens 1213', a filter 1215', and a sensor 1217'. The OC 1210 includes an outer opening 1203", a light redirection device 1205", a first inner lens 1207", a second inner lens 1213", a filter 1215", and a sensor 1217". The OC 1212 includes an outer opening 1203''', a light redirection device 1205''', a first inner lens 1207''', a second inner lens 1213''', a filter 1215''', and a sensor 1217'''. The OC 1216 includes an outer opening 1203'''', a light redirection device 1205'''', a first inner lens 1207'''', a second inner lens 1213'''', a filter 1215'''', and a sensor 1217''''. The OC 1220 includes an outer opening 1203''''', a light redirection device 1205''''', a first inner lens 1207''''', a second inner lens 1213''''', a filter 1215''''', and a sensor 1217'''''. The OC 1222 includes an outer opening 1203'''''', a light redirection device 1205'''''', a first inner lens 1207'''''', a second inner lens 1213'''''', a filter 1215'''''', and a sensor 1217''''''.

Similarly the elements corresponding to OCs 1204, 1208, 1214, 1218, 1224 which have the same focal lengths (intermediate) have been identified using the same reference numerals. The OC 1204 includes an outer opening 1233, a light redirection device 1235, e.g., mirror, positioned behind the opening 1233, a first inner lens 1237, a second inner lens 1243, a filter 1245, and a sensor 1247. Optical chain 1208 includes an outer opening 1233', a light redirection device 1235', e.g., mirror, positioned behind the opening 1233', a first inner lens 1237', a second inner lens 1243', a filter 1245', and a sensor 1247'. OC 1214 includes an outer opening 1233", a light redirection device 1235", a first inner lens 1237", a second inner lens 1243", a filter 1245", and a sensor 1247". OC 1218 includes an outer opening 1233''', a light redirection device 1235''', a first inner lens 1237''', a second inner lens 1243''', a filter 1245''', and a sensor 1247''' and the OC 1224 includes an outer opening 1233'''', a light redirection device 1235'''', a first inner lens 1237'''', a second inner lens 1243'''', a filter 1245'''', and a sensor 1247''''.

As discussed with regard to FIG. 4B, an optical chain such as the optical chain 1202 (or OCs 1206, 1210, 1212, 1216, 1220, 1222, 1204, 1208, 1214, 1218, 1224), that has a light redirection element, such as the element 1205, can be divided, for purposes of discussion, into two parts. The optical axis of the optical chain 1202 as seen from outside of the front of the camera is the optical axis of a first part 1201 (entering the OC from the front 1223 of the camera 600 via the outer opening 1203). Light traveling into the optical chain 1202 along the optical axis is redirected by the redirection element 1205 and traverses a second part 1209 of the first optical chain and reaches the sensor 1217. Similarly, the optical axis of the optical chain 1204 includes a first part 1211 and a second part 1219 after light redirection by the redirection element 1235, the optical axis of the optical chain 1206 includes a first part 1221 and a second part 1229, the optical axis of the optical chain 1208 includes a first part 1231 and a second part 1239, the optical axis of the optical chain 1210 includes a first part 1241 and a second part 1249, the optical axis of the optical chain 1212 includes a first part 1251 and a second part 1259, the optical axis of the optical chain 1214 includes a first part 1261 and a second part 1269, the optical axis of the optical chain 1216 includes a first part 1271 and a second part 1279, the optical axis of the optical chain 1218 includes a first part 1278 and a second part 1288, the optical axis of the optical chain 1220 includes a first part 1281 and a second part 1289, the optical axis of the optical chain 1222 includes a first part 1291 and a second part 1299, and the optical axis of the optical chain 1224 includes a first part 1292 and a second part 1298.

The other optical chains OCs 1226, 1228, 1230, 1232 and 1234 (smallest focal length OCs) while each having an outermost opening 1252, 1253, 1254, 1255, and 1256 respectively through which light enters, the OCs 1226, 1228, 1230, 1232 and 1234 do not have light redirection elements in the FIG. 7B example. While not shown in FIG. 7B the OCs 1226, 1228, 1230, 1232 and 1234 each has an optical axis which is perpendicular to the front face 1223 of the camera 600.

The function of the various elements of an OC such as the outer openings, inner lenses, mirror, filters and sensors, has been discussed earlier, for example in the discussion of FIGS. 4B and 5. Since the function of the elements of the OCs shown in FIG. 7B is the same or similar to that discussed with regard to FIGS. 4A-4B and 5, the discussion will not be repeated.

Light enters each of the OCs 1202, 1206, 1210, 1212, 1216, 1220, 1222, 1204, 1208, 1214, 1218, 1224 via their respective outer opening and is redirected by their respective redirection elements so that it reaches the respective sensors at the back of each of the optical chains. In many cases the outer opening through which the light enters the OC is referred to as the entrance pupil via which the light enters. For example, light entering through outer opening 1203 of the optical chain 1202 (e.g., from the front 1223 of the camera 600 as indicated by the first optical axis 1201) is redirected by mirror 1205 so that it passes through the first inner lens 1207, the second inner lens 1215 and the filter 1213 as it travels towards sensor 1217. More or less number of elements, e.g., lenses, filters etc., may be included in each of the OCs in some embodiments. Different optical chains may use different lenses while still using a sensor of the same shape and/or resolution as the other optical chains in the camera device 600.

It should be appreciated that the light redirection elements, e.g., such as a hinged mirror or other light redirection device such as a prism, positioned behind the entrance pupil or opening of an OC can be moved and/or rotated which results in changing of the optical axis of the OC seen from outside the outer openings of the corresponding OC. That is the optical axis of an optical chain as seen from outside the camera (discussed above as the optical axis of a first part such as optical axes 1201, 1211, 1231 etc.) can be changed by controlling the light redirection elements of the corresponding OC. Thus it should be appreciated that while in FIG. 7B example the optical axes 1201, 1211, 1221, 1231, . . . 1298, 1299 appear to be parallel, in some embodiments by controlling the light redirection element such as the mirror placed behind the outer opening in the corresponding optical chains, the optical axes can be changed such that the optical axes of one or more OCs are not parallel to each other. The ability to change the optical axis of the optical chain by controlling the movement of a mirror, provides the same effect as if the camera is being pointed in a given direction, e.g., to take pictures in that direction, and thus provides the ability to capture images from different perspectives without actually moving the camera device.

In some embodiments the camera 600 includes a processor (e.g., processor 110, 211) configured to generate a composite image by combining at least a first and a second image. In some embodiments the processor is configured to generate the composite image from first, second, third, fourth, fifth and sixth images. In some embodiments the processor is configured to generate the composite image from the first, second, third, fourth, fifth, sixth and seventh images. In some embodiments the processor is further configured to control storage of the generated composite image in the device memory, e.g., memory 108, and/or output of the composite image on a display, e.g., display 102, and/or transmission of the captured images or the composite image to another device via an interface such as interface 114.

Figure 8:
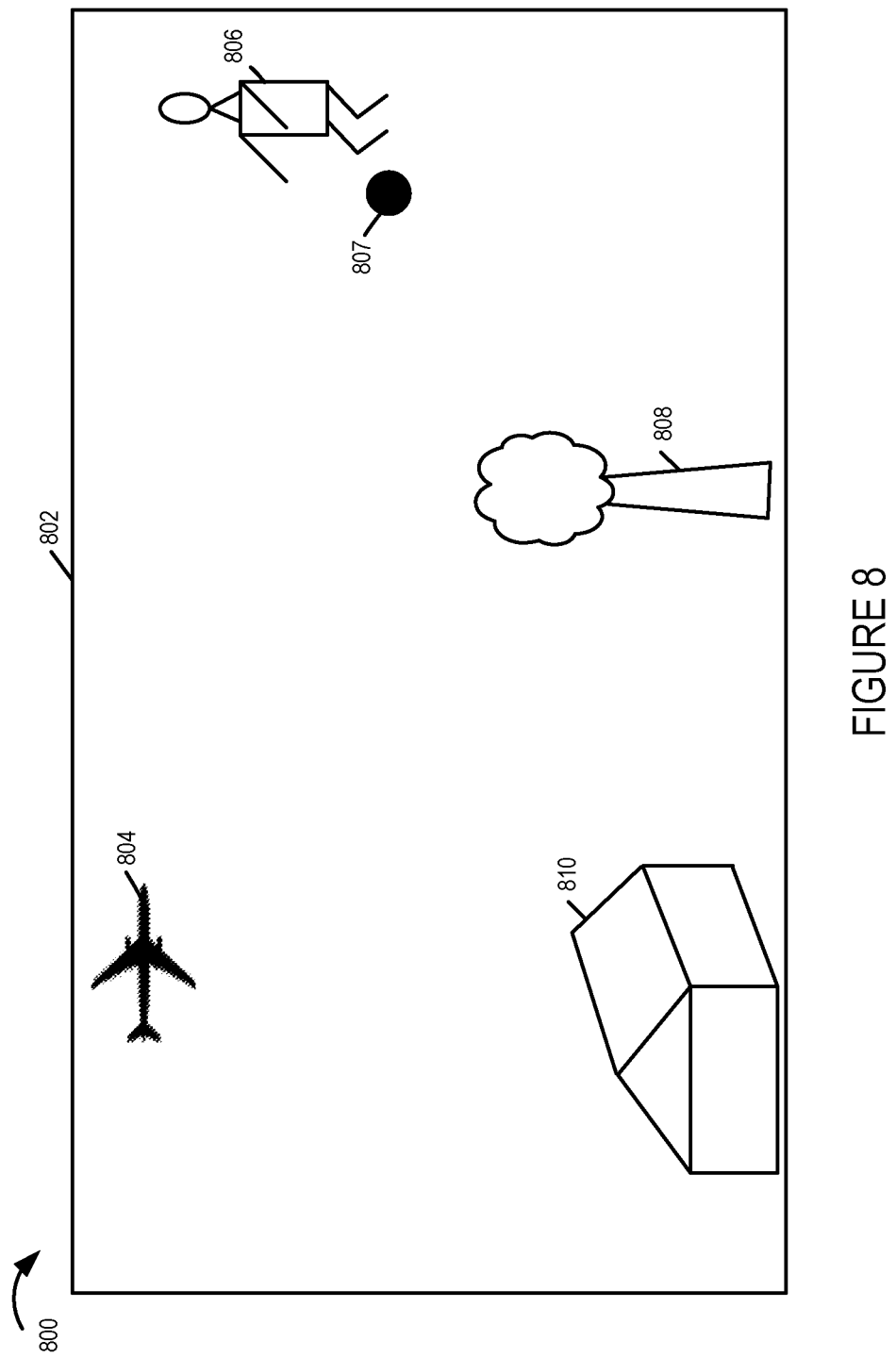
FIG. 8 shows an exemplary scene including a scene area which may have its image captured by camera modules of a camera implemented in accordance with one or more embodiments of the invention.

FIG. 8 is a drawing 800 illustrating an exemplary scene area 802 which may have all or portions of its image captured by camera modules of a camera implemented in accordance with one or more embodiments of the invention. Scene area 802 includes multiple objects at least some of which are stationary while others are in motion. In the example, the scene area 802 includes an airplane 804, a person 806, a ball 807, a tree 808 and a house 808. Each of the objects in the scene 802 may have a different corresponding depth in the scene 802.

Figure 9:
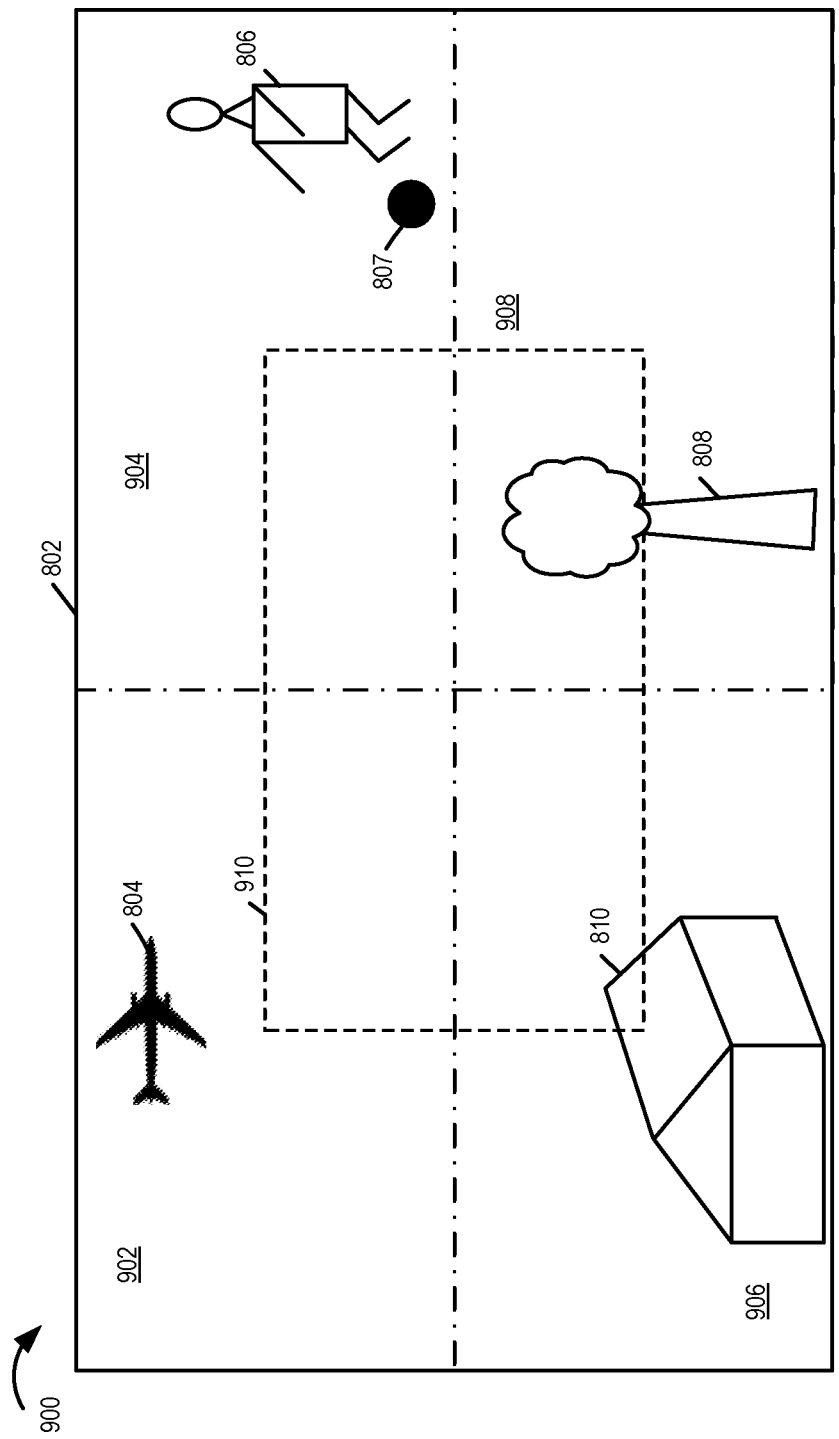
FIG. 9 shows how different camera modules of a camera including multiple camera modules may capture different portions of the scene area of interest shown in FIG. 8.

FIG. 9 is a drawing 900 illustrating conceptually how different optical chains, e.g., camera modules, of a camera, such as the camera device 600 of FIG. 6 which includes multiple optical chains (as shown in FIGS. 7A and 7B), some of which have different focal lengths can capture different size portions of a scene area 802. The different capture sizes corresponding to the various different camera modules correspond to field of view (FOV) of the respective camera modules in some embodiments.

For purposes of discussion, the capture and combining of images corresponding to different scene areas will be explained using the camera device 600 by referring to FIG. 7A which shows the arrangement of optical chains in camera 600. Consider for purposes of discussion that the camera device 600 includes the 17 modules arranged as shown in FIG. 7A. As previously discussed in the FIG. 7A example, three different focal lengths, f1, f2 and f3 are used where f1<f2<f3; f1 is ½ f2; and f2 is ½ f3.

For purposes of discussion the first through seventh camera modules 1202, 1206, 1210, 1212, 1216 1220, 1222, respectively, are the modules with the largest lenses (and thus largest apertures in various embodiments) and largest supported focal lengths (f3). For simplicity in the discussion below, it is further assumed that the distances between the various camera modules is much smaller than the distance between the camera and all the objects in the scene. This is however not a limitation of the described invention but meant only to make the explanation easier to follow.

The five medium sized camera modules which are the eighth through 12th camera modules correspond to reference numbers 1204, 1208, 1214, 1218, 1224, respectively and have medium diameter lenses and medium supported focal lengths (f2).

The five camera modules which are the 13th through 17th camera modules correspond to reference numbers 1226, 1228, 1230, 1230 and 1234 and have the smallest diameter lenses and smallest focal length (f1).

It should be appreciated that the camera modules with the largest focal length f3 will have a relatively smaller field of view in comparison to camera modules with smaller focal lengths and capture smaller portion of a scene area of interest given that they provide the greatest magnification. Assuming that camera modules of the different focal lengths use sensors with the same total pixel count, the modules with the larger focal length (f3) will provide an image with a higher pixel to scene area ratio since more pixels will be used to capture an image of a smaller scene area than will be the case with the medium (f2) and small focal length (f1) camera modules.

It should be appreciated that given the difference in magnification between the modules with different focal lengths (f1, f2, f3) the scene area captured by the small focal length (f1) camera modules will correspond to portion of the scene area of interest which is approximately 16 times the size of the portion the scene area of interest which is captured by the camera modules with the largest (f3) focal length. The portion of the scene area of interest captured by camera modules with the intermediate focal length (f2) will be 4 times the size of the portion of the scene area of interest captured by the camera modules with the largest focal length (f3) and ¼ the size of the portion of the scene area of interest captured by the camera modules with the smallest focal length (f1).

The relationship between the scene areas captured by camera modules corresponding to the f1 and f2 focal lengths can be appreciated in the context of the FIG. 9 example which shows 7 distinct scene areas. In some embodiments f=35 mm and f2=70 mm.

In the FIG. 9 example scene area of interest is identified by reference 802 as used in FIG. 8. The scene area 802 correspond to the full scene area of interest also shown in FIG. 8. For purposes of explanation consider that the scene area 802 is captured by optical chains having the focal length f1, i.e., by smaller focal length optical chains. Assume for discussion purposes that (f1) camera module 1228 is used to capture the scene area 802 represented by the largest rectangle in FIG. 9. Note that the actual image captured by 1228 may be of a slightly larger scene area to ensure that the scene area of interest is captured.

Further consider that f2 camera module 1204 is used to capture a second scene area 902 which is represented by the rectangle in the top left corner in FIG. 9, that (f2) camera module 1208 is used to capture a third scene area 904 represented by the rectangle in the top right corner in FIG. 9, that (f2) camera module 1218 is used to capture a fourth scene area 906 represented by the rectangle in the bottom left corner in FIG. 9, that (f2) camera module 1214 is used to capture a fifth scene area 908 represented by the rectangle in the bottom right corner in FIG. 9 and that (f2) camera module 1224 is used to capture sixth scene area 910 represented by the rectangle with dashed lines in the center portion. Again as with the capture of the other scene areas, the actual images captured by the modules 1204, 1208, 1218, 1214 and 1224 may be of slightly larger scene areas to ensure that the respective scene areas are fully contained in the captured images.

Note that the relative position of the outer openings of the camera modules shown in drawing 1200 are known and fixed in some embodiments. However, in some embodiments the modules 1204, 1208, 1218, 1214 and 1224 are the same or similar in there elements and function to the module 500 in FIG. 5 which includes a mirror 510 that can be driven, e.g., moved or rotated by the hinge (mirror) drive 516 to change the angle of the mirror 510. While the mirror drive 516 can rotate the mirror around the hinge axis and thus change its angle, the hinge 508 prevents motion in other directions and thus the optical axis (outside the camera) rotates in a plane perpendicular to the axis of the hinge. When the mirror 510 is at a 45 degree angle, the light entering the opening 512 along it's optical axis is deflected 90 degrees into the optical axis of Part B of the module 500. While we describe here a mirror 510 that is hinged and can rotate along an axis, in some other embodiments the place of the mirror is moved to a different plane such that this motion is not constrained to be rotation along any fixed axis. In this case the optical axis of the camera module can be made to point in any desired direction (towards any point in the scene of interest).

While some modules use mirror that are movable and hinged, in other embodiments one or more of the camera modules are implemented with fixed position mirrors allowing the moveable hinge 508 and mirror drive 516 to be omitted. For example, in one embodiment the camera modules used to capture the full scene area of interest have fixed mirrors while the camera modules used to capture small portions of the scene area of interest each include a movably hinged mirror. While combinations of camera modules with some having fixed mirrors and others having movable mirrors can be used, in at least one embodiment each of the multiple camera modules included in an exemplary camera device have movable mirrors.

Figure 34:
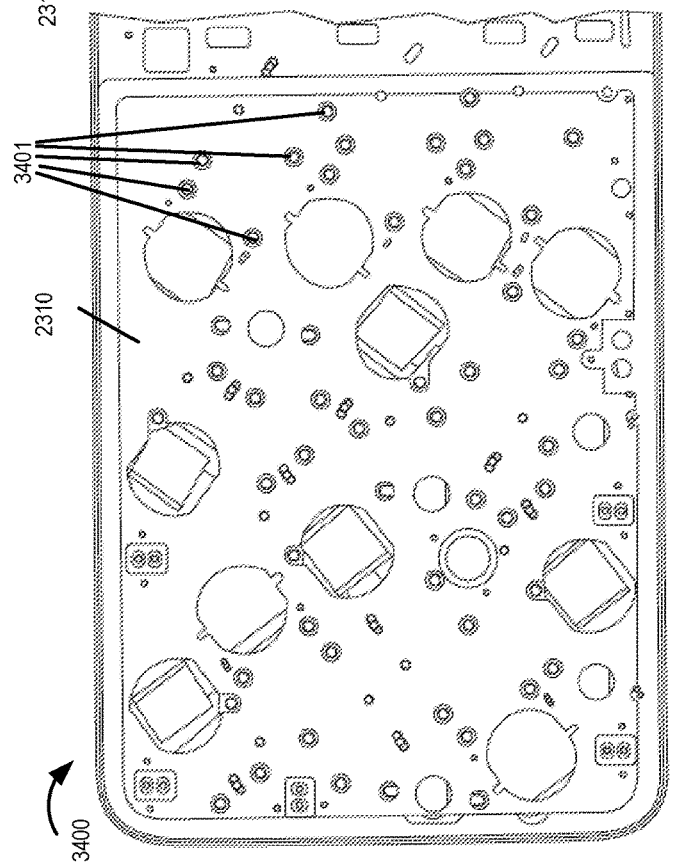
FIG. 34 illustrates a view from the front side of a partially populated rigid mounting board, said mounting board being partially populated with some camera modules.
Figure 36:
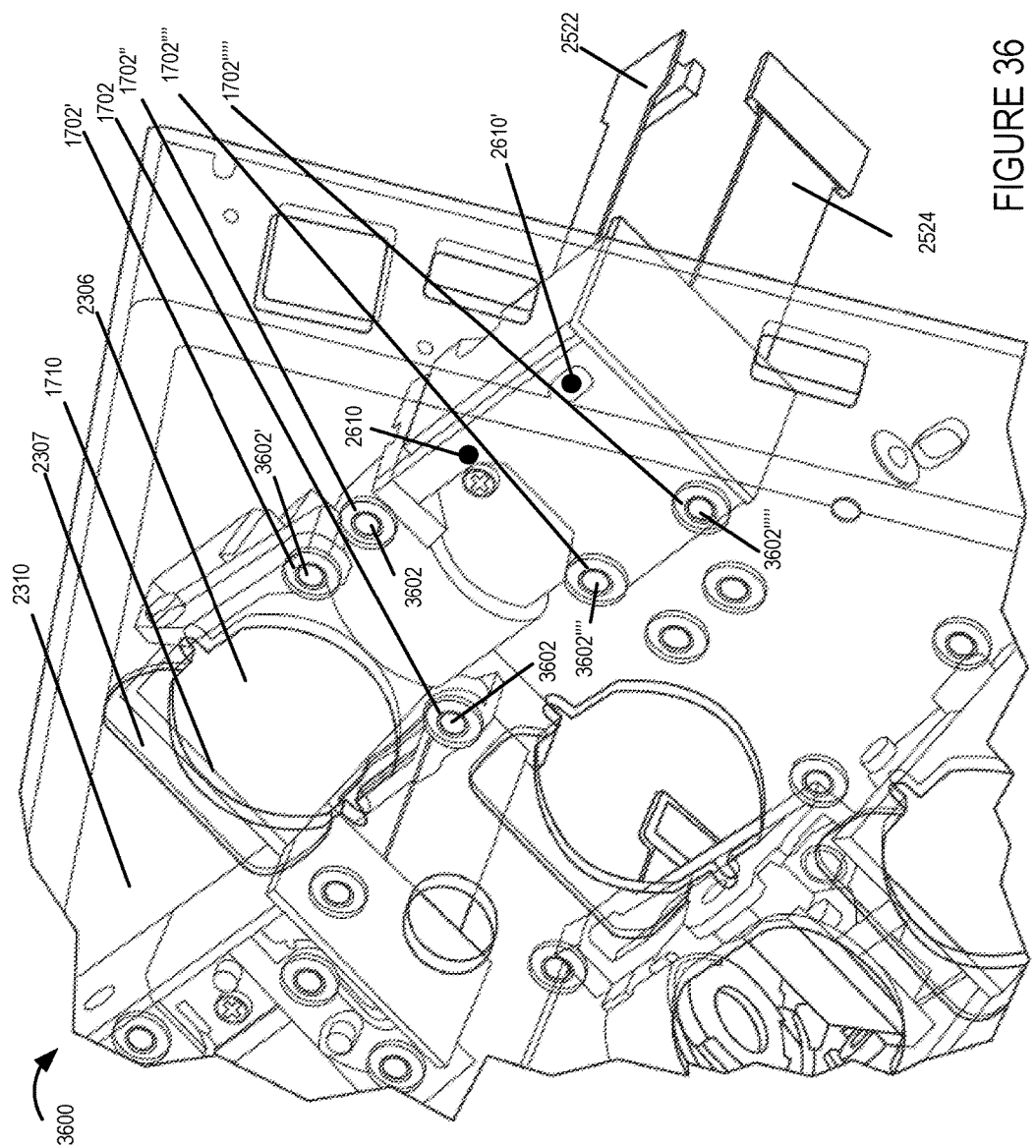
FIG. 36 illustrates a view from the front side of a partially populated rigid mounting board with the board being shown as transparent, said board being partially populated with camera modules, and identifies various features and/or aspects of the camera module, board and mounting.

The mirror/hinge drive 516 is controlled by the processor 110 depending on the particular mode of camera operation. Thus, when a user selects a first mode of operation one or more camera modules may have their mirrors at a first angle while during another mode of operation, e.g., a module in which images are to captured and combined as shown in FIG. 34, one or more camera modules will have their mirror driven to a different position under control of the processor 110. The particular mode of camera device operation may be determined based on user input by the processor 110 operating under control of the mode control module 111 or directly by the mode control module 111 when the mode control module is implemented in hardware.

If mirrors in each of 1204, 1208, 1218, 1214 and 1224 are at 45 degrees, each module looks directly out of the front face of the camera and their optical axes are all parallel. In this case each of the modules will take an image of the same scene area, e.g., the scene area 910 of FIG. 9. To capture an image of the second scene area with module 1204, the hinged mirror 510 of module 1204 is adjusted so that the optical axis of camera module 1204 points towards the center of the second scene area 3206. Note that the module 1204 is positioned in the camera 1200 in such a manner that as the mirror is rotated/moved relative around the hinge, the location in the scene area of interest 802 that the optical axis points to moves along the diagonals of the rectangle 802. Similarly, the mirror for camera module 1214 is adjusted to capture the fifth scene area. Note that in FIGS. 7A and 7B, camera modules 1204, 1214 are arranged proximate, e.g., along or adjacent, one diagonal while camera modules 1208, 1218 are located proximate, e.g., along or adjacent, the other diagonal. Rotating the mirror in 1214, e.g., changing the angle and thus incline of the mirror, makes the module's optical axis move along the corresponding diagonal. Mirrors of modules 1208 and 1218 are similarly angled, e.g., rotated, to capture images of the other scene areas respectively. The module 1224 used to capture the sixth image area 910 points at the center of the scene area of interest 802 so it's mirror is maintained at 45 degrees.

It should be appreciated from the above discussion that it is particularly beneficial to have at least some camera modules arranged along diagonals. These modules have the Part B of their optical axis parallel to one of the two diagonals. Thus, the arrangement of modules 1210, 1220, 2202, 1212 with the largest apertures along diagonals and also the arrangement of medium aperture modules 1204, 1214, 1208, 1208 along the same diagonals but offset from the other modules for space reasons, is an intentional design choice because it facilitates image capture and combining in some embodiments and modes of operation.

Based on the overlapping scene areas, e.g., 3210 and 3204 a depth map is generated, e.g., by the processor included in the camera in some embodiments. In some embodiments the depth of an object in the scene can be determined by examining the relative positions of an object in the images captured by different modules. In at least some embodiments the depth map is used, e.g., in combination with information about the relative position of the outer opening of the different optical chains and/or optical axis of the optical chains in combining images captured by the different optical chains to form a composite image. The use of the depth information in the generation of the composite image allows for the correction of parallax, perspective and/or other image distortions that may occur or which are present in the images. While depth map may be generated using images captured by camera modules in some embodiments, in other embodiments a depth map may be generated using other techniques, e.g., using depth information generated using a depth sensing equipment and/or using a LIDAR. Thus it should be appreciated that a depth map corresponding to a scene area may be obtained in a variety of ways.

In the FIG. 9 example, 6 distinct scene areas are shown for purposes of explaining the invention. Each of the 6 scene areas may be, and in some embodiments is, captured by a different optical chain of the camera device 600 shown in drawing 1200 prior to being combined. The camera modules, as will be discussed below, can capture images at the same time, e.g., in parallel. However, in some embodiments as will be discussed below where rolling shutters are used the camera modules are controlled to capture portions of the scene area of interest in a synchronized manner so that all the different camera modules which capture a given portion of a scene area of interest will capture the given portion at the same time.

It should be appreciated that by combining images corresponding to the different scene area portions shown in FIG. 9 to generate a composite image, it is possible to generate a composite image with four times the pixel count of a single image sensor. For example, if each of the image portions is captured by a camera module using an 8 mega pixel sensor, the composite image corresponding to the scene area of interest shown in FIG. 9 would have an overall pixel count of 32 megapixels since the second, third, fourth and fifth scene area would each be captured by a different 8 megapixel sensor and thus contribute 8 megapixels to the composite image. The actual resolution could be slightly lower if the captured images are slightly larger than the corresponding scene areas.

While the sensors used to capture the first and fourth scene areas are not likely to result in an increase in the overall pixel count of the composite image since they correspond to the same image area as that captured by the combination of sensors used to capture the second, third, fifth and sixth scene areas, they provide for increased light capture than would be possible without the use of the f1 lenses and also provide important information which allows for the generation a depth map and which provide images of the overall scene area which can be used in aligning and stitching together the images corresponding to the second, third, fifth and sixth scene areas as part of the process of generating the composite image.

In some embodiments the large focal length (f3) camera module, e.g., 1216, is used to capture the image of the center portion of the area of interest such that its center coincides with the center of the image area of interest. Since practically most lenses have the least aberrations and best image quality at the center of their field of view, this ensures that the center of the scene area of interest is imaged at high quality by the camera module of large focal length capturing center portion. The imaging of the scene area corresponding to the center portion of the scene of interest 802 also increases the total amount of light energy captured at the center of the scene area of interest. This allows the composite image generated from the captured images to have its best quality (high resolution and minimum noise) at the center of the scene area of interest.

FIG. 9 and the image portions, e.g., the scene areas, shown therein will be used in explaining how rolling shutters corresponding to different camera modules can be controlled in a coordinated manner to facilitate combining of images captured by different camera modules in a way that reduces or minimize motion related (camera or subject related) distortions that may be introduced if each of the camera module sensors were independently (asynchronously) operated to capture the image portions. The read out from the sensors of the camera modules in a coordinated manner helps in minimizing distortions due to uncoordinated asynchronous image capturing by different optical chains and the captured images can be combined easily.

The above discussed image capture operations performed by various sensors included in corresponding optical chains as discussed above may, and in some embodiments is, performed by a camera such as camera 600 including optical chains arranged as illustrated in FIGS. 7A and 7B.

FIGS. 10-16 show an exemplary handheld camera implemented in accordance with one exemplary embodiment. The exemplary camera includes camera modules camera modules corresponding to 3 different focal lengths, e.g., 35 mm focal length modules, 70 mm focal length modules, and 150 mm focal length modules. In some but not necessary all embodiments the camera focal length is expressed as a 35 mm equivalent focal length. The 35 mm equivalent focal length is a measure that indicates the angle of view of a particular combination of a camera lens and film or sensor size. The term is useful because most photographers experienced with interchangeable lenses are most familiar with the 35 mm film format. The camera also includes 4 depth sensors and a range finder and a flash unit. The range finder is an array based sensor capable of measuring depths to multiple objects corresponding to the area which may be captured by the image. The depth sensors measure a single depth and may be used to detect a hand being placed over the sensor or an object nearby. The depth sensors and range finder may be IR based devices. In some embodiments the range finder is used for focus control. In addition to the elements shown in FIG. 10 and the other figures showing the components of the FIG. 10 camera embodiment the camera can, and in some embodiments does include a processor, memory and various control circuits such as shown in any of FIGS. 1, 3 and 4. In some embodiments the camera device shown in FIG. 10 includes the elements shown in FIG. 1.

Figure 10:
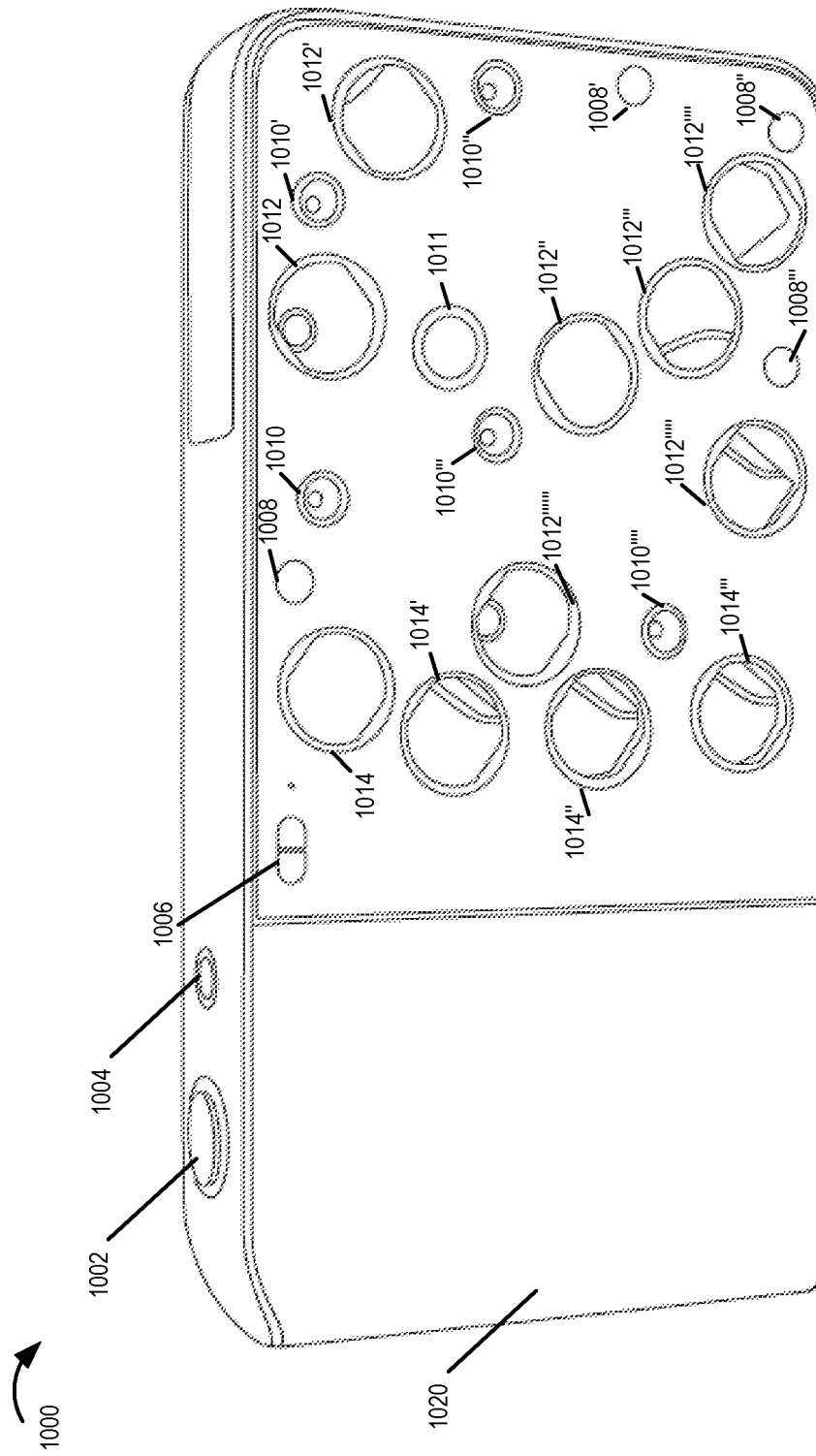
FIG. 10 is a front/top perspective view of an exemplary camera implemented using various modules and components shown in the other figures.

FIG. 10 is a front/top perspective view of an exemplary camera 1000 implemented using various modules and components shown in the other figures. Exemplary camera 1000 is a handheld camera with camera modules corresponding to 3 different focal lengths, 4 depth sensors, a range finder and a built in flash unit. Camera 1000 includes a shutter control 1002, a power button 1004, a flash 1006, depth sensors (1008, 1008', 1008'', 1008'''), 35 mm camera module lens openings (1010, 1010', 1010'', 1010''', 1010''''), a range finder—distance sensor 1011 with an array of sensors, 70 mm camera module lens openings (1012, 1012', 1012'', 1012''', 1012'''', 1012''''', 1012''''''), 150 mm camera module lens openings (1014, 1014', 1014'', 1014'''), a battery compartment 1020 with the outside shaped to serve as a camera grip. The 70 mm camera modules and the 150 mm camera modules include movable mirrors. The 35 mm camera modules do not include mirrors. In some, but not necessarily all embodiments, no lenses are included before mirrors of 70 and 150 mm camera modules and openings are covered with a flat plate of glass or plastic.

Figure 11:
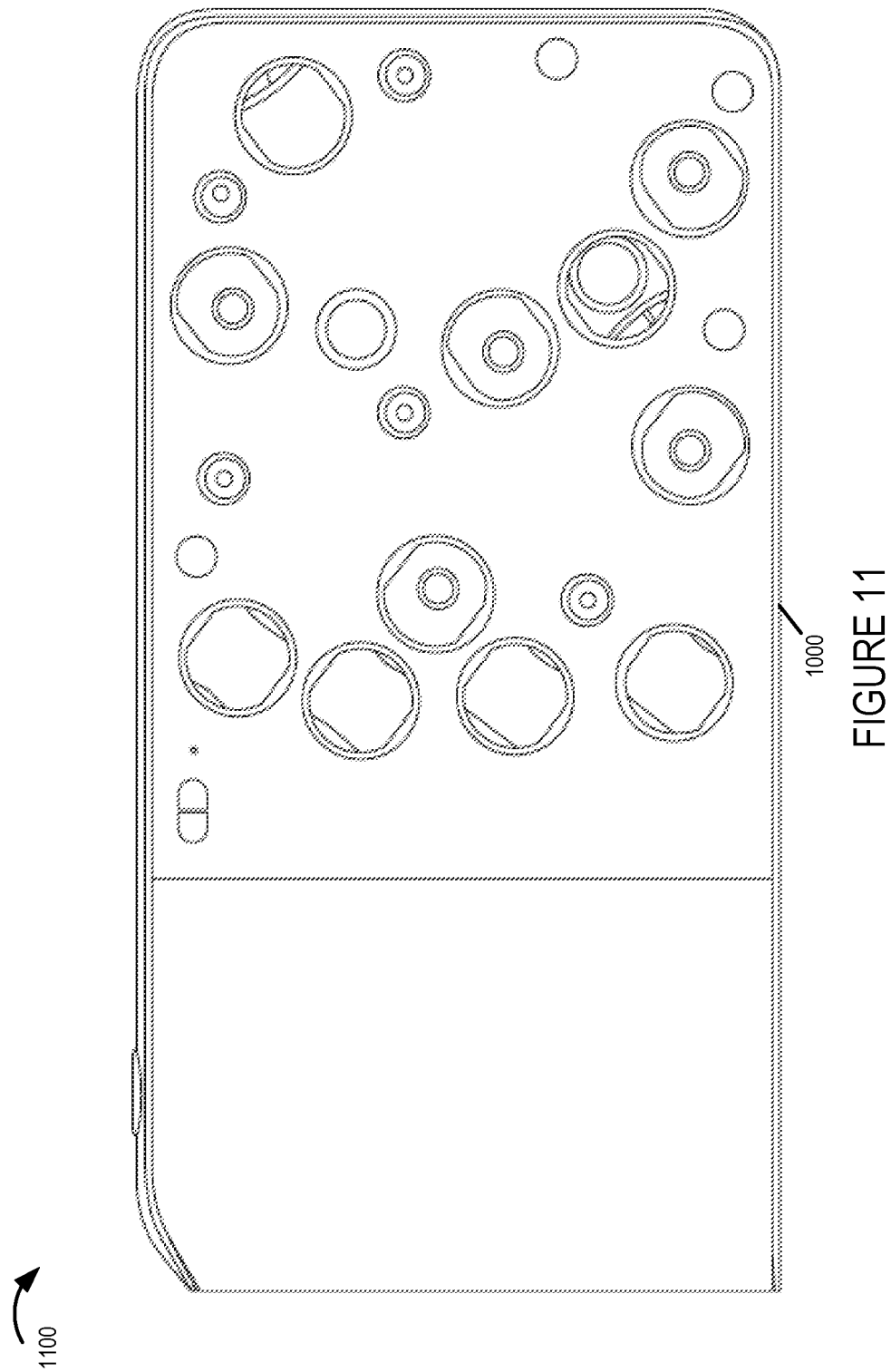
FIG. 11 is a front view of the exemplary camera shown in FIG. 10.

FIG. 11 is a front view 1100 of the exemplary camera 1000 shown in FIG. 10.

Figure 12:
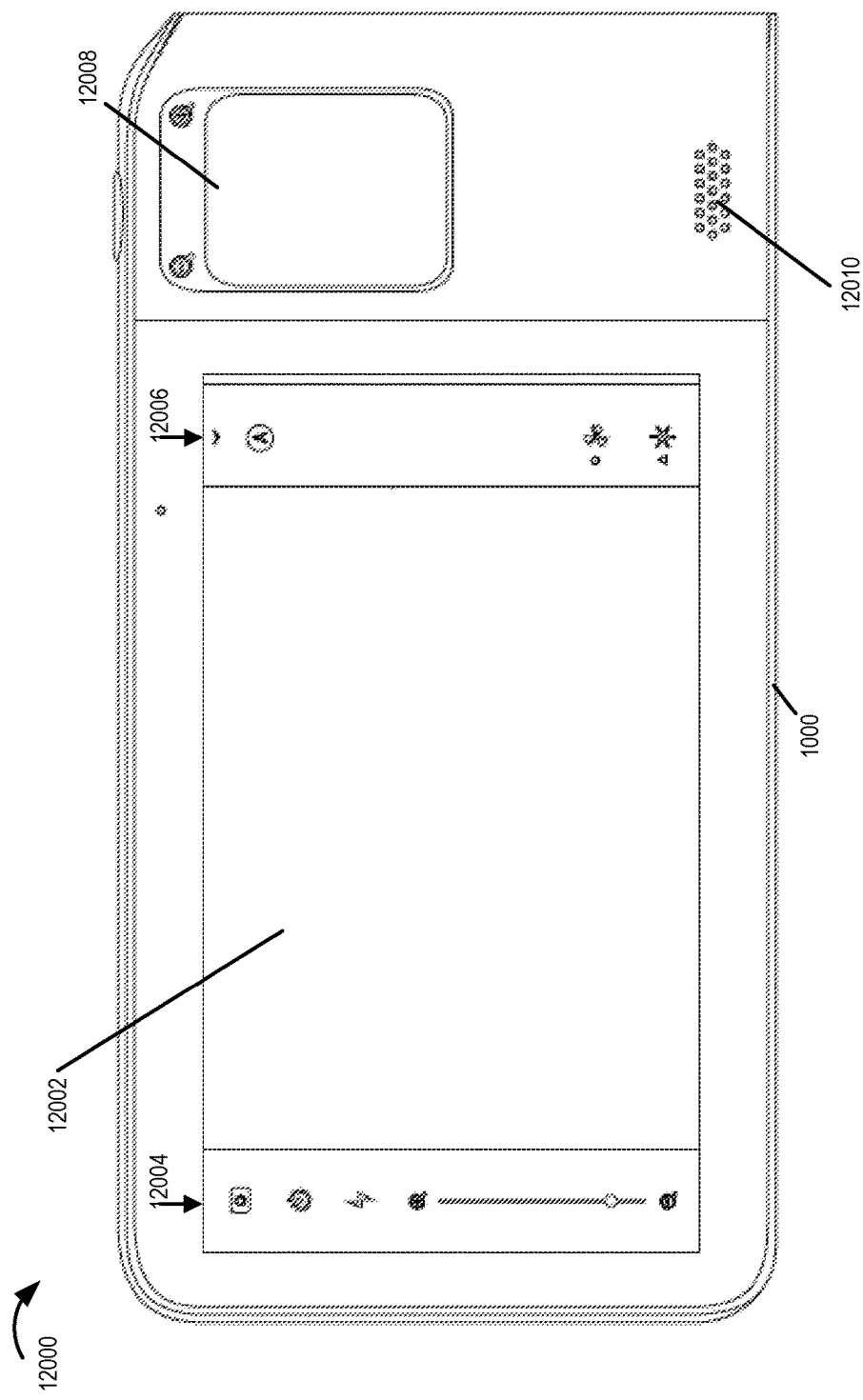
FIG. 12 is a rear view of the exemplary camera shown in FIG. 10.

FIG. 12 is a rear view 12000 of the exemplary camera 1000 shown in FIG. 10. The exemplary camera 1000 includes a display 12002, touch controls (12004, 12006) shown on the display 12002, a touch sensor pad 12008, and a microphone 12010.

Figure 13:
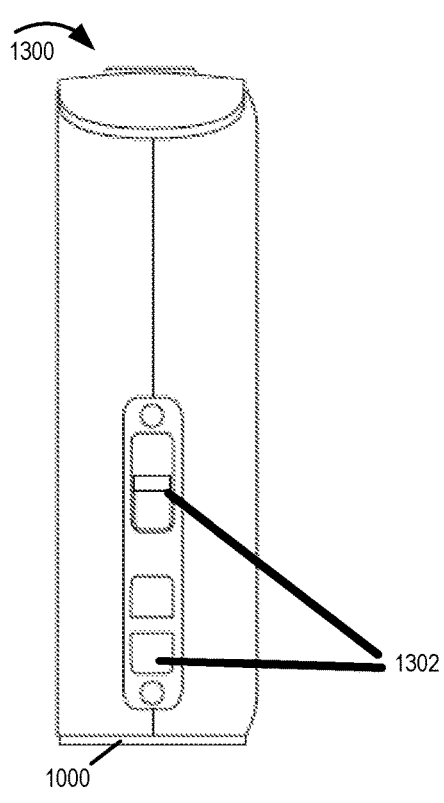
FIG. 13 is a right side view of the exemplary camera shown in FIG. 10.

FIG. 13 is a right side view 1300 of the exemplary camera 1000 shown in FIG. 10. Camera 1302 includes a strap mount 1302.

Figure 14:
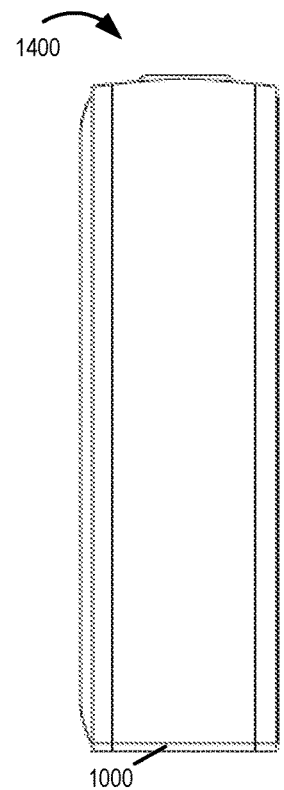
FIG. 14 is a left side view of the exemplary camera shown in FIG. 10.

FIG. 14 is a left side view 1400 of the exemplary camera 1000 shown in FIG. 10.

FIG. 15 is a top plan view 1500 of the exemplary camera 1000 shown in FIG. 10. Camera device 1000 includes shutter control 1002, and power button 1004.

FIG. 16 is a bottom view 1600 of the exemplary camera 1000 shown in FIG. 10. Camera device 1000 includes a speaker connector 1602, a USB connector 1604 and a tripod mount 1606.

Figure 17:
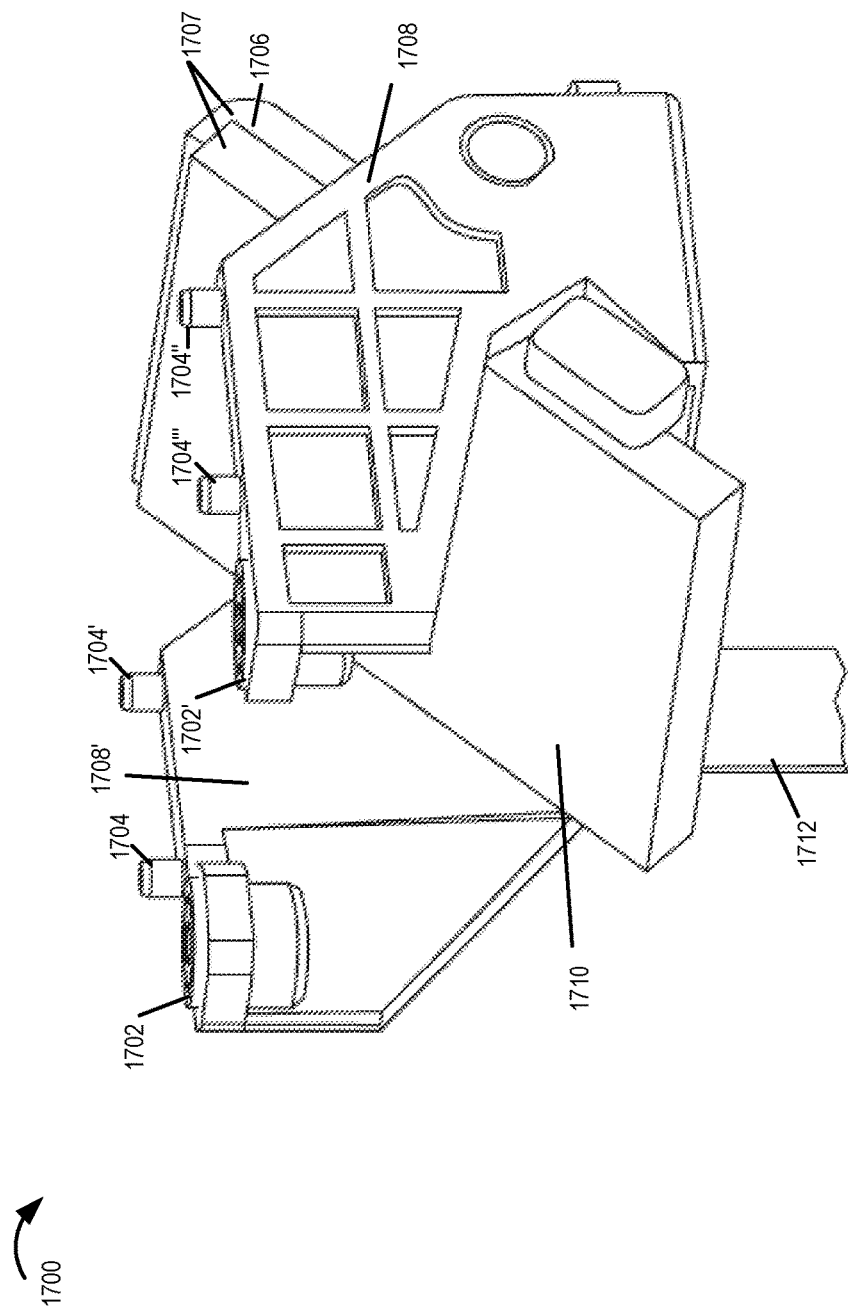
FIG. 17 illustrates a movable mirror assembly and mirror supports included in an exemplary 150 mm camera module.

FIG. 17 is a drawing 1700 illustrating a movable mirror assembly 1707 for a 150 mm camera module, mirror supports (first mirror side support 1708, second mirror side support 1708'), and a flexible printed circuit board/tape 1712 for mirror position control. The movable mirror assembly 1707 includes a mirror 1707 and a mirror support cradle 1706. The mirror 1710 is mounted in the mirror cradle support 1706. First side support 1708 includes locator pins (1704'', 1704'''). Second side support 1708' includes locator pints (1704, 1704'). First side support 1708 includes threaded mounting screw hole 1702', e.g., with a metal threaded insert. Second side support 1708' includes threaded mounting screw hole 1702, e.g., with a metal threaded insert. In FIG. 17, the movable mirror assembly 1707 is shown within the side supports (1708, 1708').

Figure 18:
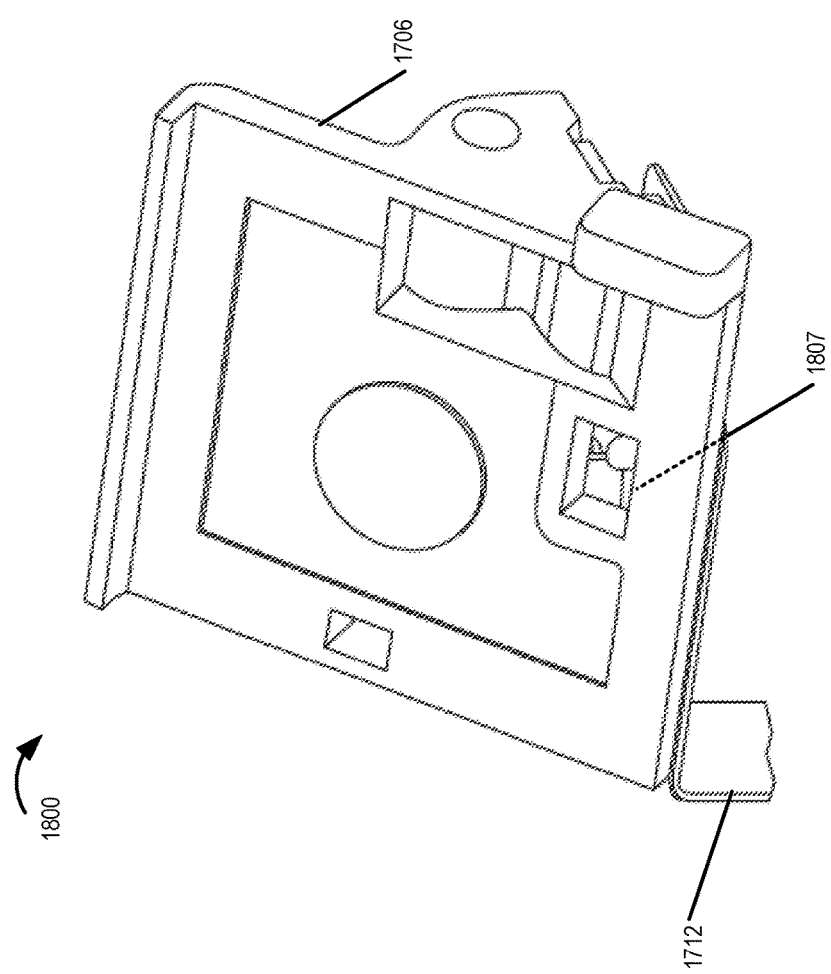
FIG. 18 illustrates a mirror cradle support included in an exemplary 150 mm camera module.

FIG. 18 is a drawing 1800 illustrating the mirror support cradle 1706 and the flexible printed circuit board/tape 1712 for mirror position control. Drawing 1800 also identifies a first portion 1807 of the mirror assembly 1707.

Figure 19:
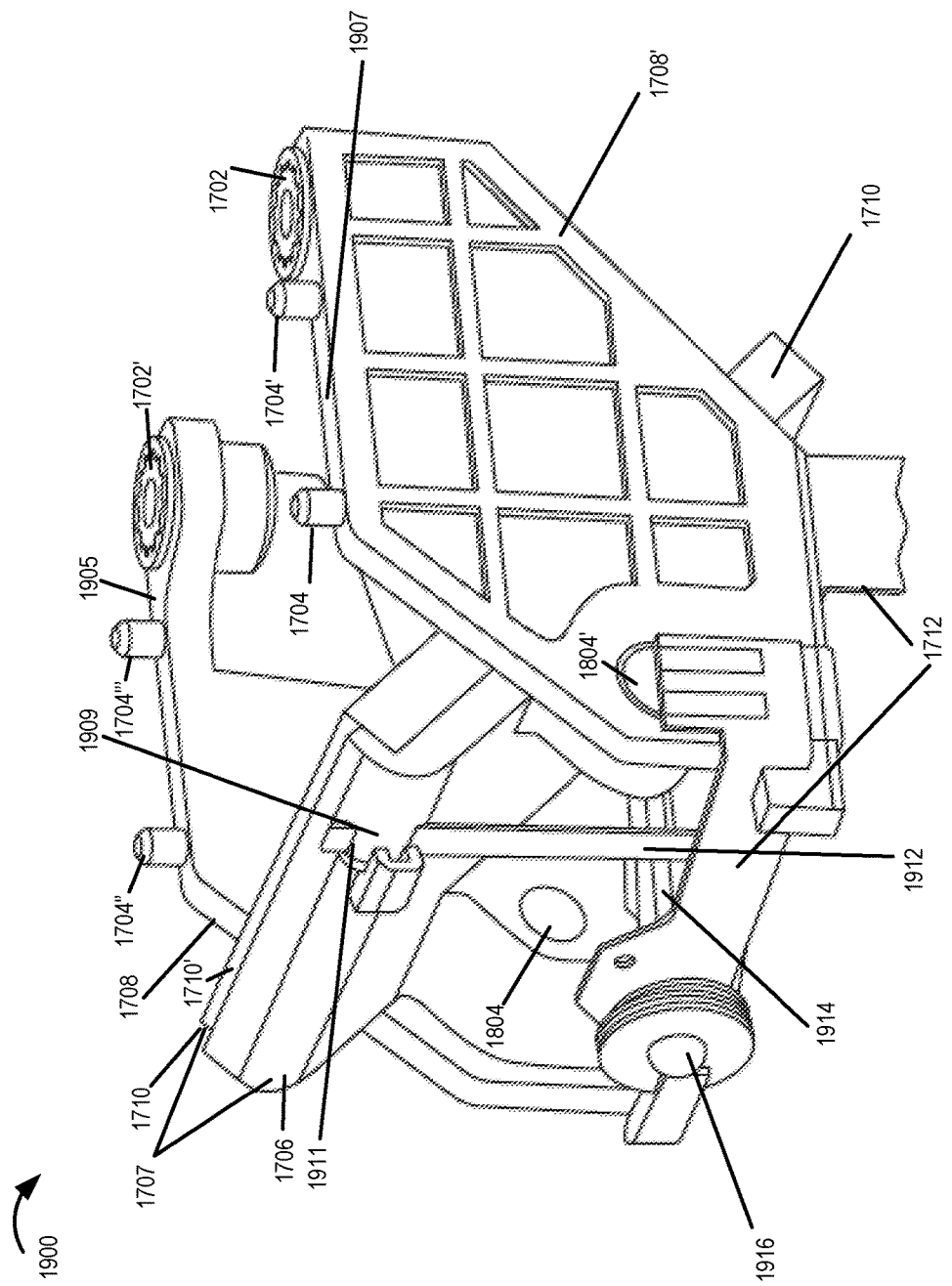
FIG. 19 illustrates a view of a movable mirror portion an exemplary 150 mm camera module and identifies components, features and/or aspects of the movable mirror portion.

FIG. 19 is drawing 1900 illustrating the movable mirror assembly 1707 for a 150 mm camera module, mirror supports (first side support 1708, second side support 1708'), a mirror return spring 1912, a piezo electric actuator 1916, a mirror drive rod 1914, flexible printed circuit board/tape 1712 for mirror position control, and mirror pivot rods (1804, 1804'). The moveable mirror assembly 1707 includes mirror 1710 mounted in mirror support cradle 1706. The moveable mirror assembly 1707 is shown within the side supports (1708, 1708').

Drawing 1900 further illustrates that the top 1905 of the first mirror support 1708 includes locator pins (1704'', 1704''') and threaded mounting screw hole 1702', e.g., with a metal threaded insert. Drawing 1900 further illustrates that the top 1907 of the second mirror support 1708' includes locator pins (1704, 1704') and threaded mounting screw hole 1702, e.g., with a metal threaded insert.

The piezo electric actuator 1916, which is a linear actuator, exerts a linear force on the first portion 1807 of the mirror assembly 1707, to control rotation of the mirror assembly 1707. The mirror pivot rods (1804, 1804'), which are pivots, are attached to the mirror assembly 1707 and inserted into the mirror supports (1708, 1708'), respectively, allowing the mirror assembly 1707 to rotate with respect to the mirror supports (1708, 1708'). The mirror drive rod 1914 is for transferring linear force generated by the linear actuator 1916 onto said first portion 1807 of the mirror assembly 1707. In some embodiments, the mirror drive rod 1914 makes contact with the first portion 1807 of the mirror assembly 1707 and presses against the first portion 1807 of said mirror assembly 1707 but is not attached to the first mirror assembly 1707.

The mirror return spring 1912 is a flat piece of spring metal inserted into a spring retaining slot 1911 in a second portion 1909 of the mirror assembly 1707. The first portion 1807 of the mirror assembly 1707 is a lower portion on the mirror assembly than the second portion 1909 of the mirror assembly 1707, and the second portion 1909 of the mirror assembly 1707 is an upper portion of the mirror assembly 1707. The mirror return spring 1912 exerts a force contrary to the force of the actuator 1912.

In this example, the actuator 1916, via the drive rod 1914, pushes the bottom of the mirror assembly 1707 including mirror 1710. In other embodiments, the controlled movement of the mirror is done differently, e.g., the force is applied at a different location.

The top 1710' of the mirror 1710 can, and sometimes does, extend above the top (1905, 1907) of the side supports (1708, 1708').

Figure 20:
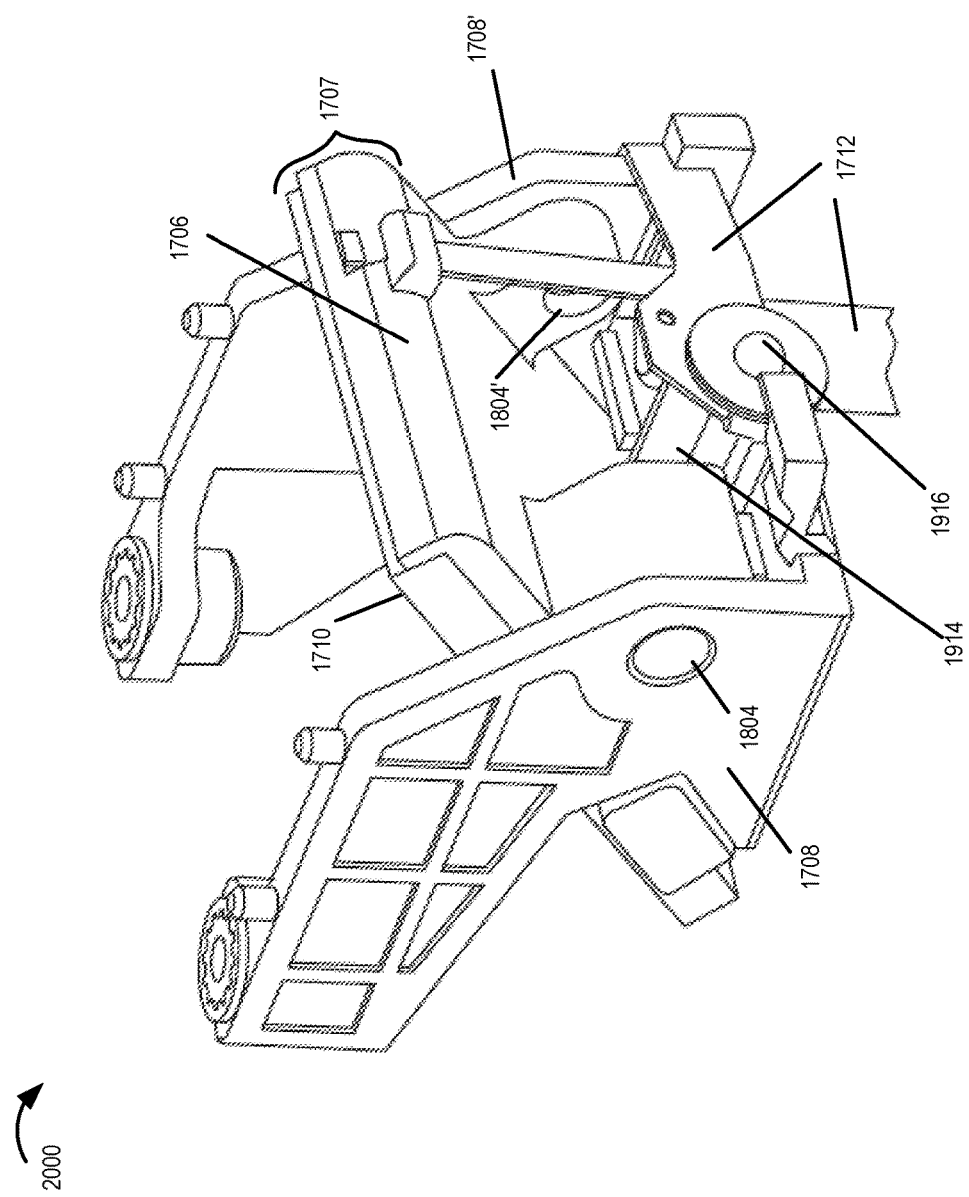
FIG. 20 illustrates another view of the movable mirror portion of an exemplary 150 mm camera module and identifies additional components, features and/or aspects of the movable mirror portion.

FIG. 20 is a drawing 2000 illustrating another view of the moveable mirror assembly 1707 for a 150 mm camera module, including the mirror cradle 1706 and mirror 1710, within mirror side supports (1708, 1708'). Drawing 2000 further illustrates the pivot pins (1804, 1804'), the piezoelectric linear actuator 1916, the mirror drive rod 1914, and flexible printed circuit board/tape 1712 for mirror position control.

Figure 21:
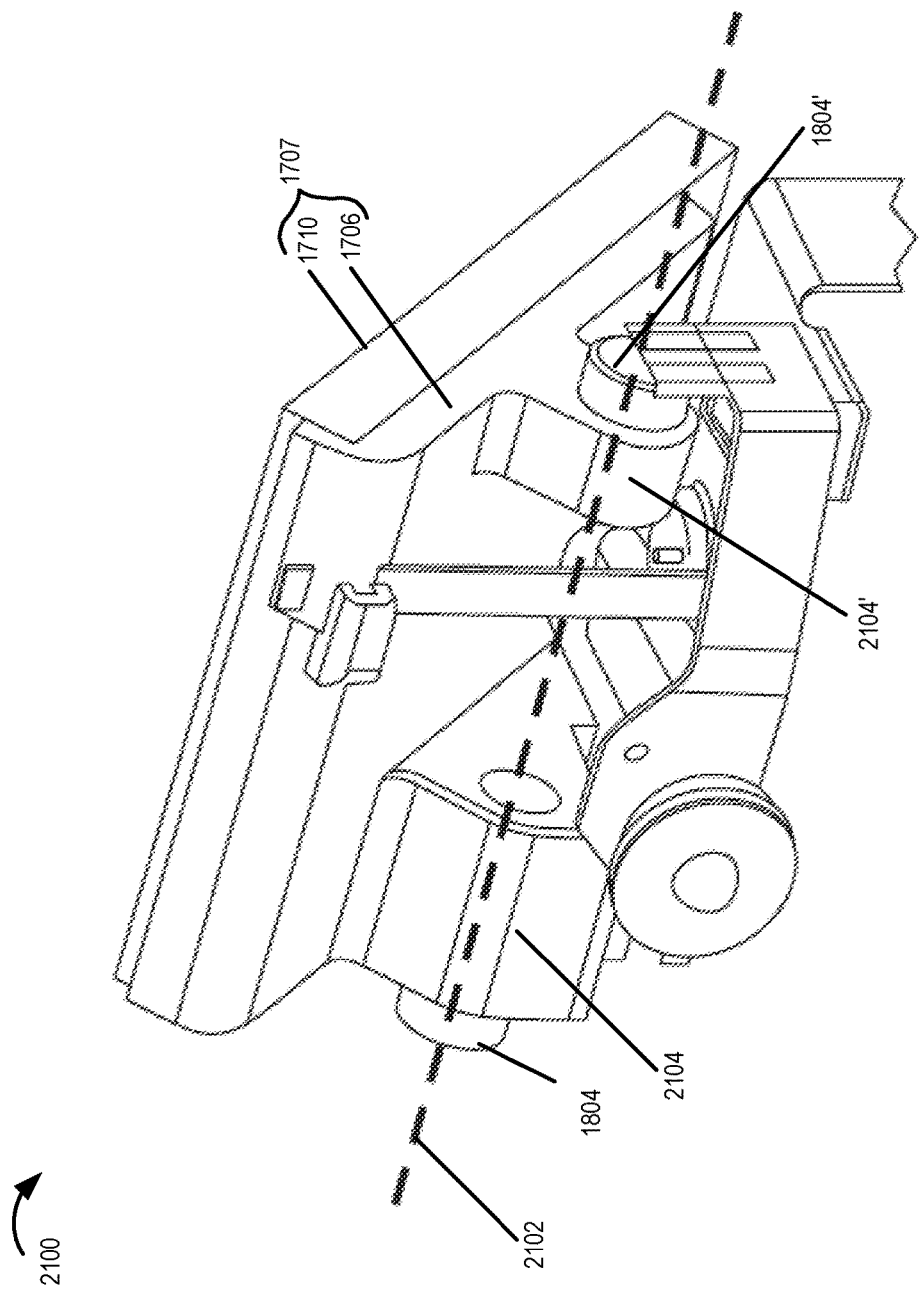
FIG. 21 illustrates another view of the movable mirror portion of an exemplary 150 mm camera module and identifies additional components, features and/or aspects of the movable mirror portion.

FIG. 21 is a drawing 2100 illustrating the moveable mirror assembly 1707 including mirror 1710 within mirror support cradle 1706. Drawing 2100 illustrates mirror pivot axis 2102 which goes through mirror pivots (1804, 1804'). The moveable mirror assembly 1707 rotates about mirror pivot axis 2102. In some embodiments, the mirror pivot hinge formed by mirror pivot shafts (1804, 1804') and pivot shaft support mounts (2104, 2104') on the mirror holder, which is mirror cradle 1706, is not at the center of the mirror 1710. In some embodiments, the mirror 1710 is larger on the upper side of the mirror pivot than below the mirror pivot.

Figure 22:
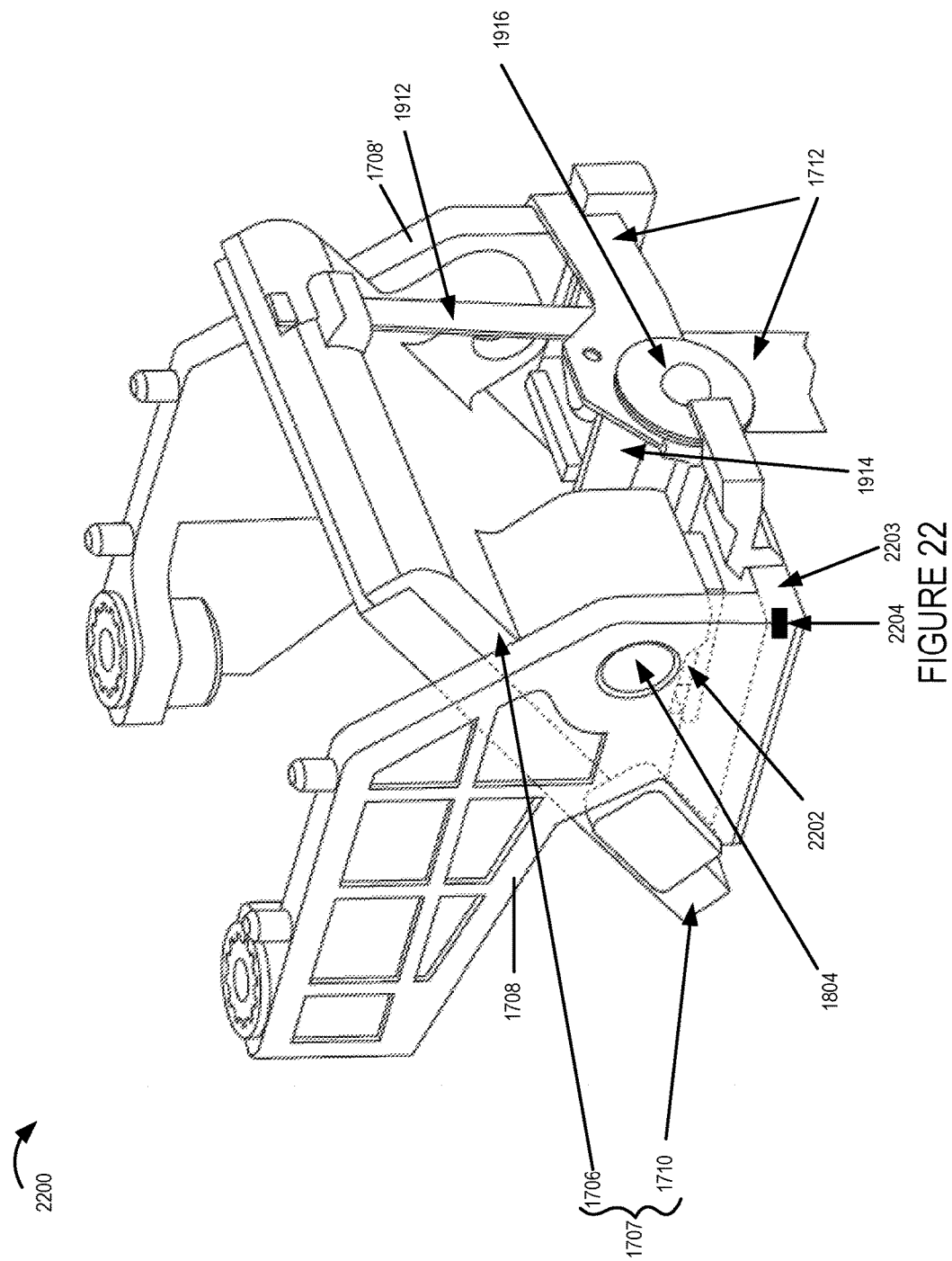
FIG. 22 illustrates another view of the movable mirror portion of an exemplary 150 mm camera module and identifies additional components, features and/or aspects of the movable mirror portion.

FIG. 22 is a drawing 2200 illustrating the movable mirror assembly 1707 including mirror 1710 within support cradle 1706, mirror supports (1708, 1708'), support base 2203, pivot pin 1804, linear actuator 1916, mirror drive rod 1914, spring strip 1912, mirror control FPC 1712, a hall sensor magnet 2202 and a hall sensor position encoder 2204. The mirror drive rod 1914 moves the mirror 1710 as the actuator 1916 moves in/out.

The mirror side supports (1708, 1708') are attached to the support base 2203. The hall sensor 2204 is mounted on or within the support base 2203. The hall sensor magnet 2202 is mounted on or within the mirror support cradle 1706. The hall sensor 2204 detects the position of the magnet 2202 on mirror support cradle 1706 relative to the sensor 2204. In some embodiments, the hall sensor 2204 is a hall sensor position encoder which generates signal based on distance to the hall sensor magnet 2202.

In some embodiments, the hall sensor 2204 detects the position of the magnet 2202 on mirror support cradle 1706 relative to the sensor 2204, and the encoder, e.g., included in sensor 2204, encodes detected position information and communicates the encoded information via an electrical signal to the mirror position controller and/or processor in the camera via the mirror control flexible printed circuit 1712 to allow for detection of mirror position and closed loop position control of the actuator 1916 based on the position feedback from the sensor 2204.

In various embodiments, the encoder is mounted to the FPC (flexible printed circuit) and is stationary. The magnet attached to the bottom holder of the mirror moves when the Tule (actuator) shaft/rod pushes the mirror at the lower edge. The encoder gives the linear displacement number due to magnet motion which is converted to angular displacement.

FIG. 23 is a drawing 2300 illustrating a rigid mounting board 2310, e.g., an aluminum chassis as viewed from the rear of a camera. Drawing 2300 illustrates 35 mm camera module openings (2302, 2302', 2302"), 70 mm module openings (2304, 2304', 2304"), 150 mm module openings (2306, 2306', 2306", 2306''', 2306"", 2306'''''), recess for mirror (2307, 2307', 2307", 2307''', 2307"", 2307'''''), support pillar/standoff (2305, 2305') for mounting PC boards with processor, display, etc., range finder opening 2341, and depth sensor opening 2342.

FIG. 24 is a drawing illustrating a portion of drawing 2300 including rigid mounting board 2310, 150 mm camera module openings (2306', 2306"), recess for mirror (2307', 2307"), 70 mm camera module opening (2304'), an exemplar screw hole 2402 for receiving a screw with the head side corresponding to the front of the camera, and exemplary locator pin holes (2404, 2406).

Figure 25:
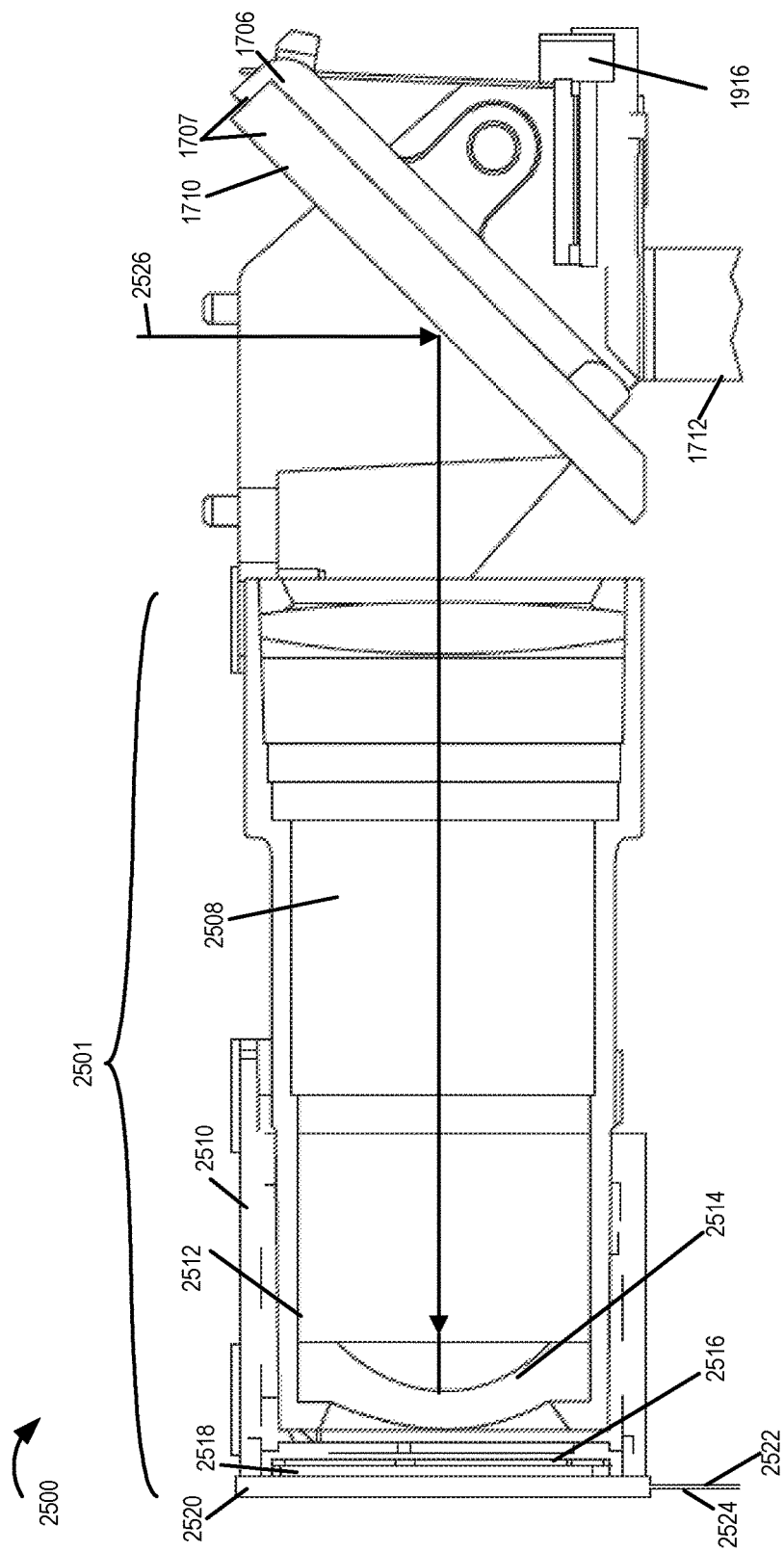
FIG. 25 illustrates a cutaway view of an exemplary 150 mm camera module, including a movable mirror portion and a lens barrel portion, and identifies components, features and/or aspects of the camera module.

FIG. 25 is a drawing 2500 illustrating components of an exemplary camera module, e.g., a 150 mm focal length camera module. The camera module includes a lens barrel assembly 2501, IR filter 2516, image sensor 2518, sensor mounting board 2520, barrel control assembly FCP 2522 and sensor FCP 2524. The lens barrel assembly 2501 includes lens barrel 2508, lens barrel holder 2510, a lens barrel drive motor 2512, and lens 2514. In the exemplary camera module of drawing 2500 mirror 1710 and mirror support cradle 1706, pizezo electric actuator 1916 and mirror control FPC 1712 are also shown.

Lens barrel 2508 includes one or more lens movable mounted in the barrel holder 2510 allowing the barrel position control motor 2512 to drive the barrel in or out of holder 2510 to change the distance of one or more lenses to the sensor 2518. Barrel control assembly FCF 2522 couples the barrel drive motor 2512 to a processor which controls barrel position. The lens barrel drive motor 2512 is positioned under the lens barrel 2508 and coupled to the lens barrel FCB 2522 for driving the lens barrel 2508 in and out under processor control.

The IR filter 2516 is over the sensor 2518. The sensor 2518 is mounted in the sensor mounting board 2520. The sensor FCP 2524 couples the image sensor 2518 to an image processor of the camera.

In FIG. 25, and exemplary light path 2526 is also shown.

Figure 26:
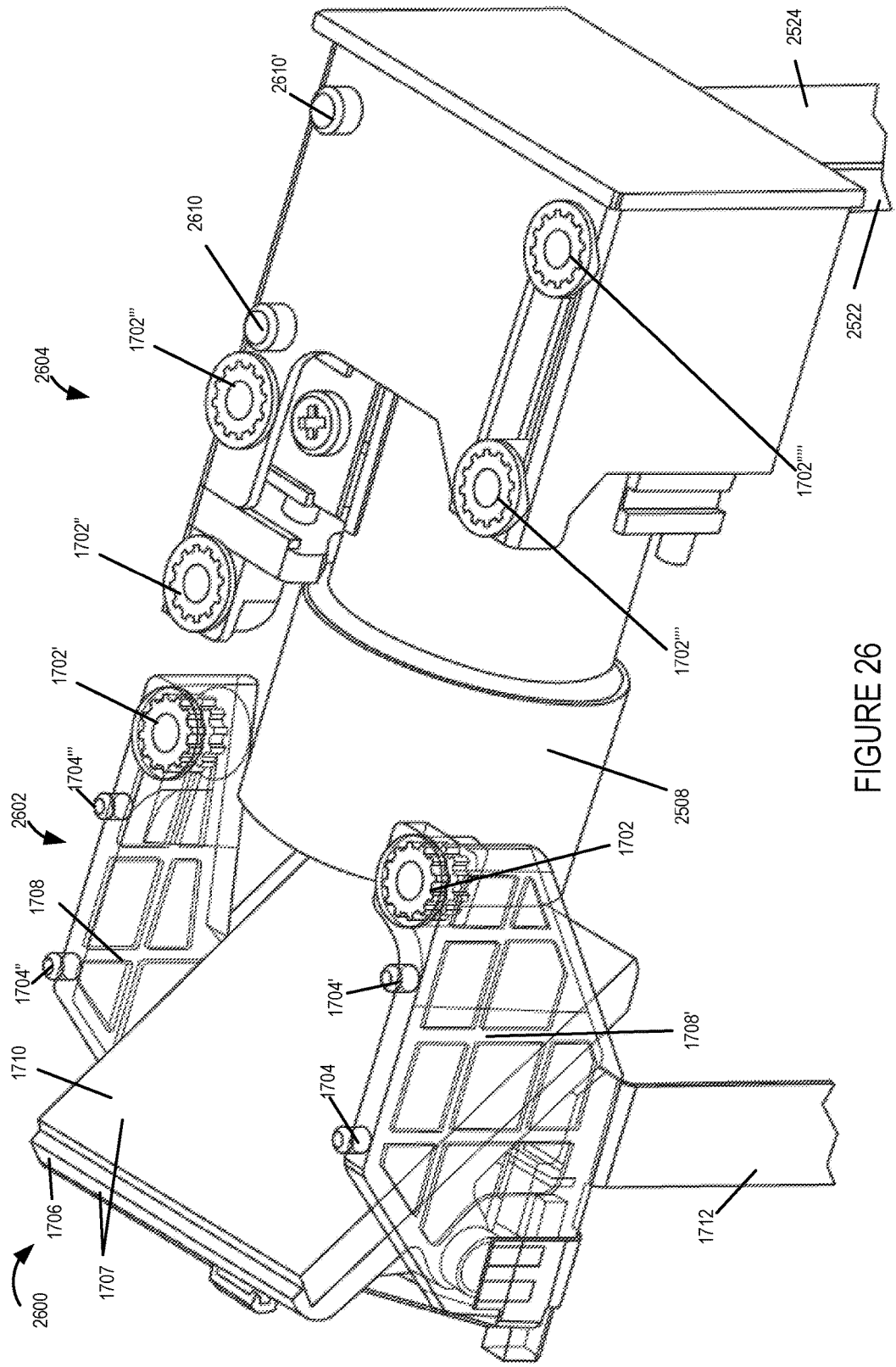
FIG. 26 illustrates a view of an exemplary 150 mm camera module, including a movable mirror portion and a lens barrel portion, and identifies components, features and/or aspects of the camera module.

FIG. 26 illustrates an exemplary camera module 2600, e.g., a 150 mm focal length camera module, in accordance with an exemplary embodiment. Camera module 2600 is sometimes referred to as an optical chain. Camera module 2600 includes a movable mirror portion 2602 and a lens barrel portion 2604. Camera module 2600 is, e.g., the same camera module shown in FIG. 25. FIG. 26 illustrates various components in camera module 2600 including movable mirror assembly 17007 including mirror 1710 and mirror support cradle 1706, mirror side supports (1708, 1708'), threaded mounting screw holes (1702', 1702) corresponding to supports (1708, 1708'), respectively, mirror control FCP 1712, barrel 2508, barrel control assembly FCP 2522, sensor FCB 2524, additional threaded screw holes (1702", 1702''', 1702"", 1702''''') for mounting the lens barrel assembly portion of the camera module 2600.

Camera module 2600 includes a movable mirror portion 2602 and a lens barrel portion 2604. Movable mirror portion 2602 includes movable mirror assembly 1707, including mirror 1710 and mirror support cradle 1706, mirror supports (1708, 1708'), flexible printed circuit tape 1712, and threaded screw holes (1702. 1702'). Lens barrel portion 2604 includes the lens barrel assembly 2501 including lens barrel 2508, flexible printed circuit tapes (2522, 2524), threaded screw holes (1702", 1702''', 1702'''', 1702'''''), and locator pins (2610, 2610').

Camera module 2600 includes a mirror assembly and a barrel assembly. In various embodiments, the movable mirror portion 2602 and the lens barrel portion 2604 include threaded holes ((1702, 1702'), (1702", 1702''', 1702'''', 1702''''')), respectively, for securing the movable lens portion 2602 and the lens barrel portion 2604 separately to the rigid mounting board 2310, e.g., chassis.

Figure 27:
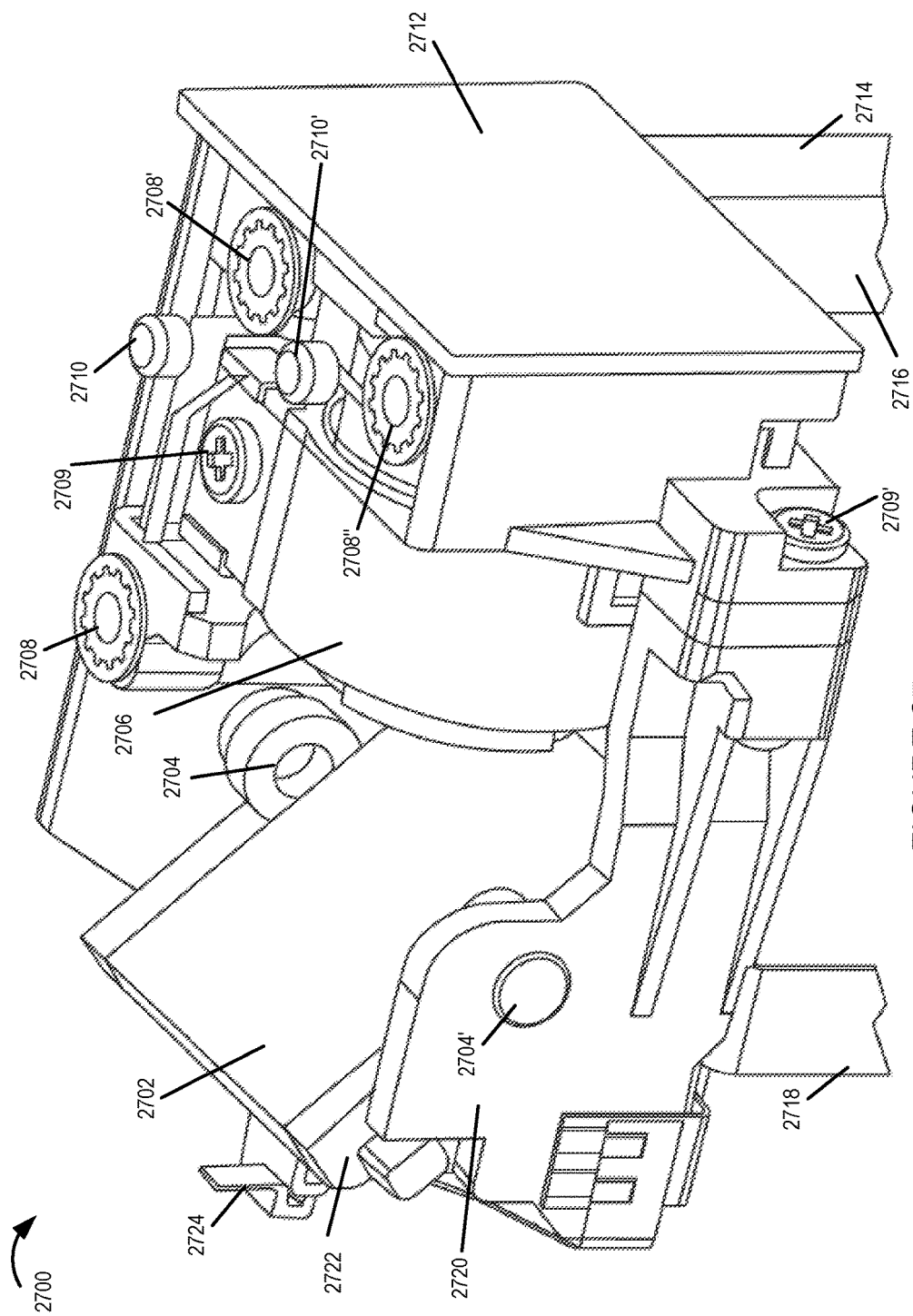
FIG. 27 illustrates a view of an exemplary 70 mm camera module, including a movable mirror portion and a lens barrel portion, and identifies components, features and/or aspects of the camera module.

FIG. 27 is a drawing of another exemplary camera module 2700, e.g., a 70 mm film equivalent camera module. Camera module 2700 includes mirror 2702, mirror support cradle 2722, spring 2724, mirror side support 2720, mirror pivots (2704, 2704'), mirror control FPC 2718, lens barrel assembly 2706, sensor mounting board 2712, barrel control flexible FPC 2714, sensor FPC 2716, locator pins (2710, 2710'), thread screw hole for receiving screw extending through rigid mounting plate (2708, 2708', 2708"), screws (2709, 2709').

The lens barrel assembly 2706 includes a barrel drive for moving the lens barrel in and out. A piezo electric actuator and drive rod are located behind the mirror 2702 and push/pull on the lower portion of the mirror support cradle 2722 to alter the angel of the mirror 2702 while a hall sensor assembly monitors mirror position allowing closed loop mirror position control.

Figure 28:
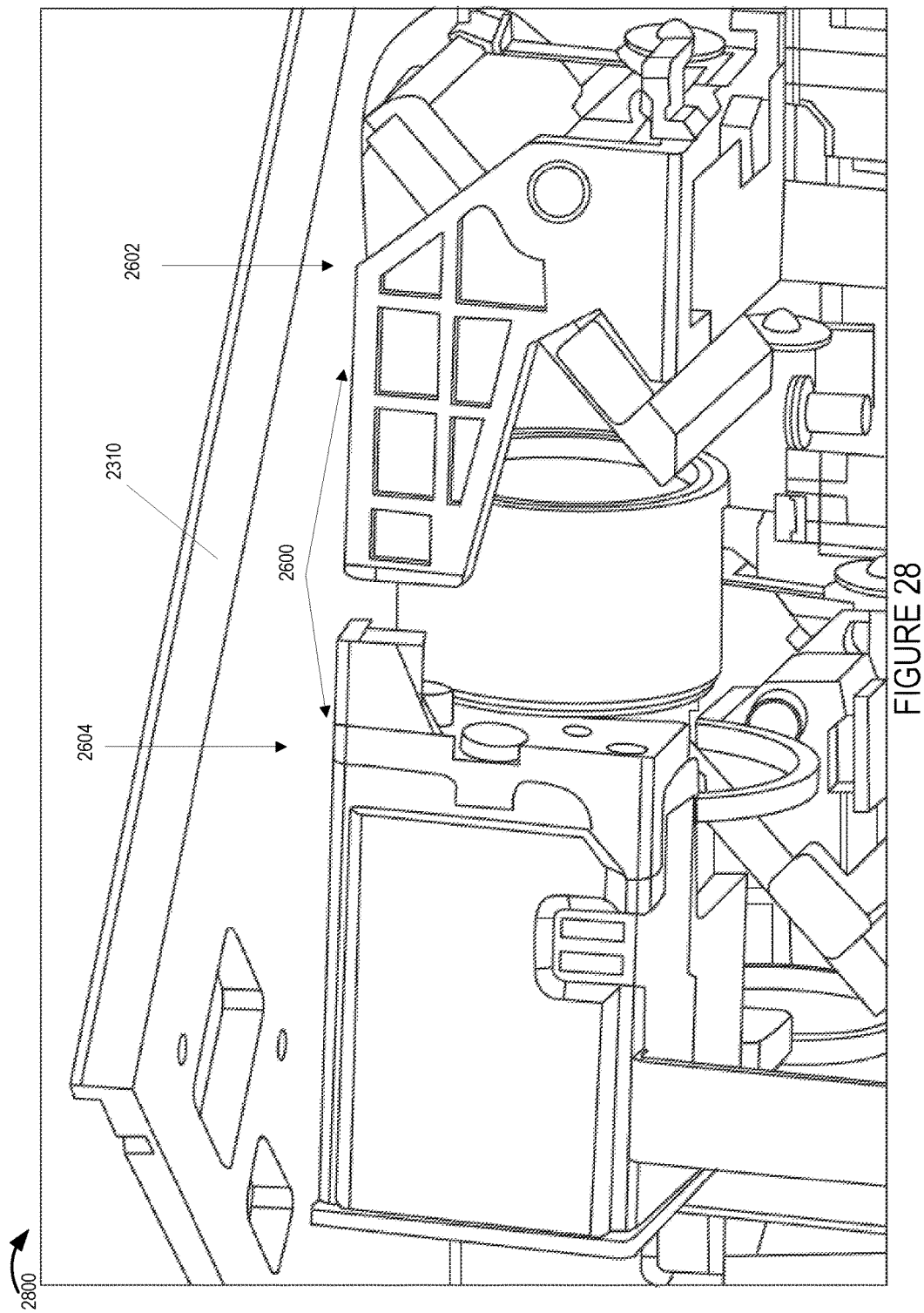
FIG. 28 illustrates a view of an exemplary 150 mm camera module secured to a rigid mounting board.

FIG. 28 is a drawing 2800 of a 150 mm camera module 2600 secured to a rigid mounting board 2310 via screws passing through the mounting board into threaded screw holes of the camera module. The movable mirror portion 2602 and the lens barrel portion 2604 of the camera module are secured separately to the rigid mounting board 2310. A recess area, e.g., 2307, around the outer opening, e.g., 2306, allows a portion of the mirror to be beneath the surface of the mounting board to which the mirror assembly portion is secured.

Figure 29:
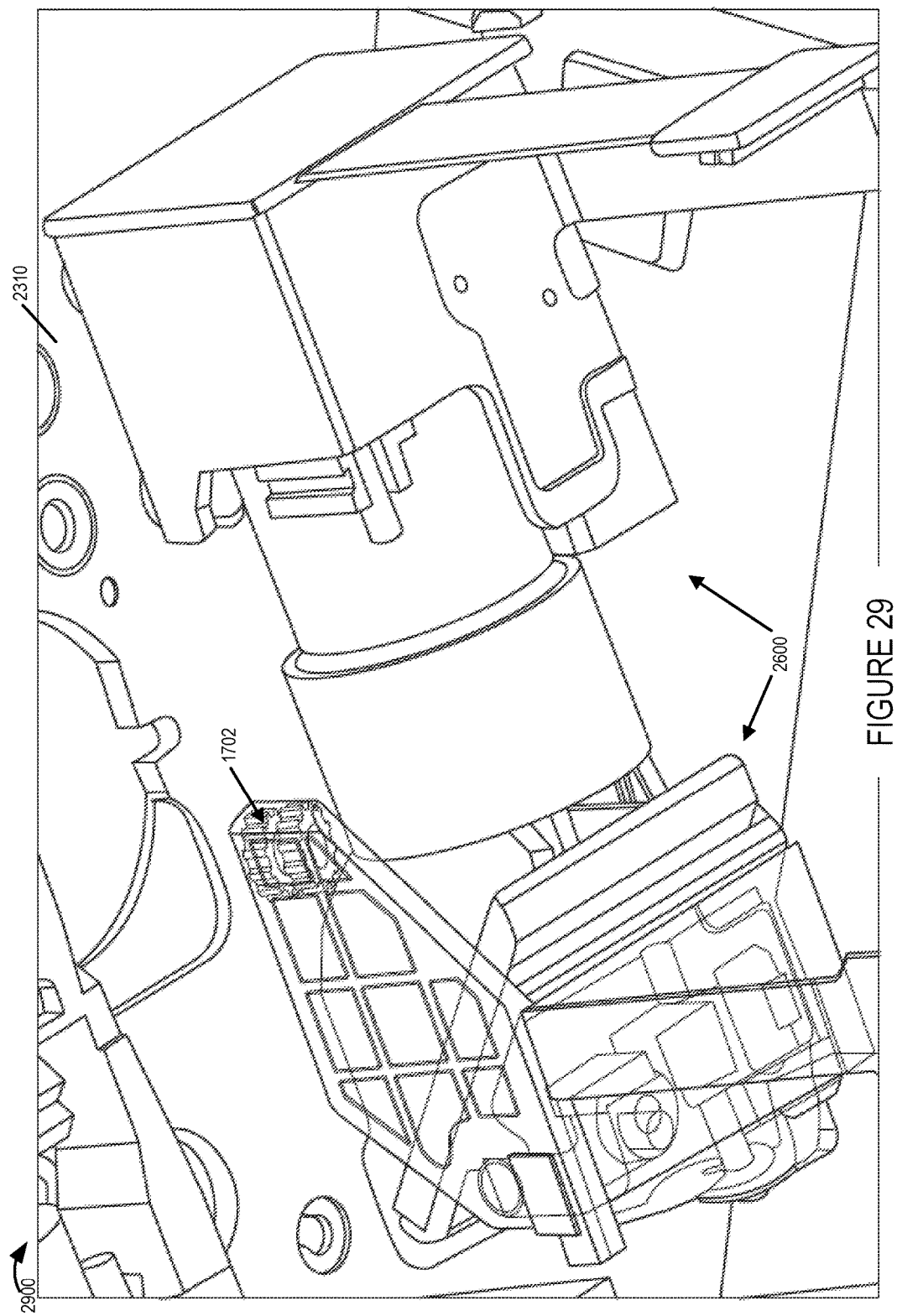
FIG. 29 illustrates another view of an exemplary 150 mm camera module secured to a rigid mounting board.

FIG. 29 is a drawing 2900 of another view of a 150 mm camera module 2600 secured to the back of a rigid mounting board 2310. One of the threaded screw holes 1702 for receiving a screw extending through the mounting plate is identified.

Figure 30:
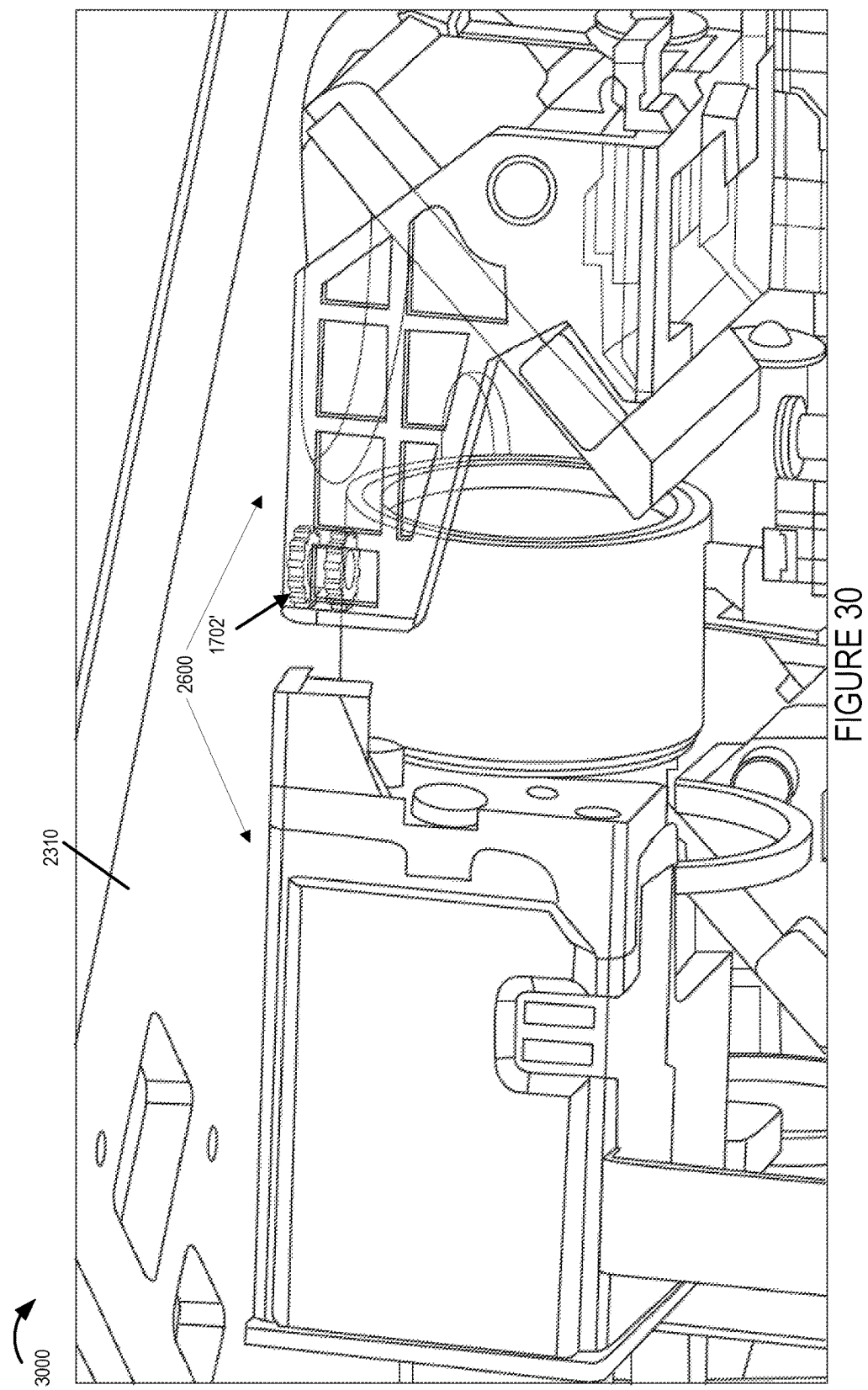
FIG. 30 illustrates another view of an exemplary 150 mm camera module secured to a rigid mounting board.

FIG. 30 is a drawing 3000 of another view of a 150 mm camera module 2600 secured to the back of a rigid mounting board 2310. One of the threaded screw holes 1702' for receiving a screw extending through the mounting plate is identified.

Figure 31:
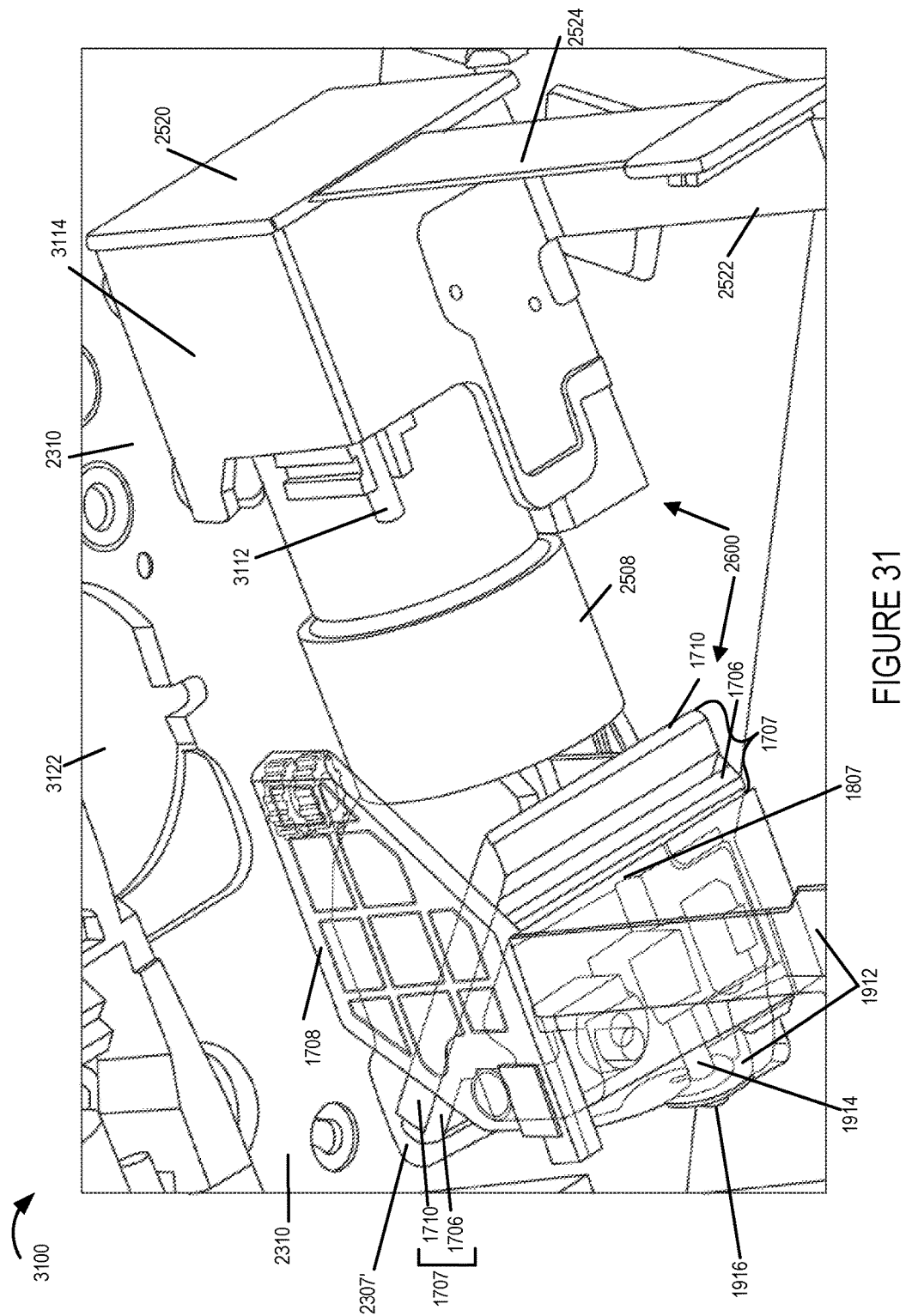
FIG. 31 illustrates another view of an exemplary 150 mm camera module secured to a rigid mounting board and further illustrates additional components, features, and/or aspects of the camera module.

FIG. 31 is a drawing 3100 of another view of a 150 mm camera module 2600 secured to the back of a rigid mounting board 2310. Various components of camera module 2600 are identified including lens barrel 2508, sensor flexible printed circuit (FPC) 2524, lens barrel control FPC 2522, sensor board 2520, movable mirror assembly 1707 including mirror 1710 and mirror support cradle 1706, mirror support 1708, actuator 1916, mirror position control rod 1914, and mirror control FPC 1912. Camera module 2600 further includes a lens barrel and sensor housing 3114 used to house the lens barrel, drive motor and sensor assembly, a guide pin 3112 used to guide the lens barrel unit into the lens barrel and sensor housing. First portion 1807 of the mirror assembly 1707 is identified. The drive rod 1914 makes contact with the first portion of the mirror assembly 1707 and presses against the first portion 1807 of the mirror assembly 1707 but is not attached to the first portion 1807 of the mirror assembly 1707.

In drawing 3100 recess 2307' which is cut into the rigid mounting board 2310 is shown. The mirror 1710 extends below a surface of the mounting board 2310 and into the recess 2307' when positioned at some angles to which the first mirror assembly 1707 can be driven by the linear actuator 1916. In drawing 3100 an opening 3122 for another 150 mm camera module is also shown.

The mirror control FPC 1912 passes around the drive rod 1914, which is secured to the actuator 1916, and contacts the mirror support cradle 1706 so as not to interfere with rod 1914 movement.

Figure 32:
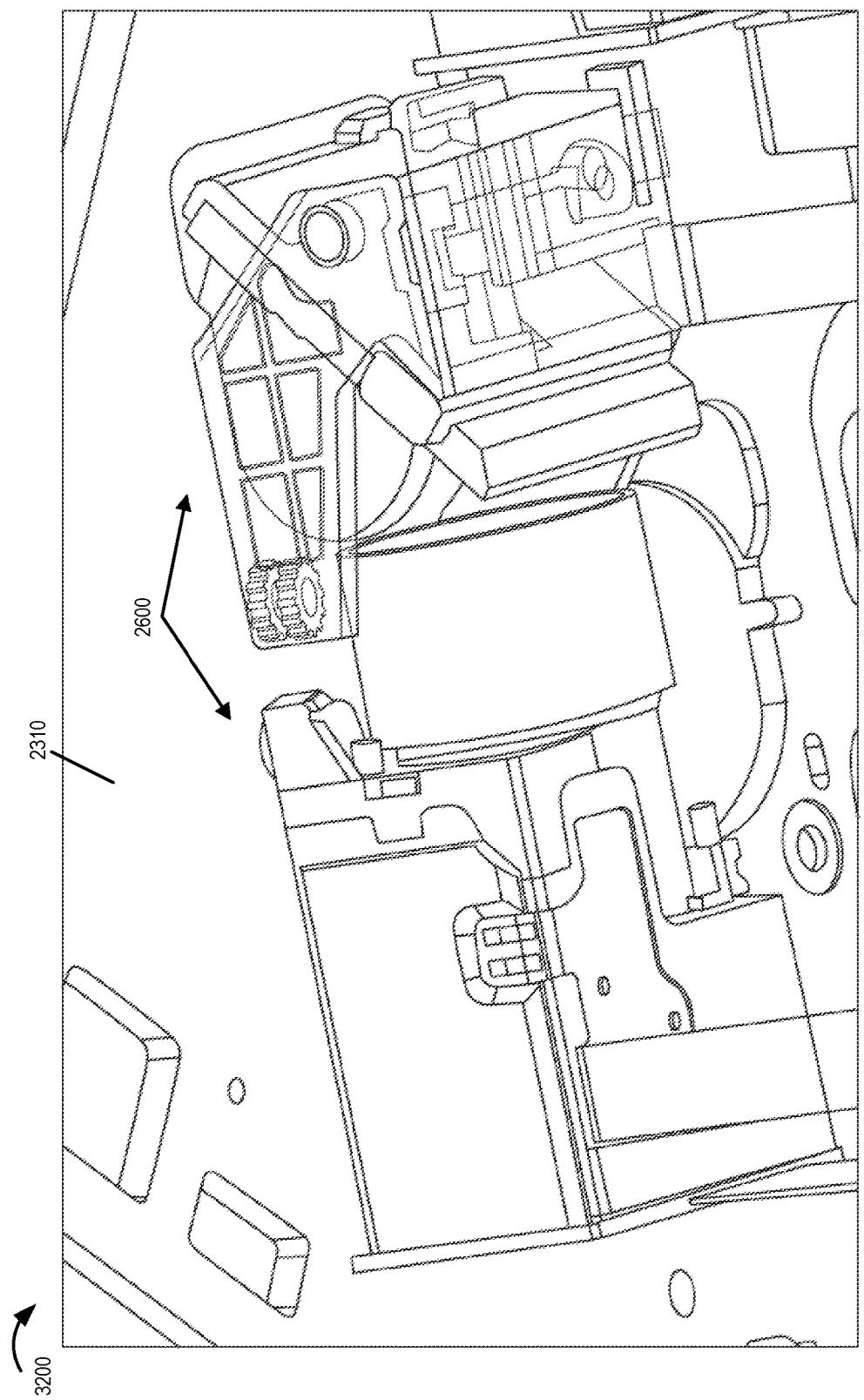
FIG. 32 illustrates a perspective view of an exemplary 150 mm camera module.

FIG. 32 is a drawing 3200 of another view of a 150 mm camera module 2600 secured to the back of a rigid mounting board 2310.

Figure 33:
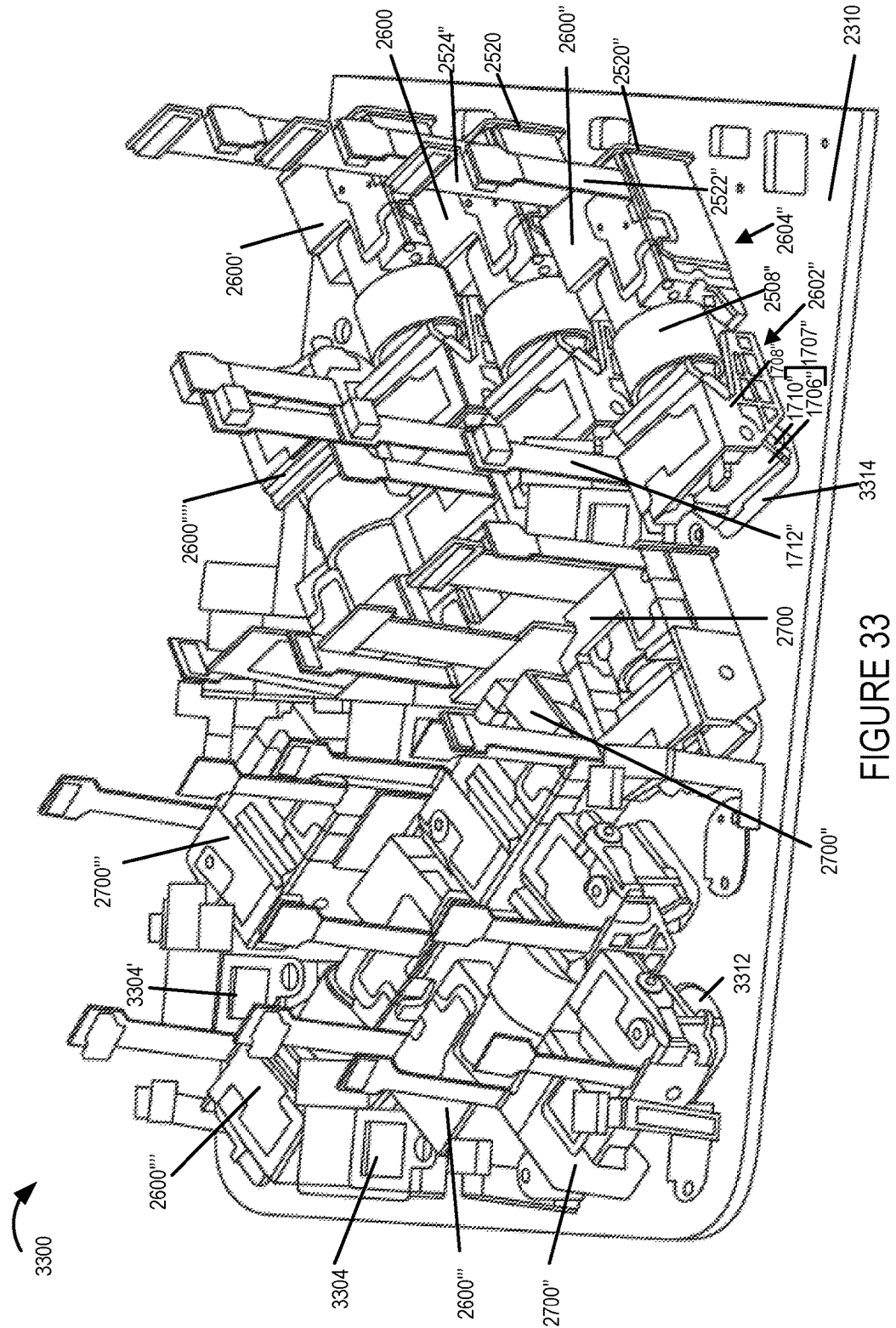
FIG. 33 illustrates a rigid mounting boards populates with a plurality of camera modules, said plurality of camera modules including 35 mm camera modules, 70 mm camera modules, and 150 mm camera modules.

FIG. 33 is a drawing 3300 of a rigid mounting board 2310 with camera modules having different focal lengths mounted on the rigid mounting board 2310, e.g., camera module chassis. The view is from the rear of the camera with opening through the mounting board 2310 allowing light to enter and be captured by the sensors of the camera modules. The mounted camera modules include six 150 mm camera modules (2600, 2600', 2600", 2600''', 2600'''', 2600'''''), four 70 mm camera modules (2700, 2700', 2700", 2700''') and two 35 mm camera modules (3304, 3304'). The 35 mm camera modules (3304, 3304') do not use mirrors; the 70 mm camera modules (2700, 2700', 2700", 2700''') and the 15-mm camera modules (2600, 2600', 2600", 2600''', 2600'''', 2600''''') use mirrors. Flex tapes allow camera module sensors and controls to be connected to a printed circuit board and processor mounted within the camera.

Drawing 3300 identifies various components of exemplary 150 mm camera module 2600" including a movable mirror portion 2602" and a lens barrel portion 2604". The movable lens portion 2602" includes movable mirror assembly 1707" including mirror 1710" and mirror support cradle 1706", mirror support 1708", and mirror position control flexible printed circuit (FPC) 1712". The lens barrel portion 2604" includes lens barrel 2508", sensor mounting board 2520", barrel assembly FBC 2522" and sensor FPC 2524". Drawing 3300 further identifies mirror recess 3314 for 150 mm camera module 2600". Drawing 3300 further identifies sensor mounting board 2520 for camera module 2600.

Drawing 3300 also identifies opening 3313 for 70 mm camera module 3312. Drawing 3300 further identifies camera barrel 2706 for 70 mm camera module 2700.

FIG. 34 is a drawing 3400 of a view from the front side of a partially populated rigid mounting board 2310. Screws 3401 are used to secure a camera module, e.g., a 150 mm camera module 2600, to the rigid mounting board 2310. Threaded screw holes, e.g., threaded screw holes (1702, 1702', 1702", 1702''', 1702'''', 1702''''') in 150 mm camera module 2600 receive the mounting screws 3402 which extend through the rigid mounting board 2310 and are inserted into the threaded screw holes (holes (1702, 1702', 1702", 1702''', 1702'''', 1702''''') to secure the mountable camera module 2600 to the rigid mounting board 2310.

Figure 35:
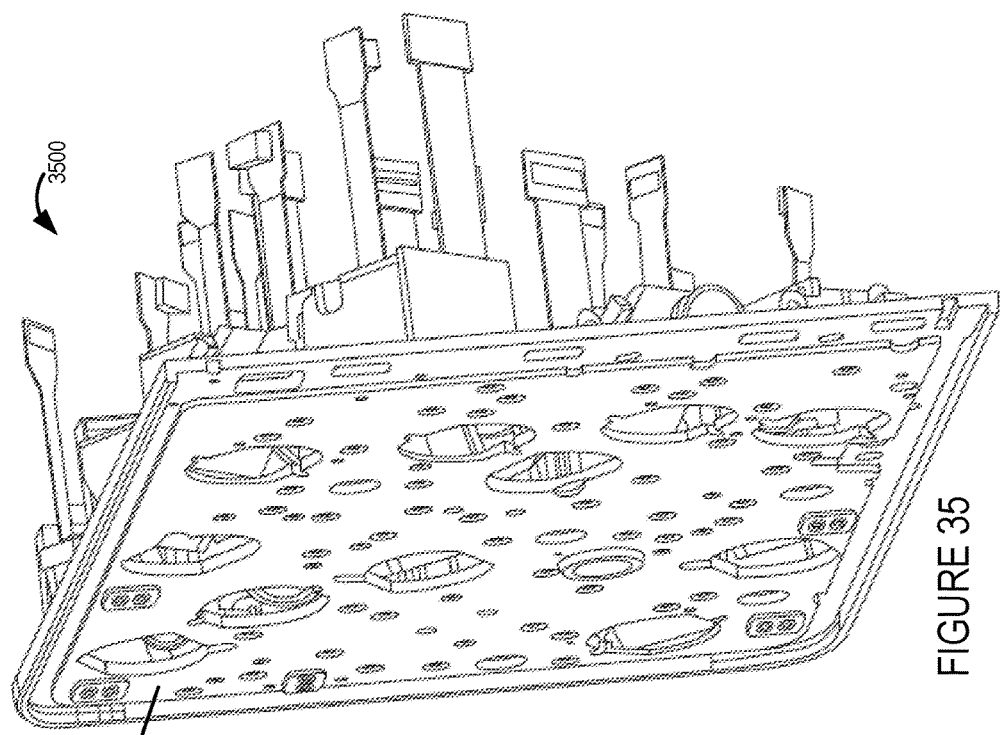
FIG. 35 illustrates a perspective view of a partially mounted rigid mounting board, said rigid mounting board being partially populated with some camera modules.

FIG. 35 is a drawing 3600 of a view from the front side of a partially populated rigid mounting board 2310 with the board being shown as transparent. Exemplary 150 mm camera module 2600 is mounted on the board 2310 via screws going through the screw holes (3602, 3602', 3602", 3602''', 3602'''') in the board 2310 and with the screws being screwed into the threaded screw holes (1702', 1702', 1702", 1702"", 1702"") of module 2600, thus securing module 2600 to the board 2310. There is a recess in the board 2310 for the screw heads. Mirror 1710 of module 2600 is visible through opening 2306. Recess 2307, which is cut into the board 2310 to allow for mirror movement, is also shown. Locator pins (2610, 2610'), lens barrel control FCB 2522 and sensor FCB 2524 are also shown.

FIG. 18 shows a mirror support cradle 1706 with a flexible printed circuit/board 1712 that can be used in a moveable mirror portion 2602 of a camera module 2600. The mirror support cradle 1706 of FIG. 18 is shown in FIG. 19 as part of a movable mirror portion 2602 which can, and in some embodiments is used as part of a 150 mm camera module 2600. The movable mirror portion shown in FIG. 19 includes a piezo electric actuator 1916 which is connected to a mirror drive rod 1914 which in turn makes contact with the bottom of the mirror support cradle 1706. The piezo electric actuator 1916 pushes and pulls on the drive rod 1914 moving the mirror support cradle 1706 which is mounted using pivots (1804, 1804') which allow the mirror support cradle 1706 and mirror 1710 mounted therein to move and change by a number of degrees. Thus during use the mirror 1710 can move in position from an angle of less than 45 degrees relative to the sensor of the corresponding module to an angle over 50 degrees. In some embodiments the range of motion is between 43 and 53 degrees. The moveable mirror portion 2602 includes a flexible printed circuit board 1712 which is coupled to the piezo electric actuator 1916 and a hall sensor 2204 (see FIG. 22). The hall sensor 2204 may be a hall sensor position encoder which generates electrical signals indicating the position of the sensor relative to a magnet mounted on the mirror support assembly. A processor in the camera can and does control the position of the mirror of each camera module using closed loop position control driving the mirror modules actuator and monitoring the feedback from the hall sensor to drive and maintain the mirror cradle and thus mirror at the desired position for a given image capture operation. The position of the mirror 1710 may be changed based on zoom setting and/or for other reasons under control of the processor.

FIG. 23 shows a rigid mounting board 2310 to which camera modules can be mounted. The board, also sometimes referred to as a chassis may be made of aluminum or another rigid material and includes opening, e.g., opening 2306 for a 150 mm module, opening 2304 for a 70 mm module, opening 2302 for a 35 mm camera module, though which light can pass into the camera module mounted at the position of the opening. Note that larger focal length camera modules normally have larger mirrors than small focal length camera modules. To minimize camera thickness and still allow for adequate mirror motion in one embodiment a recess, e.g., recess 2307, is cut into the mounting board 2310 to allow mirrors corresponding to the larger focal length modules to extend below the surface of the mounting board. This is shown in FIG. 23 with a recess (2307, 2307', 2307", 2307"", 2307"", 2307"") being present for 150 mm camera modules but not for 35 or 70 mm camera modules.

By not including recesses for 35 mm and 70 mm camera modules maximum rigidity is maintained which is important for maintaining overall camera module alignment while for 150 mm camera modules a small recessed area is created to minimize camera thickness. Camera modules including camera barrel assemblies, sometimes referred to as a lens barrel portion of a camera module, and mirror assemblies, sometimes referred to as a movable mirror portion of a camera module, are placed on the rigid mounting board using locator pins on the modules to facilitate alignment and positioning the board. Screws from the front side of the board pass through the board and secure the camera modules to the back side of the board. A 70 mm mirror assembly and a 70 mm lens barrel assembly may be secured together, e.g., via screws 2709, 2709'), and then secured as a unit, e.g., 70 mm camera module 2700, to the mounting board 2310. The larger 150 mm camera modules, e.g., module 2600, include a mirror assembly 2602 and a barrel assembly 2604 which are secured individually to the mounting board 2310 with the guide pins ((1704, 1704', 1704", 1704""), (2610, 2610')) shown in FIG. 21 helping to facilitate proper alignment between the mirror assembly and the barrel assembly on the mounting board and with respect to each other.

A sensor is included on a sensor mounting board at the back of each camera module assembly and is coupled to a camera processor by a sensor flex printed circuit board. Another FPC couples a barrel drive motor included in the barrel assembly to the processor. While 70 and 150 mm camera modules include mirror with no lenses before the mirror but simply a flat glass or plastic covering over the module opening in the camera, 35 mm modules do not include a mirror in some embodiments and face straight out. By avoiding the use of lenses before the mirror camera thickness can be minimized sense space need not be provided in front of the mirror for the lenses which might otherwise be present.

The camera modules are mounted on the mounting board located towards the front of the camera. Behind the mounting board may be and sometimes is a PC board on which the camera's processor is mounted and a display may be and normally is included behind the PC board. By using camera modules of different sizes, some with mirror and some without, a higher camera module packing density can be achieved for a given area than might be the case if only modules of a single size were used.

An exemplary camera device (100 or 1000), in some embodiments, includes: a first optical chain (2600) including: a first moveable mirror assembly (1707); a first mirror support (1708 or 1708'), a first pivot (1804 or 1804') attached to said first mirror assembly (1707) and inserted into said first mirror support (1708 or 1708') allowing said first mirror assembly (1707) to rotate with respect to said first mirror support (1708 or 1708'); and a first linear actuator (1916) for exerting a linear force on a first portion (1807) of said first mirror assembly (1707) to control rotation of said first mirror assembly (1707). In some such embodiments, the first optical chain (2600) further includes: a first drive rod (1914) for transferring linear force generated by said first linear actuator (1916) onto said first portion (1807) of the first mirror assembly (1707). In some such embodiments, the first drive rod (1914) makes contact with said first portion (1807) of said first mirror assembly (1707) and presses against said first portion (1807) of said first mirror assembly (1707) but is not attached to said first portion (1807) of said first mirror assembly (1707).

In some embodiments, the first optical chain (2600) further includes: a first return spring (1912) in contact with a second portion (1909) of said first mirror assembly (1707), said first return spring (1912) excerpting a force contrary to the force of said first linear actuator (1916).

In some embodiments, said first mirror assembly (1707) includes a first mirror support cradle (1706) in which a first mirror (1710) is mounted, said first portion (1807) of said first mirror assembly (1707) being a lower portion of said first mirror assembly (1707) and the second portion (1909) of said first mirror assembly (1707) being an upper portion of said first mirror assembly (1707). In some such embodiments, said spring (1912) includes a flat piece of spring metal inserted into a first spring retaining slot (1911) in the second portion (1909) of said first mirror assembly (1707). In some such embodiments, said first optical chain (2600) further includes: a hall sensor (2204) for sensing a position of said mirror assembly (1707) relative to the hall sensor (2204).

In some embodiments, the camera device (100 or 1000) includes a mounting board (2310), said mounting board (2310) including a first opening (2306) through which light can pass and reach said first mirror (1710). In some embodiments, said mounting board (2310) includes a recess (2307) cut into said mounting board (2310), said first mirror (1710) extending below a surface of said mounting board (2310) and into said recess (2307) when positioned at some angles to which said first mirror assembly (1707) can be driven by said first linear actuator (1916).

In some embodiments, said first mirror (1710) is a plane mirror; and said first optical chain (2600) further includes: a first lens barrel assembly (2501); a first sensor board (2520); and a first sensor (2518) mounted to said first sensor board (2520). In some such embodiments, said first lens barrel assembly (2501) includes one or more lenses (2514) for directly light reflected from said first mirror (1710) onto the first sensor (2518). In some such embodiments, components which form said first optical chain (2600) are secured together to form a first mountable camera module (2600), at least some of said components which form said first optical chain (2600) include threaded screw holes (1702, 1704', 1704''', 1704'''', 1704''''') for receiving mounting screws (3401) which may can extend through said rigid mounting board (2310) and inserted into said threaded screw holes (1704, 1704', 1704''', 1704'''', 1704''''') to secure said first mountable camera module (2600) to said rigid mounting board (2310).

In some embodiments, the camera device (100 or 1000) includes a sensor mounting board (2520); and a first flexible printed circuit tape (2524) coupled to said sensor mounting board (2520) for receiving sensor output of said first sensor (2518) and communicating it to a processor (110) in said camera device (100).

In some embodiments, said linear actuator (1916) is a piezo electric linear actuator.

In various embodiments, the camera device (100 or 1000) further includes a second optical chain including: a second moveable mirror assembly; a second mirror support, a second pivot attached to said second mirror assembly and inserted into said second mirror support allowing said second mirror assembly to rotate with respect to said second mirror support; and a second linear actuator for exerting a linear force on a first portion of said second mirror assembly to control rotation of said second mirror assembly. For example, in one embodiment, camera device (100 or 1000) includes optical chain 2600 and optical chain 2610, e.g., two 150 mm optical chains. In another example, camera device (100 or 1000) includes optical chain 2600 and optical chain 2700, e.g., a 150 mm optical chain and a 70 mm optical chain.

A recess is included in a mounting board to allow the bottom of the mirror or a portion of the mirror mounting hinge to be placed below the surface of the mounting board to which the camera module is secured.

The camera devices of the present invention supports multiple modes of operation and switching between different modes of operation. Different modes may use different numbers of multiple lenses per area, and/or different exposure times for different optical chains used to capture a scene area in parallel. Different exposure modes and filter modes may also be supported and switched between, e.g., based on user input.

Numerous additional variations and combinations are possible while remaining within the scope of the invention.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of an cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images maybe and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed is:

1. A camera device, comprising:
a mounting board, said mounting board including a first opening through which light can pass and a second opening through which light can pass; and
a first optical chain, secured to said mounting board, said first optical chain including:
a first sensor;
a first moveable mirror assembly positioned beneath said first opening and including a first mirror to redirect light passing through said first opening towards said first sensor; and
an actuator for exerting a force on a first portion of said first moveable mirror assembly to control movement of said first moveable mirror assembly; and
a second optical chain secured to said mounting board, said second optical chain including a second sensor onto which light passing through said second opening is directed.

2. The camera device of claim 1, wherein the first optical chain is in the form of a first camera module, said first camera module being secured to said mounting board by screws extending through said mounting board into said first camera module.

3. The camera device of claim 2,
wherein said actuator is a first linear actuator; and
wherein the first optical chain further includes:
a first drive rod for transferring linear force generated by said first linear actuator onto said first portion of the first moveable mirror assembly; and
wherein the first drive rod makes contact with said first portion of said first moveable mirror assembly and presses against said first portion of said first moveable mirror assembly but is not attached to said first portion of said first moveable mirror assembly.

4. The camera device of claim 3, wherein the first optical chain further includes:
a first return spring in contact with a second portion of said first moveable mirror assembly, said first return spring excerpting a force contrary to the force of said first linear actuator.

5. The camera device of claim 3, wherein said first moveable mirror assembly includes a first mirror support cradle in which said first mirror is mounted, said first portion of said first moveable mirror assembly being a lower portion of said first moveable mirror assembly and the second portion of said first moveable mirror assembly being an upper portion of said first moveable mirror assembly.

6. The camera device of claim 5, wherein said first return spring includes a flat piece of spring metal inserted into a first spring retaining slot in the second portion of said first moveable mirror assembly.

7. The camera device of claim 1,
wherein said mounting board includes a third opening through which light can pass; and
a third optical chain including a second mirror and a third sensor, said third optical chain being secured to said mounting board, said second mirror being positioned beneath the third opening to redirect light passing through said third opening towards said third sensor.

8. The camera device of claim 1,
wherein said actuator is a first linear actuator; and
wherein said mounting board includes a recess cut into said mounting board, said first mirror extending below a surface of said mounting board and into said recess when positioned at some angles to which said first moveable mirror assembly can be driven by said first linear actuator.

9. The camera device of claim 8,
wherein said first mirror is a plane mirror;
wherein said first optical chain further includes:
a first lens barrel assembly; and
a first sensor board; and
wherein said first sensor is mounted to said first sensor board.

10. The camera device of claim 9, wherein said first lens barrel assembly includes one or more lenses for directly light reflected from said first mirror onto the first sensor.

11. The camera device of claim 10,
wherein said mounting board is a rigid mounting board; and
wherein components which form said first optical chain are secured together to form a first mountable camera module, at least some of said components which form said first optical chain include threaded screw holes for receiving mounting screws which can extend through said rigid mounting board and be inserted into said threaded screw holes to secure said first mountable camera module to said rigid mounting board.

12. The camera device of claim 1, further comprising:
a third optical chain which does not include a mirror, said third optical chain being secured to said mounting board, a third opening in said mounting board allowing light to pass through said mounting board to a third sensor included in said third optical chain.

13. A camera apparatus, comprising:
a mirror assembly including:
a linear actuator;
a mirror support mounted on a pivot; and
a drive rod connected to said linear actuator for driving said mirror support;
a lens barrel; and
a rigid mounting board to which said mirror assembly is mounted, said rigid mounting board including a recess allowing a portion of a mirror to extend below the surface of said mounting board, said recess corresponding to a thin area of said rigid mounting board adjacent a hole through which light can pass through said rigid mounting board and be reflected by the mirror into said lens barrel.

14. The camera apparatus of claim 13, wherein said mirror support is a mirror support cradle; and wherein the linear actuator is a piezo electric actuator.

15. The camera apparatus of claim 13 further including a hall sensor for detecting a mirror position.

16. The camera apparatus of claim 15, further comprising:

a return spring exerting pressure on said mirror support in a direction contrary to the direction exerted by said linear actuator.

17. A camera device, comprising:

a mounting board, said mounting board including a first opening through which light can pass and a second opening through which light can pass; and a first camera module, secured to said mounting board, said first camera module including:
 a first sensor; and
 a first mirror positioned beneath said first opening to redirect light passing through said first opening towards said first sensor, said first mirror being a moveable mirror; and a second camera module, secured to said mounting board, said second camera module including:
 a second sensor; and
 a second mirror positioned beneath said second opening to redirect light passing through said second opening towards said second sensor.

18. The camera device of claim 17, wherein the second mirror is a second moveable mirror.

19. The camera device of claim 17, wherein the mounting board further includes a third opening, the camera device further comprising:

a third camera module, secured to said mounting board, said third camera module including:
 a third sensor; and
 a third mirror positioned beneath said second opening to redirect light passing through said second opening towards said third sensor; and wherein said first, second and third camera modules extend within said camera device at different angles relative to a bottom of said camera device.

20. The camera device of claim 17, wherein the mounting board further includes a third opening, the camera device further comprising:

a third camera module, secured to said mounting board, said third camera module including:
 a third sensor, light passing through said third opening extending in a straight manner from the front of the camera device towards the back of the camera device onto said third sensor.

* * * * *